(12) United States Patent
Bowler et al.

(10) Patent No.: US 9,900,634 B2
(45) Date of Patent: Feb. 20, 2018

(54) CATV VIDEO AND DATA TRANSMISSION SYSTEM WITH AUTOMATIC PARAMETER CONTROL

(71) Applicant: General Instrument Corporation, Horsham, PA (US)

(72) Inventors: David B Bowler, Stow, MA (US); Clarke V. Greene, Middletown, CT (US); John Holobinko, Avon, CT (US); Gerard White, Dunstable, MA (US); Xinfa Ma, Acton, MA (US); Shaoting Gu, Acton, MA (US); Xiang He, Reading, MA (US); Lawrence M. Hrivnak, Lowell, MA (US); Steven H. Hersey, West Newbury, MA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 206 days.

(21) Appl. No.: 13/843,996

(22) Filed: Mar. 15, 2013

(65) Prior Publication Data
US 2014/0282803 A1  Sep. 18, 2014

(51) Int. Cl.
| | |
|---|---|
| *H04N 21/2383* | (2011.01) |
| *H04N 21/426* | (2011.01) |
| *H04N 21/61* | (2011.01) |
| *H04N 5/44* | (2011.01) |
| *H04B 10/2575* | (2013.01) |
| *H04N 21/222* | (2011.01) |
| *H04N 21/238* | (2011.01) |
| *H04N 21/2385* | (2011.01) |
| *H04N 21/24* | (2011.01) |
| *H04N 21/2662* | (2011.01) |

(52) U.S. Cl.
CPC .... *H04N 21/2383* (2013.01); *H04B 10/25751* (2013.01); *H04N 5/4401* (2013.01); *H04N 21/2221* (2013.01); *H04N 21/2385* (2013.01); *H04N 21/23805* (2013.01); *H04N 21/2402* (2013.01); *H04N 21/42676* (2013.01); *H04N 21/615* (2013.01); *H04N 21/6118* (2013.01); *H04N 21/2662* (2013.01)

(58) Field of Classification Search
CPC ......... H04N 21/42676; H04N 21/6118; H04N 5/4401; H04N 21/2383
USPC .................................................. 725/98, 118
See application file for complete search history.

(56) References Cited

U.S. PATENT DOCUMENTS

| | | | |
|---|---|---|---|
| 5,153,763 A | 10/1992 | Pidgeon et al. | |
| 6,519,773 B1 | 2/2003 | Ahmed et al. | |
| 7,151,782 B1 | 12/2006 | Oz et al. | |
| 8,214,871 B2 | 7/2012 | Shalvi et al. | |
| 8,276,035 B1 * | 9/2012 | Savarese et al. | ............. 714/749 |
| 8,494,363 B2 | 7/2013 | Calderon et al. | |

(Continued)

OTHER PUBLICATIONS

H. Shankar, et al., "Duobinary Modulation for Optical Systems", Dec. 2002.

(Continued)

*Primary Examiner* — Ricky Chin
(74) *Attorney, Agent, or Firm* — Lori Anne D. Swanson

(57) ABSTRACT

Improved systems and methods for delivering CATV content over a fiber optic network from a transmitter. The transmitter preferably monitors performance attributes of a transmitted signal and selectively configures the transmitter based on the monitored attributes.

20 Claims, 66 Drawing Sheets

(56) References Cited

U.S. PATENT DOCUMENTS

| | | | |
|---|---|---|---|
| 2001/0002864 A1 | 6/2001 | Nomura | |
| 2001/0055354 A1 | 12/2001 | Fung et al. | |
| 2003/0030871 A1* | 2/2003 | Dove | H04J 14/0226 398/141 |
| 2003/0139980 A1* | 7/2003 | Hamilton | G06Q 30/0641 705/27.1 |
| 2004/0059825 A1* | 3/2004 | Edwards et al. | 709/230 |
| 2005/0114903 A1* | 5/2005 | Ahmed et al. | 725/114 |
| 2005/0155082 A1* | 7/2005 | Weinstein | H04H 20/46 725/131 |
| 2006/0085727 A1 | 4/2006 | Azenkot et al. | |
| 2007/0022444 A1* | 1/2007 | Santhoff | H04N 7/102 725/69 |
| 2008/0080622 A1* | 4/2008 | Katznelson | 375/240.26 |
| 2008/0238489 A1 | 10/2008 | Sanduleanu et al. | |
| 2009/0034979 A1* | 2/2009 | Zancewicz | H04N 7/22 398/115 |
| 2009/0129484 A1 | 5/2009 | He et al. | |
| 2009/0196602 A1* | 8/2009 | Saunders et al. | 398/26 |
| 2010/0183294 A1* | 7/2010 | Villarruel et al. | 398/10 |
| 2012/0324497 A1 | 12/2012 | Altchek | |
| 2013/0063608 A1* | 3/2013 | Tierney et al. | 348/192 |
| 2013/0160068 A1* | 6/2013 | Pradzynski | H04B 10/25751 725/121 |
| 2013/0191877 A1 | 7/2013 | Rakib | |
| 2013/0236177 A1* | 9/2013 | Fang et al. | 398/66 |
| 2013/0279914 A1 | 10/2013 | Brooks | |
| 2013/0322882 A1* | 12/2013 | Fang et al. | 398/67 |
| 2014/0047497 A1* | 2/2014 | Casas et al. | 725/151 |
| 2014/0050484 A1 | 2/2014 | Sun | |
| 2014/0153673 A1* | 6/2014 | Shen et al. | 375/320 |

OTHER PUBLICATIONS

B. Rumer, "Fighting Jitter in Fibre-Channel Deisgns", Feb. 1, 2001.
S. Marx, "Forward Error Correction", Dec. 4, 2001.
Couch, Leon, W. "Digital and Analog Communication Systems, Eighth Edition," http://www.engineer.tamuk.edu/CLeung/EEEN4329/12_FDM.pdf, Jan. 9, 2012, pp. 1-7.
D. Blumenthal, "Laser Chirp", 2008.
"Return Path Management: Design and Usage", Fiber-Optics.Info, 2013.
"Cable modem termination system", Wikipedia, the free encyclopedia, Feb. 19, 2013.
"CCAP 101: Guide to Understanding the Converged Cable Access Platform", Motorola White Paper, Feb. 2012.
G. Chauvel, "Dispersion in Optical Fibers", Anritsu Corporation, 2008.
"DOCSIS: Data Over Cable Service Interface Specification", Wikipedia, the free encyclopedia, Feb. 19, 2013.
Official Action, RE: Canadian Application No. 2,846,743, dated May 13, 2015.
Official Action, RE: Canadian Application No. 2,846,737, dated May 26, 2015.
Official Action, RE: Canadian Application No. 2,846,358, dated Jul. 3, 2015.

* cited by examiner

CCAP BASED DOWNSTREAM VIDEO TRANSMISSION SYSTEM

MODIFIED TRANSMITTER - DIRECT MODULATION

PARTIAL A
DIRECT MODULATION TRANSMITTER

PARTIAL EXTERNALLY MODULATED TRANSMITTER

BASIC COMBINING NETWORK

CATV VIDEO AND DATA TRANSMISSION SYSTEM WITH AUTOMATIC PARAMETER CONTROL

CROSS-REFERENCE TO RELATED APPLICATIONS

This application is related to CATV Video and Data Transmission System with RF Input, filed on Mar. 15, 2013, CATV Video and Data Transmission System with Digital Input, filed on Mar. 15, 2013, CATV Video and Data Transmission System with RF and Digital Combining Network, filed on Mar. 15, 2013, CATV Video and Data Transmission System with Hybrid Input, filed on Mar. 15, 2013, CATV Video and Data Transmission System with Automatic Dispersion Compensation, filed on Mar. 15, 2013, and CATV Video and Data Transmission System with Signal Insertion, filed on Mar. 15, 2013.

BACKGROUND

The present disclosure relates to systems and methods that provide video and data over a cable transmission network.

Referring to FIG. 1, cable TV (CATV) systems were initially deployed as video delivery systems. In its most basic form the system received video signals at the cable head end, processed these for transmission and broadcast them to homes via a tree and branch coaxial cable network. In order to deliver multiple TV channels concurrently, early CATV systems assigned 6 MHz blocks of frequency to each channel and Frequency Division Multiplexed (FDM) the channels onto the coaxial cable RF signals. Amplifiers were inserted along the path as required to boost the signal and splitters and taps were deployed to enable the signals to reach the individual homes. Thus all homes received the same broadcast signals.

As the reach of the systems increased, the signal distortion and operational cost associated with long chains of amplifiers became problematic and segments of the coaxial cable were replaced with fiber optic cables to create a Hybrid Fiber Coax (HFC) network to deliver the RF broadcast content to the coaxial neighborhood transmission network. Optical nodes in the network acted as optical to electrical converters to provide the fiber-to-coax interfaces.

As the cable network evolved, broadcast digital video signals were added to the multiplexed channels. The existing 6 MHz spacing for channels was retained but with the evolving technology, each 6 MHz block could now contain multiple programs. Up to this point, each home received the same set of signals broadcast from the head end so that the amount of spectrum required was purely a function of the total channel count in the program line-up.

The next major phase in CATV evolution was the addition of high speed data service, which is an IP packet-based service, but appears on the HFC network as another 6 MHz channel block (or given data service growth, more likely as multiple 6 MHz blocks). These blocks use FDM to share the spectrum along with video services. Unlike broadcast video, each IP stream is unique. Thus the amount of spectrum required for data services is a function of the number of data users and the amount of content they are downloading. With the rise of the Internet video, this spectrum is growing at 50% compound annual growth rate and putting significant pressure on the available bandwidth. Unlike broadcast video, data services require a two-way connection. Thus, the cable plant had to provide a functional return path. Pressure on the available bandwidth has been further increased with the advent of narrowcast video services such as video-on-demand (VOD), which changes the broadcast video model as users can select an individual program to watch and use VCR-like controls to start, stop, and fast-forward. In this case, as with data service, each user requires an individual program stream.

Thus, the HFC network is currently delivering a mix of broadcast video, narrowcast video, and high speed data services. Additional bandwidth is needed both for new high definition broadcast channels and for the narrowcast video and data services. The original HFC network has been successfully updated to deliver new services, but the pressure of HD and narrowcast requires further change. The HFC network is naturally split into the serving areas served from the individual fiber nodes. The broadcast content needs to be delivered to all fiber nodes, but the narrowcast services need only be delivered to the fiber node serving the specific user. Thus, there is a need to deliver different service sets to each fiber node and also to reduce the number of subscribers served from each node (i.e. to subdivide existing serving areas and thus increase the amount of narrowcast bandwidth available per user).

FIG. 1 shows part of the cable TV infrastructure which includes the cable head end; the Hybrid Fiber Coax (HFC) transmission network, and the home. The CATV head end receives incoming data and video signals from various sources (e.g., fiber optic links, CDN's, DBS satellites, local stations, etc.). The video signals are processed (reformatting, encryption, advertising insertion etc.) and packaged to create the program line up for local distribution. This set of video programs is combined with data services and other system management signals and prepared for transmission over the HFC to the home. All information (video, data, and management) is delivered from the head end over the HFC network to the home as RF signals. In the current practice, systems in the head end process the signals, modulate them to create independent RF signals, combine these into a single broadband multiplex, and transmit this multiplex to the home. The signals (different video channels and one or more data and management channels) are transmitted concurrently over the plant at different FDM frequencies. In the home, a cable receiver decodes the incoming signal and routes it to TV sets or computers as required.

Cable receivers, including those integrated into set-top boxes and other such devices, typically receive this information from the head end via coaxial transmission cables. The RF signal that is delivered can simultaneously provide a wide variety of content, e.g. high speed data service and up to several hundred television channels, together with ancillary data such as programming guide information, ticker feeds, score guides, etc. Through the cable receiver's output connection to the home network, the content is delivered to television sets, computers, and other devices. The head end will typically deliver CATV content to many thousands of individual households, each equipped with a compatible receiver.

Cable receivers are broadly available in many different hardware configurations. For example, an external cable receiver is often configured as a small box having one port connectable to a wall outlet delivering an RF signal, and one or more other ports connectable to appliances such as computers, televisions, and wireless routers or other network connections (e.g., 10/100/1,000 Mbps Ethernet). Other cable receivers are configured as circuit cards that may be inserted internally in a computer to similarly receive the signals from an RF wall outlet and deliver those signals to a computer, a television, or a network, etc. Still other cable receivers may be integrated into set-top boxes, such as the Motorola DCX3400 HD/DVR, M-Card Set-Top, which receives an input signal via an RF cable, decodes the RF signal to separate it into distinct channels or frequency bands providing individual content, and provides such content to a television or other audio or audiovisual device in a manner that permits users to each select among available content using the set top box.

As previously mentioned, the CATV transmission architecture has been modified to permit data to flow in both directions, i.e. data may flow not only from the head end to the viewer, but also from the viewer to the head end. To achieve this functionality, cable operators dedicate one spectrum of frequencies to deliver forward path signals from the head end to the viewer, and another (typically much smaller) spectrum of frequencies to deliver return path signals from the viewer to the head end. The components in the cable network have been modified so that they are capable of separating the forward path signals from the return path signals, and separately amplifying the signals from each respective direction in their associated frequency range.

FIG. 2 shows a Hybrid/Fiber Coax (HFC) cable network. A head end system 120 includes multiple devices for delivery of video and data services including EdgeQAMS (EQAMs) for video, cable modem termination systems (CMTS) for data, and other processing devices for control and management. These systems are connected to multiple fiber optic cables 100 that go to various neighborhood locations that each serve a smaller community. A fiber optic neighborhood node 130 is located between each fiber optic cable 120 and a corresponding trunk cable 140, which in turn is interconnected to the homes 160 through branch networks and feeder cables 150. Because the trunk cable 140, as well as the branch networks and feeder cables 150, each propagate RF signals using coaxial cable, the nodes 130 convert the optical signals to electrical signals that can be transmitted through a coaxial medium, i.e. copper wire. Similarly, when electrical signals from the home reach the node 130 over the coaxial medium, those signals are converted to optical signals and transmitted across the fiber optic cables 100 back to the systems at the head end 120. The trunk cables 140 and/or feeder cables 150 may include amplifiers 170. Connected to each trunk cable 140 is a branch network that connects to feeder cables (or taps) that each enter individual homes to connect to a respective cable receiver. This is generally referred to as Fiber-to-the-Neighborhood (FTTN) or Fiber-to-the-Curb (FTTC), depending on how close the optical nodes are to the viewer's home.

Hybrid fiber/coax networks generally have a bandwidth of approximately 500 MHz or more. Each television channel or other distinct content item transmitted along the forward path from the head end to a user may be assigned a separate frequency band, which as noted earlier has a typical spectral width of 6 MHz. Similarly, distinct content delivered along the return path from a user to the head end may similarly be assigned a separate frequency band, such as one having a spectral width of 6 MHz. In North America, the hybrid fiber/coax networks assign the frequency spectrum between 5 MHz and 42 MHz to propagate signals along the return path, and assign the frequency spectrum between 50 MHz and 750 MHz or more to propagate signals along the forward path.

Referring to FIG. 3, a cable modem termination system (CMTS) 200 may be installed at the head end, which instructs each of the cable modems when to transmit return path signals, such as Internet protocol (IP) based signals, and which frequency bands to use for return path transmissions.

The CMTS 200 demodulates the return path signals, translates them back into (IP) packets, and redirects them to a central switch 210. The central switch 210 redirects the IP packets to an IP router 220 for transmission across the Internet 230, and to the CMTS which modulates forward path signals for transmission across the hybrid fiber coax cables to the user's cable modem. The central switch 210 also sends information to, and receives information from, information servers 240 such as video servers. The central switch 210 also sends information to, and receives information from, a telephone switch 250 which is interconnected to the telephone network 260. In general, cable modems are designed to only receive from, and send signals to, the CMTS 200, and may not communicate directly with other cable modems networked through the head end.

Using this architecture, forward path signals from the head-end are broadcast to all cable modem users on the same network or sub-network. Each cable modem filters out the portion of the signal it needs, which may then be selectively provided to the user. Along the return path, each cable modem delivers a signal to the head end through the CATV network, and which occupies a part of a spectrum shared among other cable modems. Therefore, the system may regulate which modem's return path signal is delivered to the network at which time using time or frequency division multiple access (TDMA or FDMA), The modulation technique used to send data along the return path from the cable modem to the head end typically uses quadrature phase shift keying (QPSK) or lower order Quadrature Amplitude Modulation because of its relatively straightforward implementation and general resistance to the increased noise present along the return path direction. The modulation depth selected for the upstream link in any given network is based upon the noise levels within that particular network. Generally, modulation depths such as QPSK, 16QAM or 64QAM are used. 256 QAM or above are almost never used in a commercial system, rather this order of modulation is typically only used in experimental systems. The modulation technique used to send data along the forward path from the head end to the cable modem typically is Quadrature Amplitude Modulation (QAM), with a higher order modulation depth, typically 256 QAM, which is efficient, but not generally as noise-resistant as QPSK. Also, because the downstream spectrum is the same for every cable modem or set top box, there is no adjustment of the downstream depth of modulation based upon the performance of a single link. All CPE gear must operate at the lowest common level.

It is desirable to provide a robust hybrid fiber/coax system.

DETAILED DESCRIPTION

Figure 1:
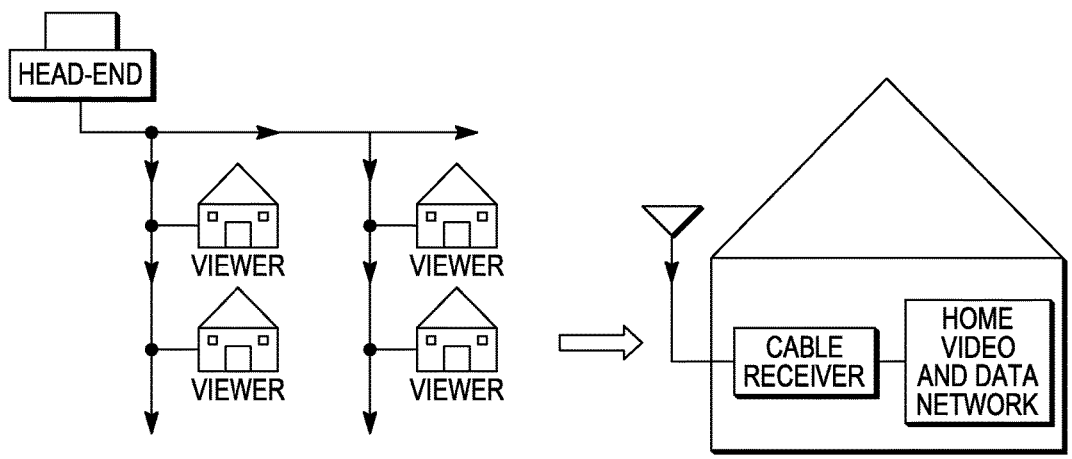
FIG. 1 shows an exemplary CATV network including a head end that delivers CATV content to a plurality of homes.
Figure 2:
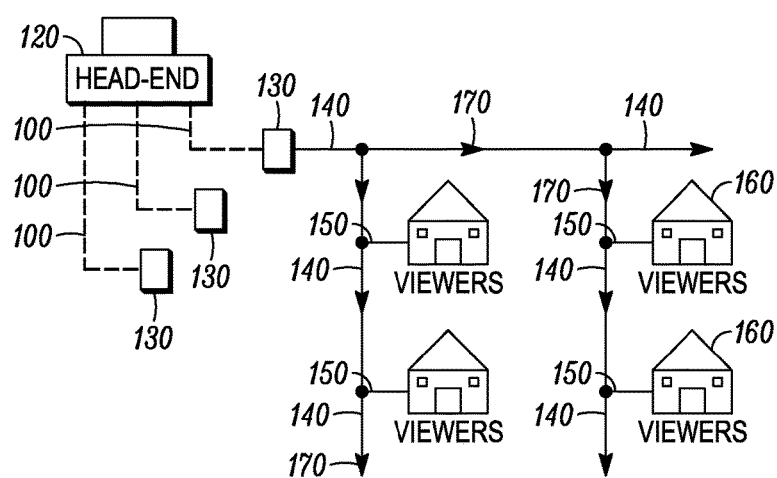
FIG. 2 shows an exemplary Hybrid/Fiber Coax CATV network, including a head end that delivers CATV content to a plurality of homes.
Figure 3:
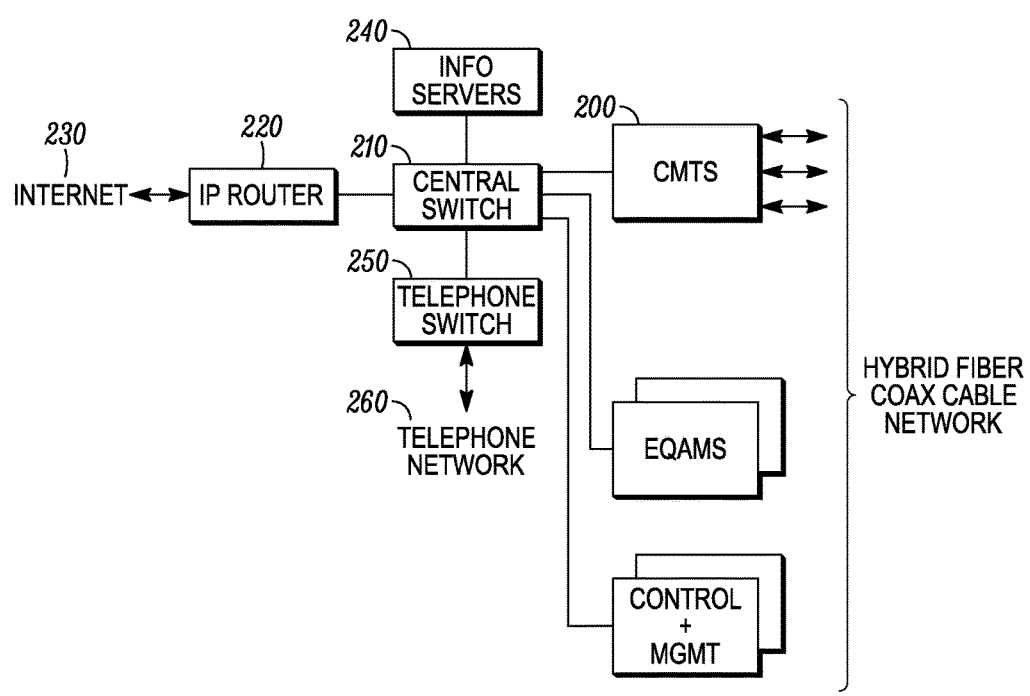
FIG. 3 shows an exemplary architecture of a head end, such as the ones shown in FIGS. 1 and 2.
Figure 4:
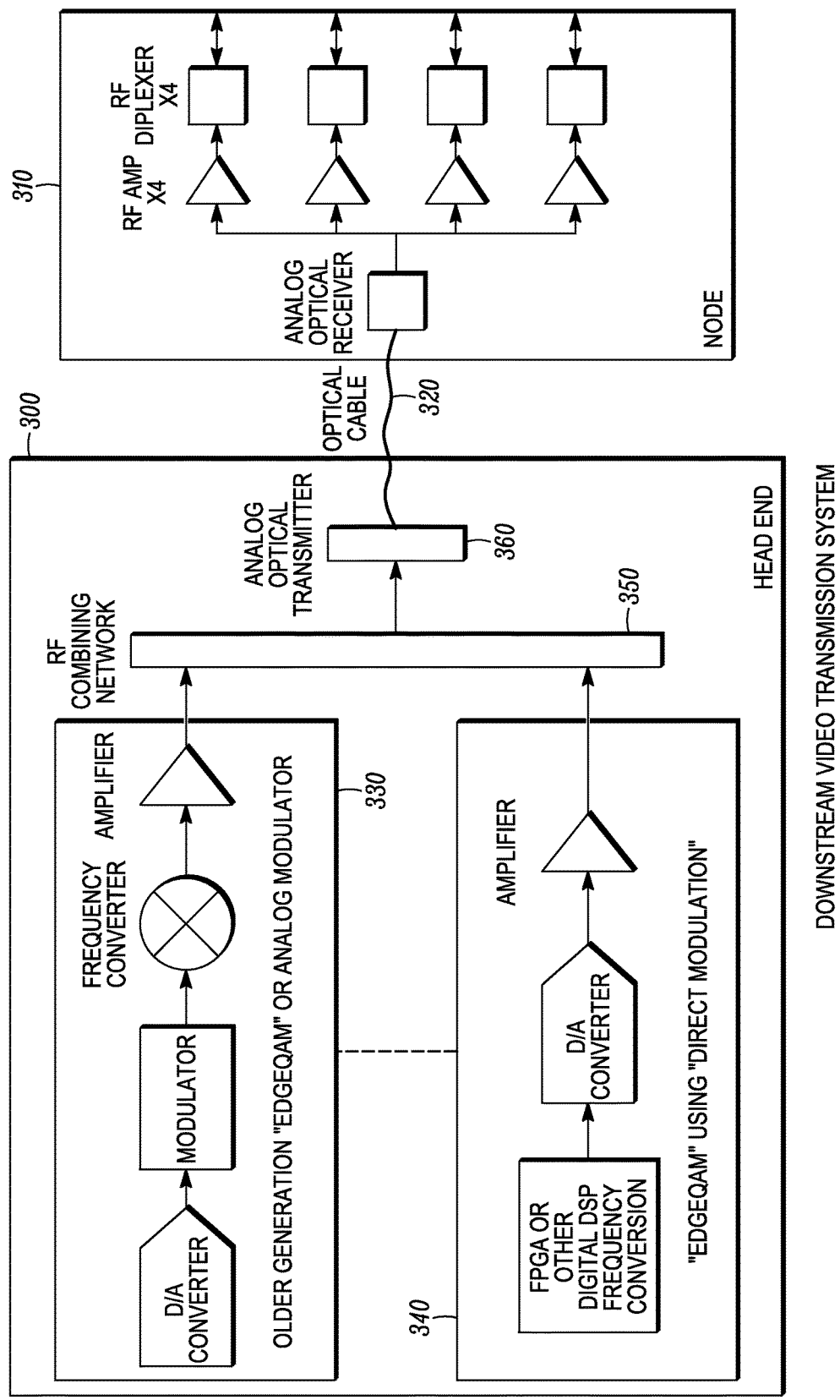
FIG. 4 shows an exemplary architecture of a head end communicating with a node along a forward path to deliver CATV content over a network.
Figure 5:
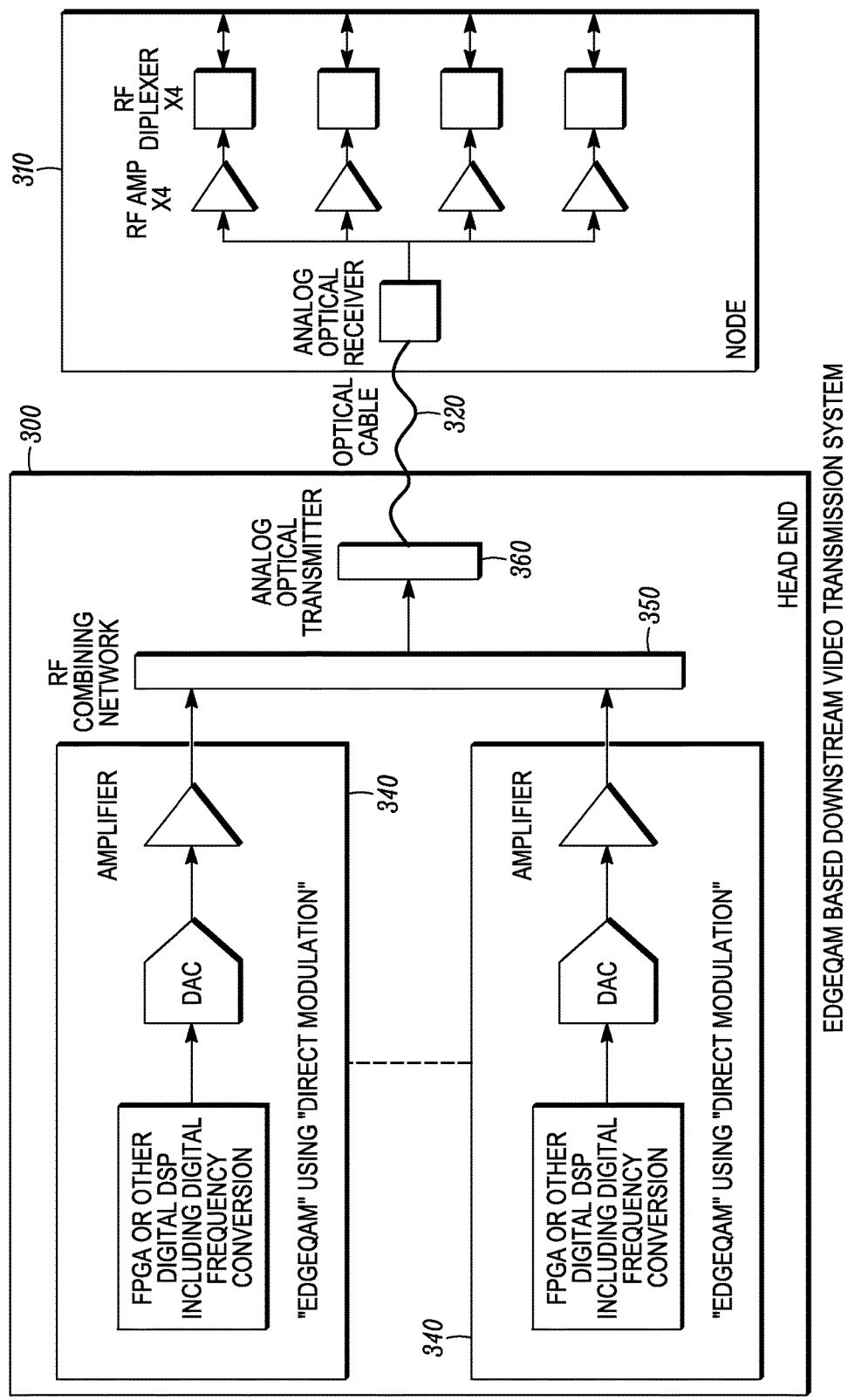
FIG. 5 shows an exemplary EdgeQAM architecture for a head end to communicate with a node along a forward path to deliver CATV content over a network.
Figure 6:
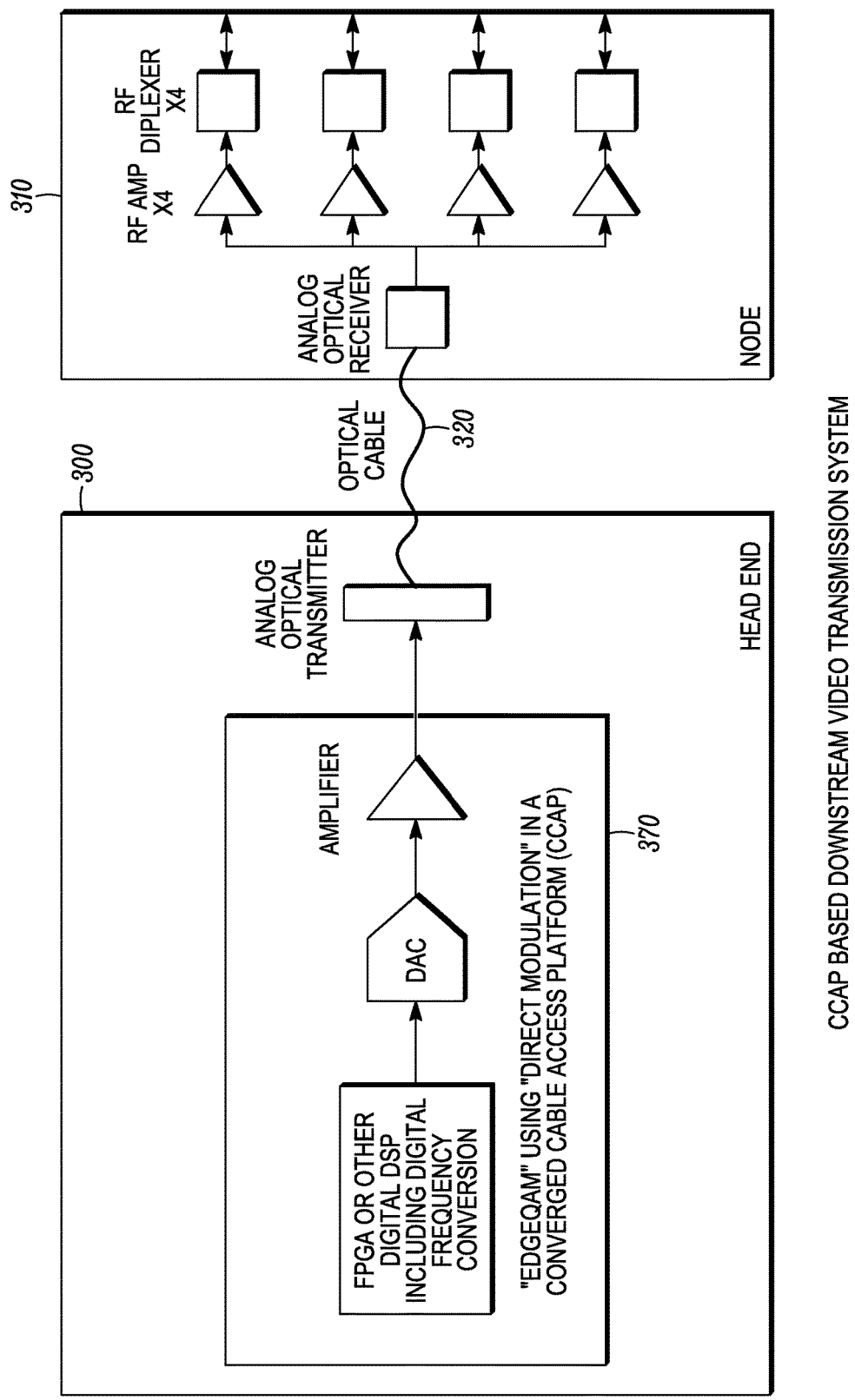
FIG. 6 shows an exemplary CCAP architecture for a head end to communicate with a node along a forward path to deliver CATV content over a network.

FIGS. 4-6 generally illustrate different architectures capable of transmitting many channels of CATV content along a fiber optic path between a head end and a node. The channels typically may be transmitted in the legacy analog TV format or as analog carriers modulated by digital means, such as Quadrature Amplitude Modulation (QAM). QAM is a technique that transmits different signals along a transmission path by using each signal to modulate the amplitude of a respective carrier wave, where the carrier waves of the respectively carried signals are out of phase with each other. Moreover, because the vast majority of channels arriving to the CATV head end are in a digital format, the head end in such architectures may also include one or more mixed signal converters to convert a digital signal to an analog one. The mixed signal conversion and signal modulation may be combined into a single hardware unit. For example, a typical EdgeQAM is a rack-mounted unit capable of not only performing Digital to Analog (D/A) conversion, but also modulating multiple signals using the QAM technique just described.

Referring specifically to FIG. 4, a head end 300 may include one or more signal generation units such as an analog modulator 330 and/or a direct modulation EdgeQAM 340. Each EdgeQAM unit 330 and/or 340, which preferably includes a Digital to Analog converter and an amplifier, receives digitally encoded video signals, audio signals, and/or IP signals and outputs an amplitude-modulated analog signal to an RF combining network 350, which in turn combines the received signals. An optical transmitter 360 then sends the entire spectrum of the frequency division multiplexed RF signals as an analog transmission through optical fiber 320 along a forward path to the node 310. In the specification, the drawings, and the claims, the terms "forward path" and "downstream" may be interchangeably used to refer to a path from a head end to a node, a node to an end-user, or a head end to an end user. Conversely, the terms "return path", "reverse path" and "upstream" may be interchangeably used to refer to a path from an end user to a node, a node to a head end, or an end user to a head end. Also, it should be understood that, unless stated otherwise, the term "head end" will also encompass a "hub," which is a smaller signal generation unit downstream from a head end, often used for community access channel insertion and other purposes, that generally mimics the functionality of a head end, but may typically not include equipment such as satellite dishes and telephone units. Hubs are commonly known to those skilled in the art of the present disclosure.

Referring to FIG. 5, a head end 300 may in some instances include a plurality of direct modulation EdgeQAM units 340 which each receive digitally encoded video signals, audio signals, and/or IP signals, and each directly outputs a spectrum of amplitude-modulated analog signal at a defined frequency or set of frequencies to an RF combining network 350, which in turn combines the received signals. An optical transmitter 360 then sends the entire spectrum of the multiplexed signals as an analog transmission through an optical fiber 320 along a forward path to the node 310. Directly-modulated EdgeQAM units have become increasingly sophisticated, offering successively higher densities, which in turn means that each EdgeQAM unit can process more channels of CATV data. For example, modern EdgeQAM modulation products can now simultaneously generate 32 or more channels on a single output port. With more channels being modulated per output port, the amount of combining required by the RF combining network 350 is reduced, with a corresponding simplification in the circuitry at the head end. The term 'QAM' is often used to interchangeably represent either: (1) a single channel typically 6 MHz wide that is Quadrature Amplitude Modulated (thus a "32 QAM system" is shorthand for a system with 32 Quadrature Amplitude Modulated channels; or (2) the depth of modulation used by the Quadrature Amplitude Modulation on a particular channel, e.g. 256 QAM means the signal is modulated to carry 8 bits per symbol while 4096 QAM means the signal is modulated to carry 12 bits per symbol. A higher QAM channel count or a higher QAM modulation means that a higher number of content "channels" can be delivered over a transmission network at a given standard of quality for audio, video, data, etc. QAM channels are constructed to be 6 MHz in bandwidth in North America, to be compatible with legacy analog TV channels and other existing CATV signals. However, more than one video program or cable modem system data stream may be digitally encoded within a single QAM channel. The term channel is unfortunately often used interchangeably, even though a QAM channel and a video program are not often the same entity—multiple video programs can be and usually are encoded within a single 6 MHz QAM channel. In this case, the modern EdgeQAM modulation products generate multiple instances of the 6 MHz bandwidth QAM channels. This simplifies the head end structure since some subset of the RF combining is now performed within the EdgeQAM units rather than in the external RF combining network. Packaging multiple QAM generators within a single package also offers some economic value.

FIG. 6 shows a converged cable access platform ("CCAP") system where a head unit 300 has an EdgeQAM unit 370 that generates all of the channels for an entire service group using a single D/A converter and a single amplifier. The purpose of the CCAP system is to combine the QAM functions and the CMTS functions in a single system in order to efficiently combine resources for video and data delivery.

Despite the recent advances in QAM architecture such as the ones just described, further expansion of CATV content transmitted by optical signals from a head end to a node is problematic. For instance, while optical signals are used ubiquitously in short-distance signal paths, optical dispersion caused by the optical fibers (the spatial distortion of an optical signal) tends to degrade a signal propagated over the large distances inherent in CATV delivery from a head end to a node. While modal dispersion, which results from the varying speeds at which light travels through different propagation mediums, can be eliminated by using single mode fiber, distortion still results from chromatic dispersion and/or polarization mode dispersion. Chromatic dispersion refers to the spreading of a light signal emitted at more than one wavelength, due to the differing propagation speeds at the respective wavelengths. Though some lasers can emit light in very narrow spectral bands, no laser can emit light at a single, monochromatic wavelength, hence chromatic dispersion will always occur. Polarization mode dispersion results from the difference in propagation constants of a fiber optic cable due to imperfections in its geometry. Dispersion is particularly limiting when seeking to expand CATV content delivered over a fiber optic cable using techniques such as wavelength division multiplexing (WDM), where dispersion causes interference between the multiplexed signals.

Another example of an impediment to CATV content expansion over long distances of fiber optic cable is laser jitter, which is the displacement of an optical signal's edge from its intended location. Though some jitter is deterministic, in the sense that it can be calculated and compensated for, other components of jitter may be caused by thermal noise (called Gaussian jitter) or other random effects.

Yet another example of an impediment to CATV content expansion over long distances of fiber optic cable is laser chirp. As a laser's current is changed to provide the signal being propagated, the laser's carrier density changes and therefore results in a time-dependent phase change, where variations in a signal output from a laser causes modulations in frequency.

Figure 7:
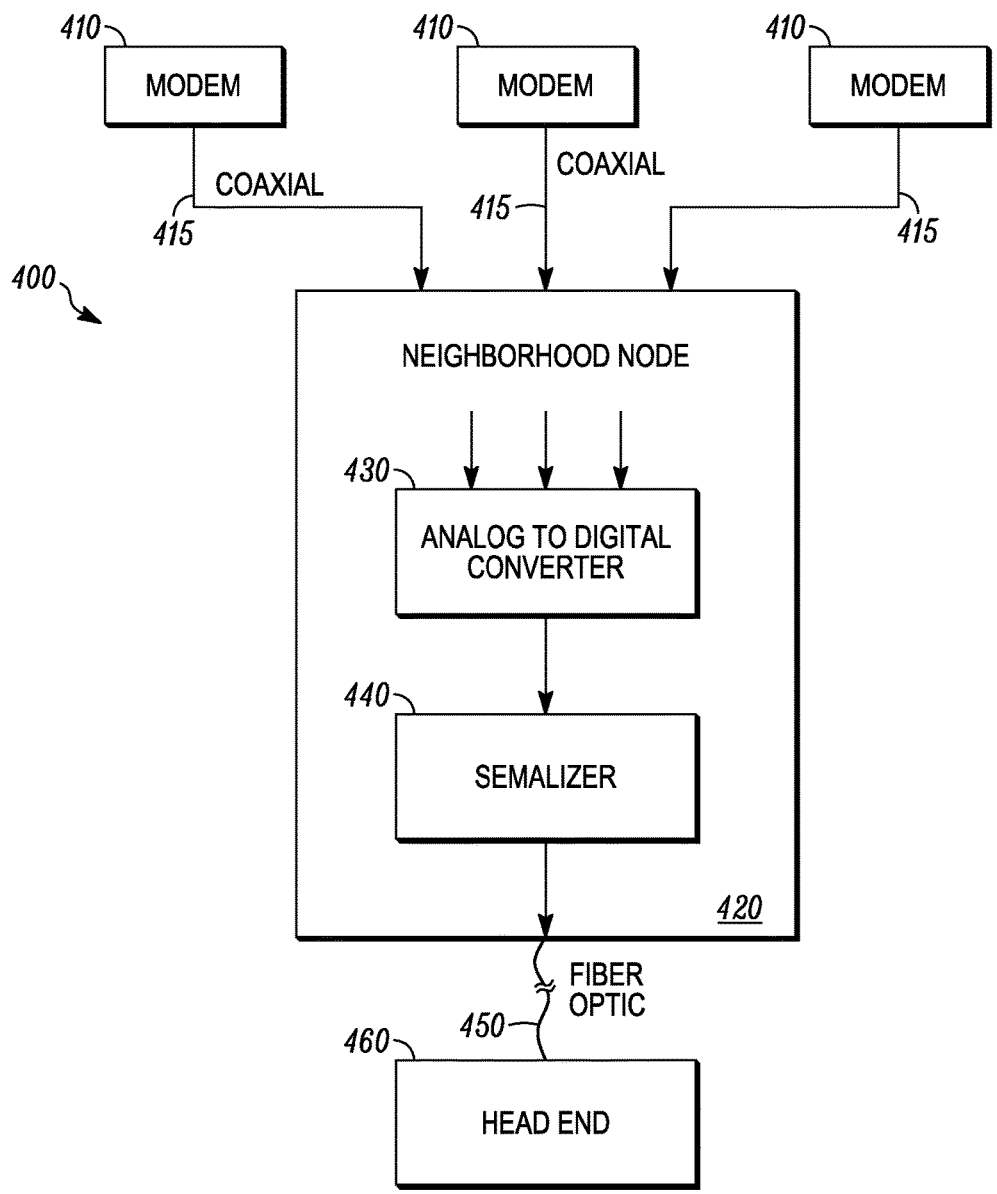
FIG. 7 shows an exemplary architecture of a neighborhood node that may facilitate communication from modems to a head unit along respective return paths.

While the foregoing challenges to delivering increasing amounts of CATV content over long distances of fiber optic cable are daunting, data transmission over the return path channel from the node to the head end has certain characteristics that minimize such obstacles, and digital transmission of the reverse path signal is a practical and relatively common technique used today. For example, return path required bandwidth is typically 85 MHz or less, SNR and power requirements are relatively low, and required signal quality is more relaxed for the return path. Accordingly, FIG. 7 shows a hybrid fiber/coaxial cable architecture 400 that propagates data along a return path from the cable modems 410 (including set top boxes) of each viewer, which are combined together at the neighborhood node 420 and forwarded to a head end 460. The neighborhood node 420 includes an Analog to Digital (A/D) converter 430 which receives the analog inputs from each of the cable modems 410 through respective coaxial cables 415 and outputs a digital optical signal. The output of the A/D converter 430 is serialized by a serializer 440 and sent over a fiber-optic transmission line 450 to the head end 460 where it is received by an optical receiver (not shown). The optical receiver may feed the received optical signal to a field-programmable gate array ("FPGA") where it is de-serialized and provided to the input of a Digital to Analog (D/A) converter. The original return path radio frequency ("RF") spectrum is recreated at the output of the D/A converter.

As indicated previously, while transmission of signals over fiber optic cable along a return path presents something of a challenge due to the obstacles of maintaining a coherent optical signal over great distances, these challenges are magnified may times over when transmitting optical signals over great distances along a forward path. Before turning to the specifics of the differences in design constraints between forward and return path transmission systems, it can be noted that the differences result from the different uses to which the forward path and return path are put, respectively. The forward path channel is designed to facilitate the transmission of a large number of channels requiring a high bandwidth over a long distance. In contrast, the return path channel is designed to facilitate the transmission of a much smaller set of signals, requiring much less bandwidth over a significantly shorter distance, at least initially from the home to the node, at considerably lower power levels.

To recite some specific differences in design constraints between the forward and return paths, the frequency ranges used for the forward path transmission and the return path transmission generally do not overlap, and they generally differ in scale by an order of magnitude or more. Typically, the bandwidth for the return path is assigned to a frequency range beginning at 5 MHz and typically extending to either 42 MHz, 65 MHz, or 85 MHz depending on system architecture. The bandwidth for the forward path, however, is typically assigned to a range beginning either at 50 MHz, 70 MHz, or 90 MHz and often extending to 1 GHz or more, again depending on the system architecture where the greater the bandwidth, the greater the channel carrying capacity. The significant bandwidth disparity traditionally limits the designs used for the architecture for propagating data along the forward and reverse paths, respectively.

The type of modulation used for transmissions along the forward and return paths, respectively, are generally different, not only because of the differing channel characteristics, but also differing signal to noise (SNR) requirements for the respective paths. The forward path SNR requirements are substantially more stringent than the SNR requirements for the return path. The return path modulation is typically at 64 QAM or below, and sometimes as low as QPSK for especially noisy environments which are often present in the return path channel. The forward path modulation is typically 256 QAM, 1024 QAM, or 4096 QAM which is suitable for less noisy environments which are often present in the downstream channel.

Moreover, the power requirements for the forward path are significantly different than the power requirements for the return path, principally due to the different frequency spectrums used by the two paths. When transmitting along the forward path, a head end typically uses the entire operating bandwidth available at its input in order to maximize the channel carrying capacity, thus while a forward path having 1 GHz of available bandwidth would typically use 950 MHz of that bandwidth, a return path having 42 MHz of available bandwidth would typically only use 35 MHz of that bandwidth, due to the inherent practical limitations of the return band structure, not discussed here. This represents a difference in per-channel power between the forward and return paths, respectively, of more than 14 db (27 times), which is significant when designing an architecture that maintains the power consumption of networked cable modems to modest levels.

Still further, the expected signal quality for the downstream channel is significantly higher than the expected signal quality for the upstream channel as the downstream channel must support broadcast video. In particular, it is undesirable to provide downstream signal transmissions that are prone to error since the user, who is watching the downstream content, is more likely to notice even those errors that occur over a very brief interval and thus such errors degrade the user's viewing experience. Conversely, an upstream transmission is not contemporaneously monitored by a user, hence an upstream transmission having a greater number of retransmissions to correct errors is not generally noticeable to the user because the retransmissions typically occur over too short an interval for the user to become aware of them. Also, even if a user's experience is adversely affected by errors in an upstream transmission, only one user is impacted. Still further, the downstream transmission is continuous in nature, while the upstream transmission is in a burst mode thereby sending data only on an as needed basis, thus relaxing the channel requirements for the burst mode is beneficial compared to the continuous transmission mode. Similarly, the system power losses are much higher for the downstream channel than for the upstream channel, principally due to the frequencies being used.

Existing optical transmission systems used to provide television channels to users along a forward path primarily use an optical wavelength of ~1310 nm. This is the region where the dispersion is at its minimum for standard single mode fiber, such as G.652 type of fiber. One approach that might better utilize the fiber assets is to use a technique called Wavelength Division Multiplexing (WDM) that allows multiple optical channels—"colors"—to carry distinct signaling on the same fiber. Generally, WDM systems are categorized as either Coarse Wave Division Multiplexing (CWDM) or Dense Wave Division Multiplexing (DWDM). Fundamentally, the difference between CWDM and DWDM is the spacing between the wavelengths and consequently the number of wavelengths that can be carried within a given wavelength window. DWDM has much tighter wavelength spacing and in turn allows the operator to carry more wavelengths in a given fiber. The 1310 nm transmission channel, generally does not lend itself to DWDM of existing CATV signal because of the modulation induced chirp of the laser itself, which is generally intensity modulated by means of directly varying the electrical current to the laser diode. This approach, while very efficient, not only intensity modulates the optical output, but also frequency modulates the same output. This causes broadening of the optical spectrum. In conventional glass optical fiber as generally installed today, this is not normally a problem, since the fiber has a very low dispersion characteristic in the area close to the 1310 nm wavelength. However, this spectral broadening does limit the number of channels that might be Wavelength Division Multiplexed due to their wide spectral bandwidth. While the operating range ~1550 nm is more appropriate for DWDM, dispersion of light in fiber is greater at this wavelength than in the 1310 nm region Typically, signal loss is ~0.35 dB per km at 1310 nm and ~0.20 dB per km at 1550 nm. For long distance transmission, such as telephony and digital data, it is advantageous to use 1550 nm. However, special techniques must be used to minimize the spectral spreading of the optical signal at these wavelengths so that the dispersion effects are minimized. While generally ~1550 nm centered technologies lend themselves to existing transmission architectures used in CATV systems, generally they are marginally performing and expensive. In addition, Erbium Doped Fiber Amplifiers (EDFA) are generally designed to operate in the 1550 nm region and are often required in practice in order to overcome the power losses associated with the multiplexing required in order to build a DWDM transmission system.

In light of these deficiencies in existing architectures for delivering CATV content, the present disclosure considers it preferable to use digital baseband transmission over the optical fiber portion of the CATV network to maintain the advantages associated with the capability of transmitting such signals a substantial distance, while still providing for analog RF output for the coaxial portions of the cable television network to maintain compatibility with existing coaxial distribution portions of the system. Further, such a system should be structured in such a manner to not only provide for digital transmission over the optical fiber, but reduce the changes required for existing nodes, which are numerous in nature. Moreover, the technique should be agnostic to the analog signals to be distributed through the coaxial cables.

Figure 8:
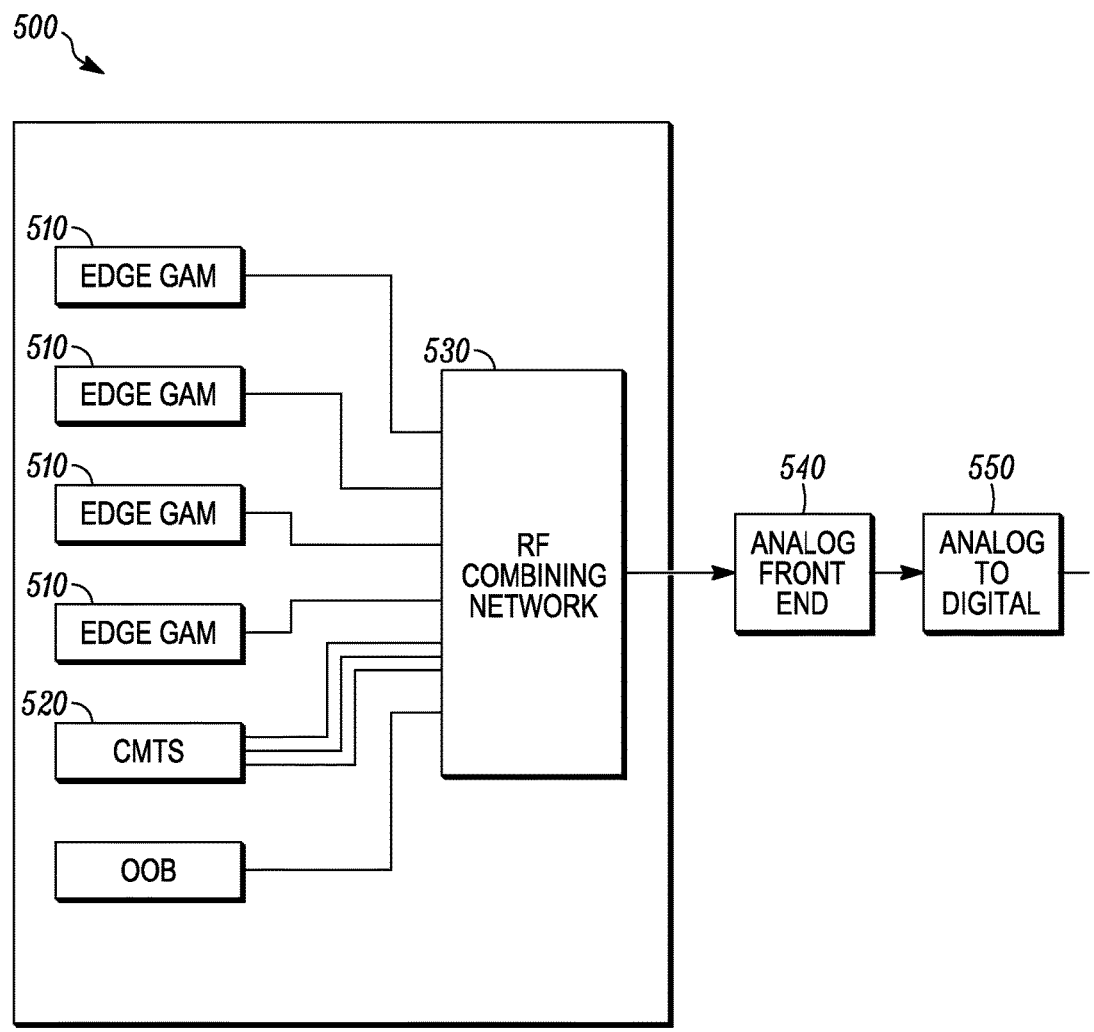
FIG. 8 shows an exemplary first stage of an improved CATV transmitter in a head end that converts an analog CATV signal to a digital signal.

Referring to FIG. 8, rather than having the head end of the system provide an analog signal to the optical fiber, it is desirable for the head end to provide a digital signal to the optical fiber along a forward path to a remote node (or hub), which may be located a great distance from the head end along the fiber optic network, such as distances several tens or kilometers away, or further. At the remote node, the digital signal is received and a digital to analog converter is used to reconstruct the original analog signals. The reconstructed analog signal is then passed onto the coaxial cable portions of the system, which may otherwise remain unchanged. Accordingly, the D/A conversion function that would have otherwise resulted in an analog signal transmission across the fiber network is moved from inside the CATV head end to the remote node which is at a location remote from the head end, with all digital transmission between the two. The digital processing for modulation, frequency conversion, and the other aspects are still performed by the CATV head end. But, the conversion from digital to analog for distribution is now performed in the node. Digital transmission across the optical fiber allows for longer transmission reach, with the possibility of reducing the number of head ends and consolidating modulation equipment that might be underused. For the digital transmission WDM techniques may be used at 1310 nm for a limited number of optical wavelengths. This allows for transmission to a node multiple optical transmission channels on a single fiber, which in turn allows for the node to be logically split into smaller service areas. This effectively increases the usable bandwidth available per customer, especially for IP data use.

1550 nm digital transmission using WDM techniques may likewise be used, such as providing over 50 optical channels on a single fiber, to transmit digital data from the head end to the node. The lower loss of the fiber at 1550 nm increases the transmission distance, as compared to 1310 nm, allowing for additional consolidation or offering of additional services. Also, digital transmission fiber optic equipment is generally more forgiving of operating conditions and is easier to install and less expensive to maintain than analog digital transmission fiber optic equipment.

The head end may include, for example, a system 500 of a transmitter that includes existing EdgeQAM modulators 510 and a Cable Modem Termination System (CMTS) unit 520. The first stage 500 of the transmitter may also preferable include integrated up-converters and out of band (OOB) modules for set top box control and plant management. The RF combining network 530 may preferably include passive and/or active analog RF power combiners to produce a composite analog signal across the spectrum, such as 50 MHz to 1 GHz or more. Today, the RF combining network 530 sends the output to an analog transmitter (not shown) which amplitude modulates a laser with the desired spectrum. This analog transmitter is typically optimized for linearity and a low signal to noise ratio, and preferably there is a substantially linear relationship between the RF power applied to the input of the transmitter and the optical power at the output of the transmitter. While this analog transmitter may be used as part of the system that provides a digital signal to the fiber optical cables, it is preferable to remove this transmitter and replace it with a modified analog front end having different characteristics.

A modified analog front end 540 may be used to adjust the composite level of the output of the RF combining network 530 so that substantially the full scale of the input of the analog to digital converter is utilized, without regard to the channel plan, the output levels of the various sources, and the losses through the RF combining network. The analog front end 540 may also provide impedance transformations and/or balanced single ended to differential conversions to interface to the analog to digital front end. The analog front end 540 may include, for example, a combination of RF amplifiers, RF attenuators, RF power detectors, and passive and/or active components for filtering and/or matching.

An analog to digital (A/D) converter 550 receives a modified analog signal from the analog front end 540 and converts it to a digital signal. The analog to digital converter 550 preferably has a minimum frequency range that is sufficient to cover the RF band of interest, such as 50 MHZ, 60 MHZ, or 85 MHz to a high frequency of 1.2 GHz or more and must be sampled at a rate of at least twice the maximum frequency of interest. The analog to digital converter 550 also preferably has a bit depth of between at least 8 bits and 12 bits. From an RF performance perspective, using the maximum number of bits available would be preferable. The design trade-off is that a greater bit depth, or resolution, will require a higher digital signal transmission rate through the optical fiber and the terminal equipment at each end of that fiber.

Figure 9:
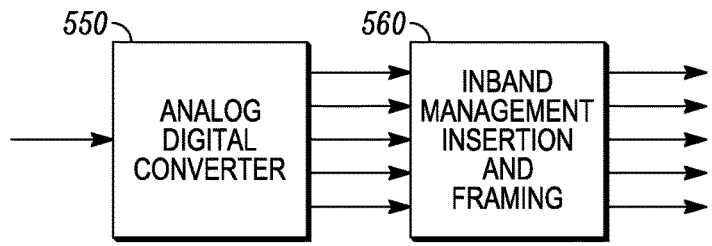
FIG. 9 shows a first output interface optionally used in the transmitter of FIG. 8.

Referring to FIG. 9, the output of the analog to digital converter 550 may include a parallel set of high speed serial interfaces which are reformatted into a parallel bus which may be efficiently processed by a digital subsystem. At this point, any unwanted bits may be discarded, the data may be formatted, and any desired in-band management control words are added to the data stream by in-band management module 560. In addition, any required framing, formatting or data delimiters would be controlled by the in-band management subsystem. This function may also be integrated with the 64b/66b encoding block, or separately from any of the specific functional blocks described herein. These approaches are well understood by anyone skilled in the art.

Figure 10:
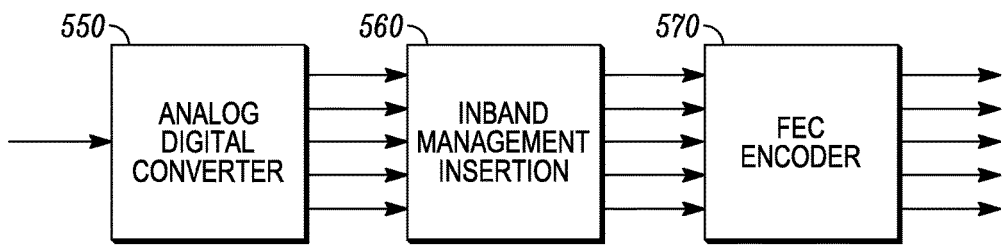
FIG. 10 shows a second output interface optionally used in the transmitter of FIG. 8, which includes a Forward Error Correction (FEC) encoder.

Referring to FIG. 10, Forward Error Correction module 570 may be used to reduce the number of unrecoverable transmission errors by FEC encoding bits of the bit stream. The forward error correction may be used at any suitable location before the bits are transmitted down the optical fiber. For example, though FIG. 10 shows the FEC encoder 570 as receiving an input from in-band management module 560, alternative embodiments may place the FEC encoder 570 between the A/D converter 550 and the in-band management module 560, or in embodiments lacking in-band management module 560, the FEC encoder 570 may simply receive data through the serial bus from the A/D converter and pass the data on after FEC correction information is inserted. Any suitable type of FEC may be selected, such as correction based upon the channel model for the system, the amount of FEC gain desired for a particular application, and the amount of overhead that can be tolerated due to efficiency requirements.

Figure 11:
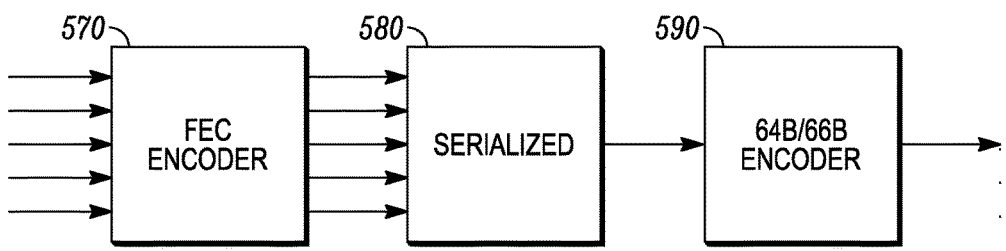
FIG. 11 shows an exemplary serializer that may be used in the transmitter of FIG. 8.

Referring to FIG. 11, the digital processing system may in some embodiments include a serializer 580 that serializes the data and/or an encoding scheme such as the industry standard 64b/66b encoder format 590 that performs 64b/66b encoding. The data is serialized in order to provide the proper format for baseband Non-Return to Zero (NRZ) transmission over the optical fiber. The 64b/66b encoding is an encoding scheme used in order to increase the transition density of the signal on the line and in order to make it easier for a receiving clock data recovery ("CDR") (shown in FIG. 12) to lock onto the incoming signal and in order for the CDR to more easily maintain lock during varying data patterns by reducing the length of consecutive logic "1s" or logic "0s" on the optical fiber. The serializer 580 and the 64b/66b encoder may each be used at any suitable location before the bits are transmitted down the optical fiber. For example, though FIG. 11 shows the serializer 580 receiving an input from the FEC encoder 570, and the 64b/66b encoder 590 as receiving an input from the serializer 580, alternative embodiments may place the 64b/66b encoder 590 between the FEC encoder 570 and the serializer 580.

Figure 12:
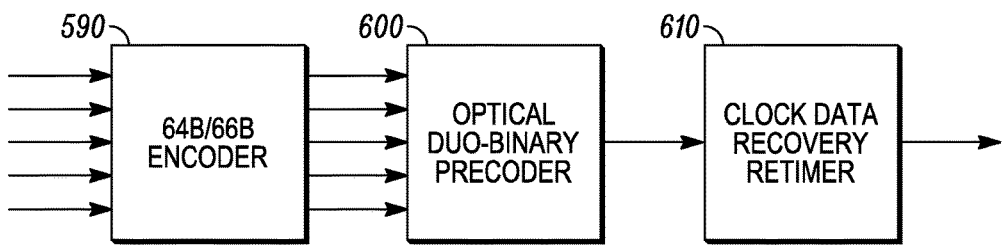
FIGS. 12 and 13 show an exemplary ODB precoder that may be used in the transmitter of FIG. 8.
Figure 13:
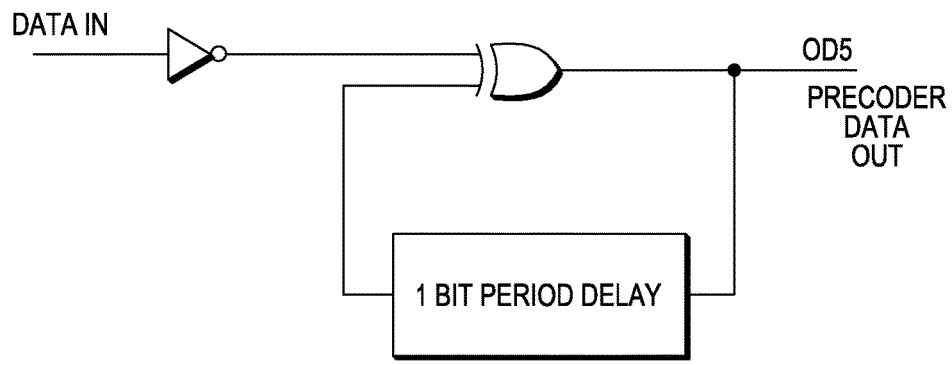

Referring to FIG. 12, the digital processing subsystem may further prepare the data for optical transmission. An optical duo-binary ("ODB") precoder 600 may be used to reduce the dispersion penalty in high speed NRZ optical transmission systems, particularly when operating in the 1550 nm region. While ODB maybe omitted, the use of ODB effectively doubles the size of the distance operating window as a function of dispersion. Typically, ODB would not be used when operating in the 1310 nm region. The line rate required on the digital link to transfer the data depends upon the sampling rate, ADC bit depth, and the amount of FEC gain. A typical operating condition would be to sample at 2.5 GS/s, with a bit depth of 10 bits, which yields a line rate of 25 Gbps. The overhead of the 64b/66b encoding is extremely small. A typical amount of FEC overhead for such a system would be 3 Gbps, such that when FEC is used, the total line rate required would be approximately 28 Gbps. When operating at data rates in the range of 25 Gbps or 28 Gbps, the dispersion is very significant relative to the width of a single bit, and consequently a dispersion penalty reduction technique such as ODB is preferably used for longer fiber optical length. FIG. 13 illustrates a logical implementation of the ODB pre-coding function. The ODB pre-coding coding may also be referred to as an ODB differential encoder. The physical implementation tends to vary based upon the device technology used.

Figure 14:
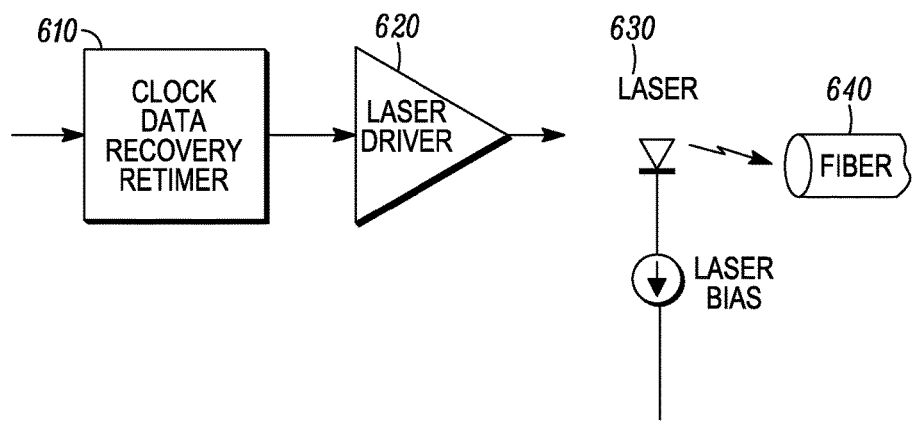
FIG. 14 shows a first exemplary laser transmitter that may be used on the transmitter of FIG. 8.

Referring again to FIG. 12 as well as FIG. 14, after the ODB pre-coding is completed, a clock/data recovery ("CDR") retimer 610 may be used to reduce the jitter, noise and distortion on the data waveform prior to optical transmission. The CDR retimer 610 tends to also reduce the Bit Error Rates as distance and optical loss in the fiber link increases. The digital signal is provided to the optical fiber 640 in a suitable manner, such as a directly modulated laser 630 for O-band modulation and/or an externally modulated laser (shown in FIG. 15) for the C-Band. In the case of the directly modulated laser transmitter, the output of the CDR retime 610 may connect to a laser driver 620 which would, in turn, directly drive the modulation current through the laser 630. The laser bias current source may be either internal or external to the modulation driver 620. Both the laser driver modulation current and the laser bias current may be adjusted to compensate for variations between lasers, temperature, and aging effects. The output of the laser 630 may be coupled to the optical fiber 640 for transmission where it may or may not be combined with other signals.

Figure 15:
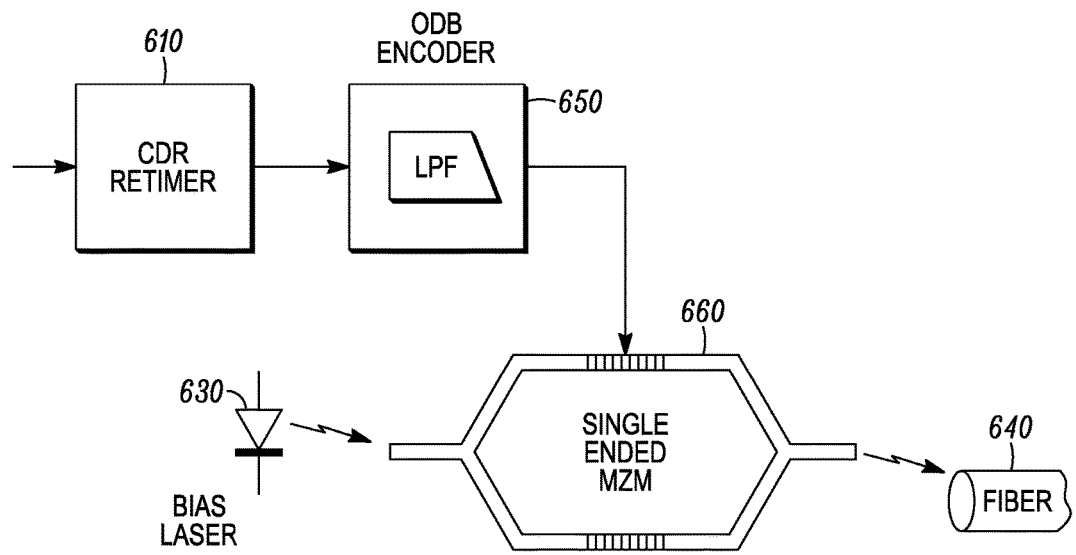
FIG. 15 shows a second exemplary laser transmitter that may be used on the transmitter of FIG. 8.

Referring to FIG. 15, a topology for an externally modulated Laser transmitter with Optical Duo Binary encoding is illustrated. Typically, a C-Band Laser transmitter would be externally modulated, with the source laser held at constant intensity to minimize frequency modulation of the source. The external modulator varies its optical loss in response to the applied electrical signal, thereby varying the intensity of the optical signal without causing frequency modulation sidebands which broaden the optical spectrum of the signal. In the case of an ODB encoded signal, the ODB encoder itself would typically consist of a Low Pass Filter ("LPF") 650 with a cutoff frequency that is approximately one half of the fundamental frequency of the bit rate. For example, an ODB encoded 10 Gbps signal would have a fundamental frequency of 5 GHz and would utilize an LPF with a cutoff frequency of approximately 2.5 GHz. The exact cutoff frequency that is "ideal" for transmission is related to the frequency response, for example, of a Mach-Zehnder Modulator 660 that is being used. Preferably, the filter 650 is a brick wall type filter, but any other suitable filter may be used. The filter 650 converts the two level digital data stream which has been ODB pre-coded to a true three level ODB encoded signal which is capable of driving a Mach-Zehnder Interferometer through the three optical modulation states: 180°, 0°, and −180°.

Figure 16:
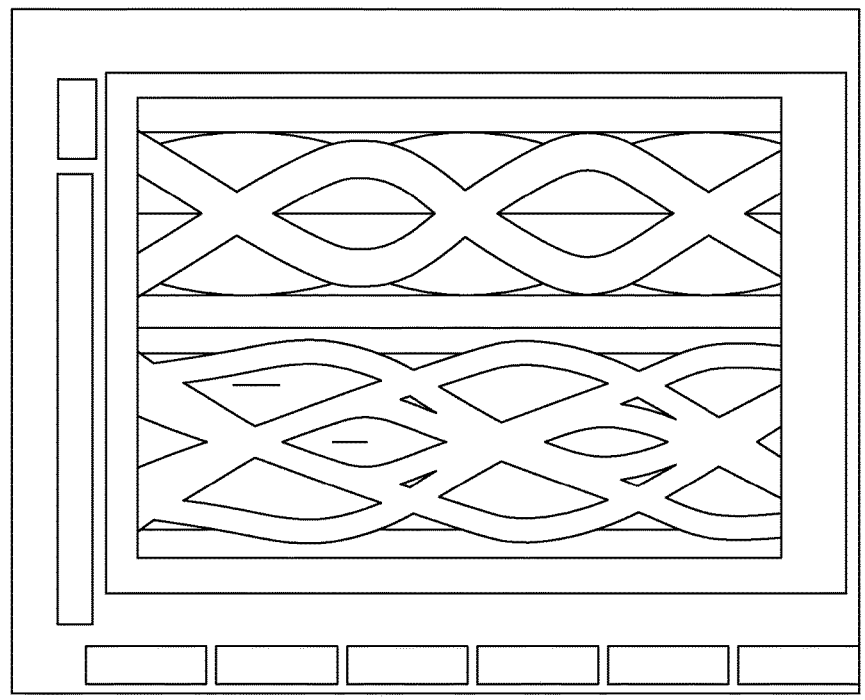
FIG. 16 shows a three-state ODB encoded electrical eye diagram.

Referring to FIG. 16, an exemplary three state ODB encoded electrical eye diagram is illustrated. In addition to the ODB encoding filter, typically an RF gain stage is included between the output of the CDR 610 and the input of the Mach-Zehnder Modulator 660. The Mach-Zehnder typically uses relatively high signal amplitudes, which when combined with the insertion loss of the encoding filter and any associated connections, traces, cables and matching circuits may require this RF gain stage. The three level ODB encoded signal is applied to one of the inputs of the Mach-Zehnder modulator 660 while the other input is typically biased at the midpoint of the logical switching level. A fixed bias Laser 630 is also provided to provide the optical carrier which is modulated through the interferometer. This Laser 630 may be external to the modulator, or included in the device. The three modulation states create either constructive or destructive interference through the interferometer. At the output of the modulator 660, an amplitude modulated digital stream which corresponds with the original data stream, prior to ODB pre-coding, will appear with states of light that are either low power, with a phase state of 0° that corresponds to a logic "0", or a high power output which corresponds to a phase state of either −180° or 180° and corresponds to a logic state of "1". In the circumstance that a receiver on the other end of the optical fiber 540 is a direct-detect receiver, as opposed to a coherent receiver, only the magnitude of the light would be recognized, and the phase state ignored, effectively creating a magnitude output.

Consequently, the Mach-Zehnder Modulator 660 serves as a logical XOR gate and performs the ODB decoding function prior to transmission of the optical signal. However, due to the three state nature of the encoding, the bandwidth of the modulating signal prior to decoding is half of the bandwidth of the original bit stream, thereby significantly reducing the spectral spreading of the laser 630 due to modulation and in turn significantly reducing the dispersion penalty of the system. In the case where ODB is not utilized, but where an externally modulated Laser is used, the ODB encoding filter may be removed, and a RF gain stage may be used, and the Mach-Zehnder Modulator 660 may either be driven single ended or differentially.

Figure 17:
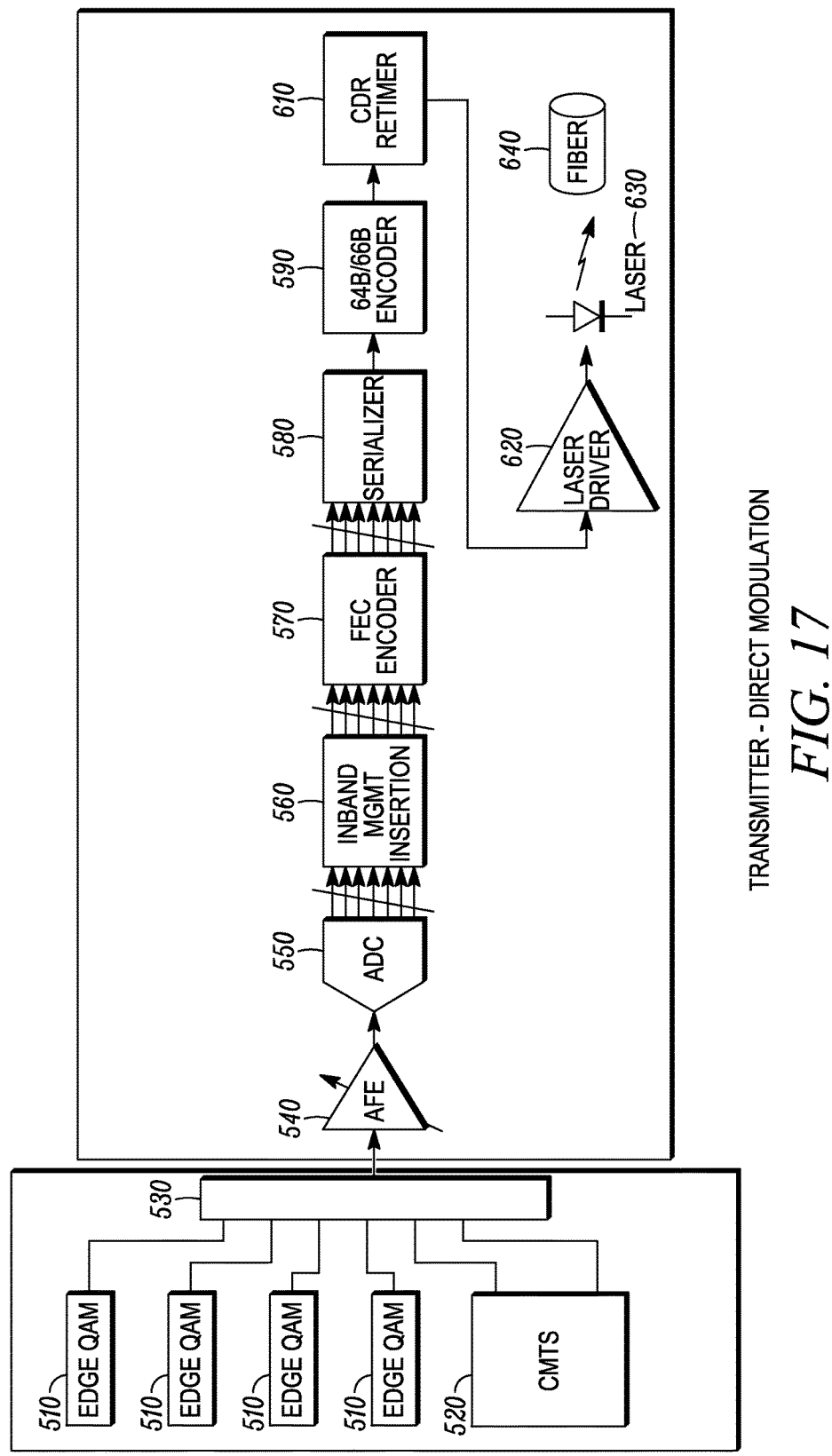
FIG. 17 shows an exemplary transmitter of FIG. 8 having direct modulation.
Figure 18:
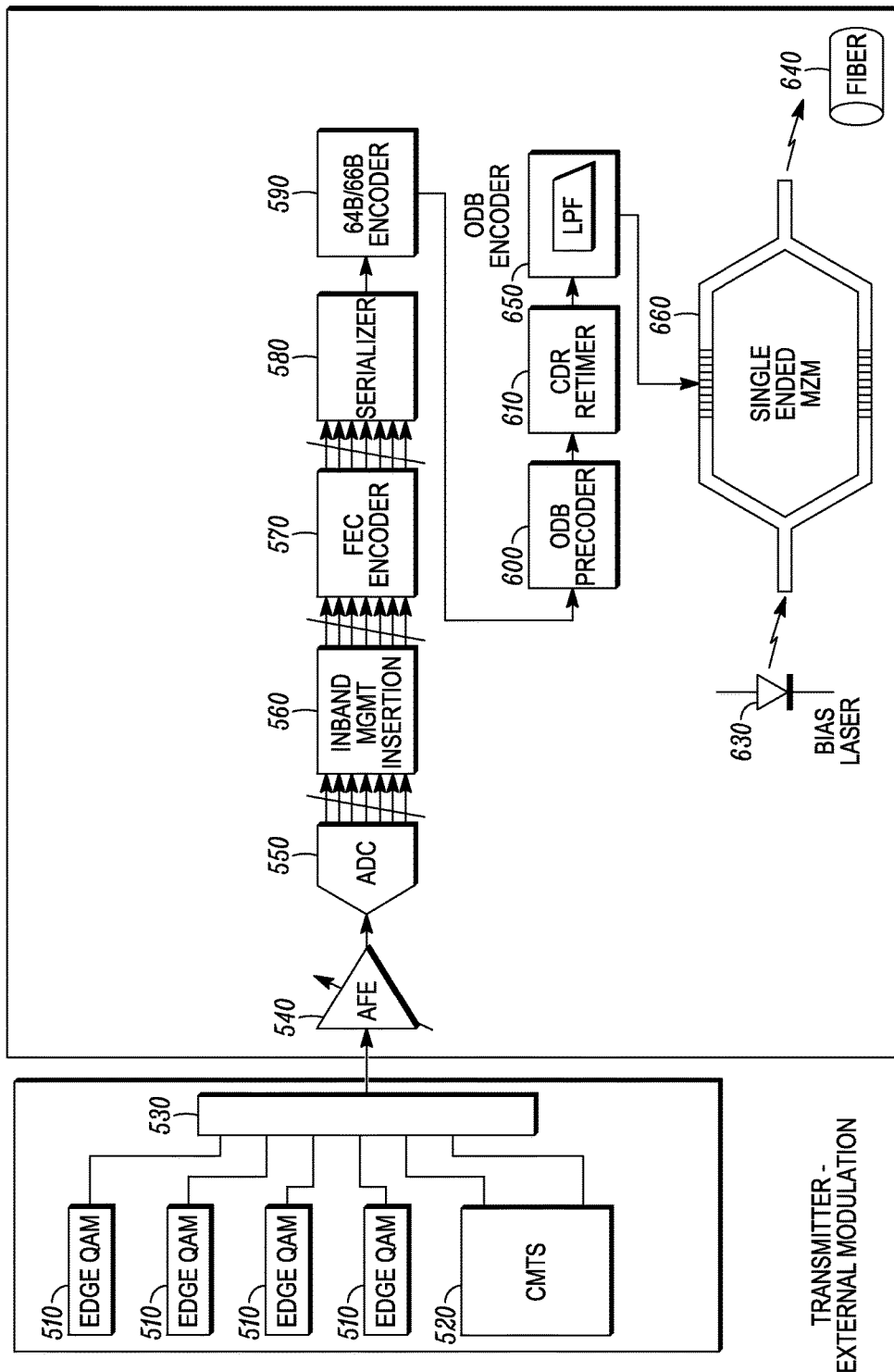
FIG. 18 shows an exemplary transmitter of FIG. 8 having optical duo binary modulation.

FIGS. 17 and 18 show respective exemplary resulting head-end systems when using direct modulation (FIG. 17) and when using external modulation (FIG. 18). In either system, the entire downstream RF spectrum used in a CATV head end is provided to a transmitter which samples it with a broadband Analog to Digital converter covering the entire spectrum, even if a portion of the spectrum is not currently being used for a particular transmission. The samples are then serialized, transmitted over a base band digital link, and then reformatted to feed a Digital to Analog converter at the remote node. The net result of this process is that the full RF spectrum is recreated at the remote receiver. With such architecture, the physical reach of the system is increased and the dependency between the link length and limiting analog performance metrics are removed. Further, the fiber may be used to carry more wavelengths than are possible with analog transmission and these wavelengths can use standard ITU grid frequencies as they demonstrate substantially less interference than with analog waveforms. Since the encoded spectrum includes the full spectrum, the need for complicated intelligent up-conversion technology is not required at the node. This enables the system to be agnostic of the analog modulation (single carrier QAM, OFDM, . . . ) or of the protocols used for the original signals. This separation of the transmission system from the signal formats means that it can support future changes in signals without modification; giving it a major advantage over systems based on knowledge of the signaling format.

The discussions up to this point have shown how the system can be retrofitted into an existing infrastructure. In cases where the installation of the digital communication over the fiber does not require the re-use of existing deployments, such as a Converged Cable Access Platform (CCAP), or in cases where the existing architecture is being overhauled (head end to node consolidation or elimination of selected hubs), a modified version of the transmitter architecture may be used. In this case, all of the broadcast, narrowcast, VOD, IPTV, DOCSIS, or other content signals are combined prior to the transmission stage and are preferably included as IP traffic to provide a more efficient solution.

Figure 19:
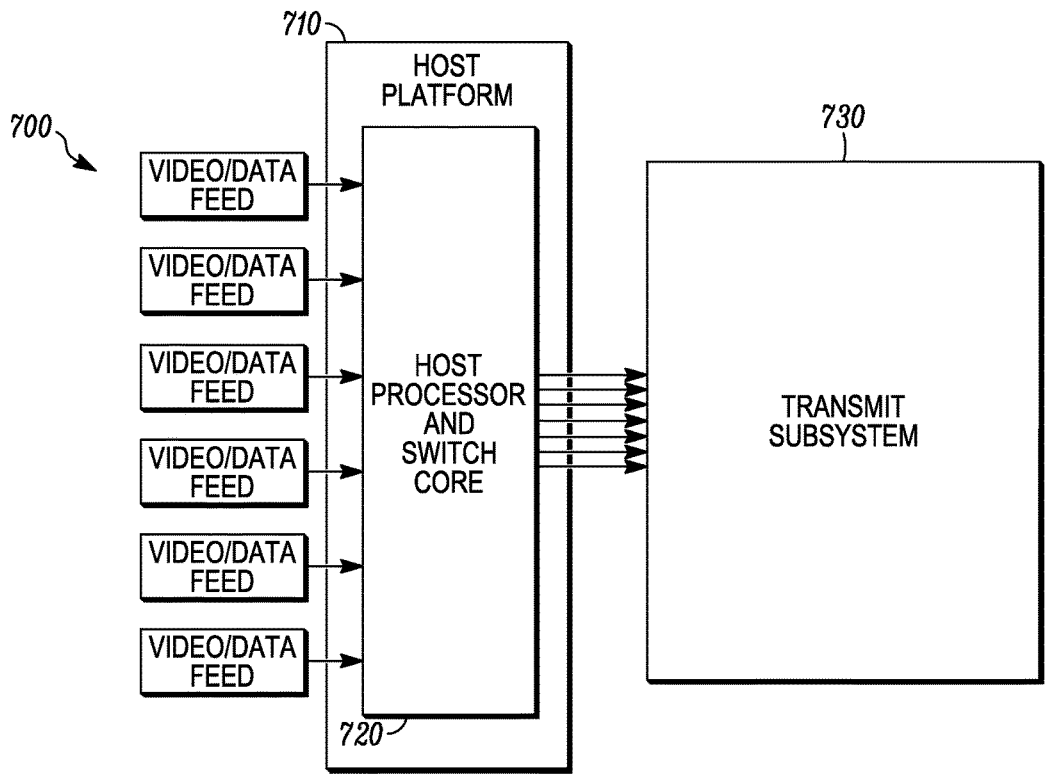
FIG. 19 shows a host platform and a transmit subsystem.

Referring to FIG. 19, video and data feeds 700 may enter a host platform 710 from a variety of locations, and may preferably be carried on 10 GbE connections. Inside the host platform 710, the video and data traffic is routed to the appropriate transmit subsystem such as the subsystem 730 by a host processor and switch core 720. A transmit subsystem is typically where all of the MAC functions would be located for the data traffic, and any kind of video replication or encryption would take place. It should be understood that, although FIG. 19 shows only a single exemplary transmit subsystem 730, there will typically be quite a number of such subsystems that the switch core 720 routes data among, and in such a circumstance, the host platform 710 may include one transmit subsystem 730 for each RF spectrum's worth of data and video. In this manner, the system is readily scalable to additional RF spectrum's by the inclusion of additional parallel transmit subsystems. If the transmit subsystem is located in a separate box or chassis, as specifically illustrated in FIG. 19, then an external communication standard such as 10 GbE may be used. In this external case, the data connection to the transmit subsystem would likely include groomed traffic, due to the fact that all of the data and video combining and routing has already occurred within the host platform. Preferably, however, the transmit subsystem may be located on a card within the host platform 710, and an inter-IC communication standard such as 10 gigabit media independent interface ("XAUI") may be employed.

Figure 20:
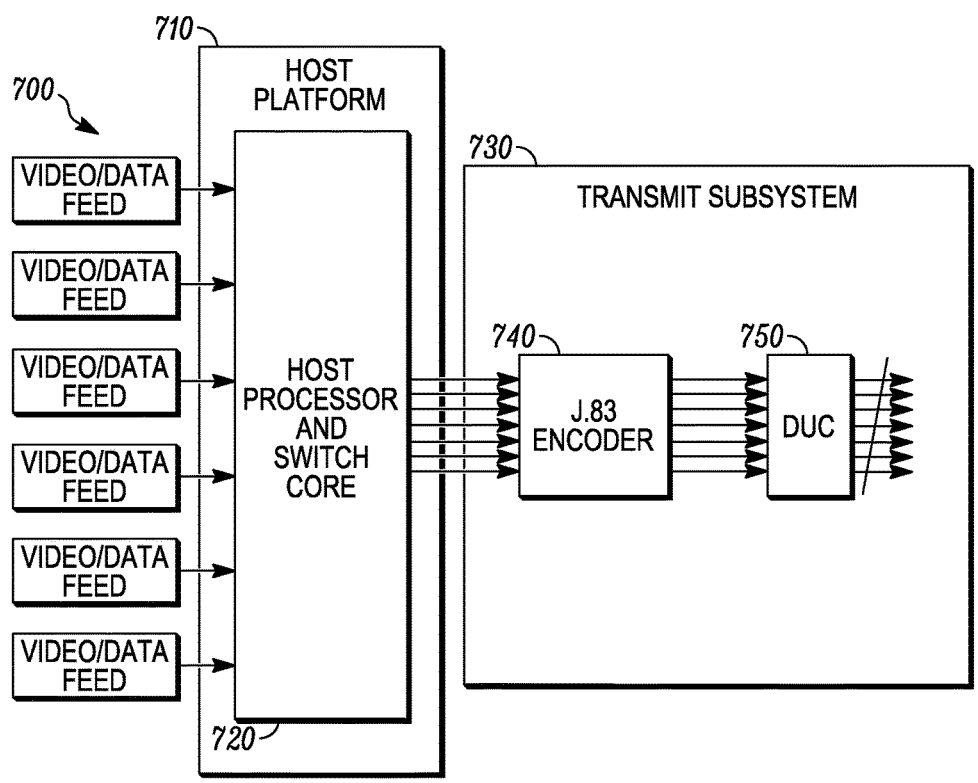
FIG. 20 shows the host platform and transmission subsystem of FIG. 19 together with an encoder and a DUC.
Figure 21:
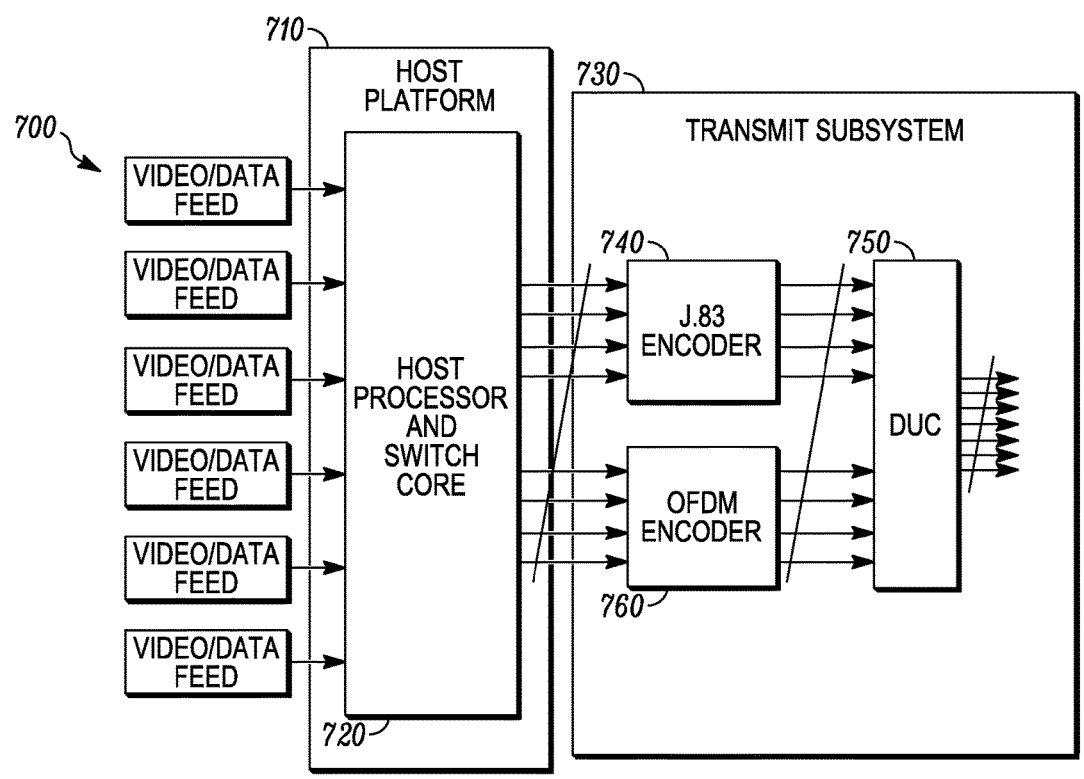
FIG. 21 shows the host platform and transmission subsystem of FIG. 19 with multiple encoders and a DUC.
Figure 22:
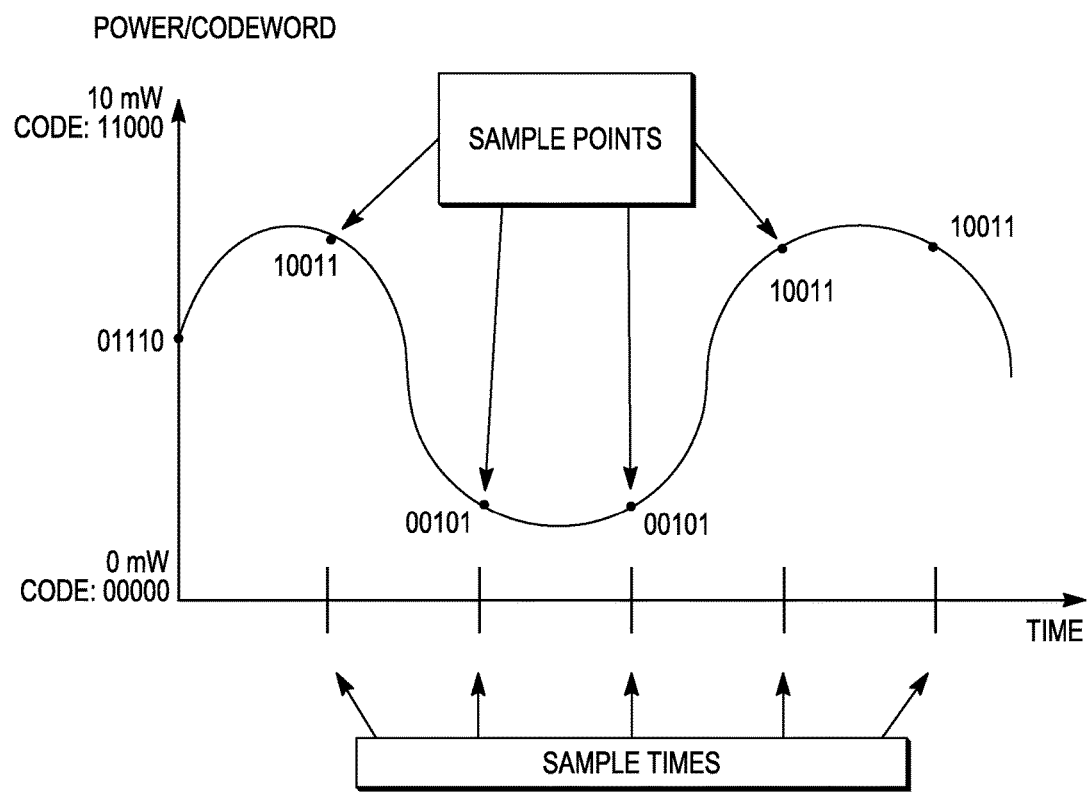
FIG. 22 shows an illustration of sample times and corresponding codewords.

Referring to FIGS. 20-22, once the data and video signals have entered their respective transmit subsystems 730, a first step may be to encode the signals with encoder 740 based upon the modulation format desired at the destination node. Typically, the destination would be customer premise equipment gear and the preferred modulation format for video and data traffic in a broadband delivery HFC (Hybrid Fiber/Coax) system is J.83 QAM Encoding (e.g., ITU-T J.83 standard), such as using a depth of modulation being 64 QAM, 256 QAM, 1024 QAM, and/or 4096 QAM. Alternatively, other RF modulation encoding formats may be used, provided that the noise and bandwidth requirements for that format are met by the rest of the system. For example, FIG. 21 illustrates an OFDM encoding modulation format for video and data traffic in a broadband delivery HFC (Hybrid Fiber Coax) system having both a J.83 QAM encoder 740 and an OFDM encoder 760 that are preferably arranged in parallel, so that both are available for any particular signal.

Once the video and data signals have been encoded in the desired modulation format, the next step is to process the signals with a digital up-converter ("DUC") 750 to create a digital representation of the final RF spectrum that is intended to be generated. Typically, digital up conversion is used in the application of an EdgeQAM, where the integrated up-converter 750 is used to create the RF spectrum locally. In the case of the present disclosure, the digital up-conversion is not co-located with a corresponding digital to analog converter, but rather, the corresponding digital to analog converter is remotely located at the node, with any required digital frequency conversion performed back in the head end or similar place. This enables the use of digital transport to the node as previously described. It should also be understood, that although the specification and drawings illustrates the processing of the signal from the encoders 740 and 760 as proceeding to an "up-converter" 750, that term should be understood to encompass any form of frequency conversion, whether up-converting, down-converting, etc. In some embodiments, for example, where the input signal was oversampled by the encoders 740 and/or 760, a down-converter might be used instead of an up-converter. Still in other embodiments, frequency conversion might be omitted.

Referring specifically to FIG. 22, at a low level, a digital up-converter includes complicated digital signal processing. At a high level, a digital up-converter outputs a series of digital codewords, clocked by a high speed conversion clock which is at least twice the maximum frequency contained in the RF spectrum. These codewords represent the relative power level of the RF spectrum at the intervals of the conversion clock. For example, the following series of codes are generated in series: 01110, 10011, 00101, 00101, 10011, 10011. These codes are representations of what the instantaneous power of the RF waveform, which is created through direct digital synthesis, would be at the instant of each sample clock edge. In actuality, at the time of digital up-conversion, the waveform does not yet exist. The digital up-converter 750 creates the codewords needed in order to create the waveform in the first place. In order to ultimately create the RF waveform, these codewords are provided to a Digital to Analog Converter (DAC) along with the appropriate conversion clock. If these codewords are sent to a DAC, and converted with the mathematically determined conversion clock, then the output of the DAC will have the intended RF waveform, plus the conversion alias waveforms. Once an anti-aliasing filter is applied, the originally intended waveform will have been created. In this invention, these codewords are not sent directly to a DAC. Rather, these codewords (which are typically in a parallel data format) are instead fed to the digital processing subsystem of the transmit subsystem in order to prepare them for serial transmission to be eventually received by a remote digital to analog converter e.g. one located in the node.

Figure 23:
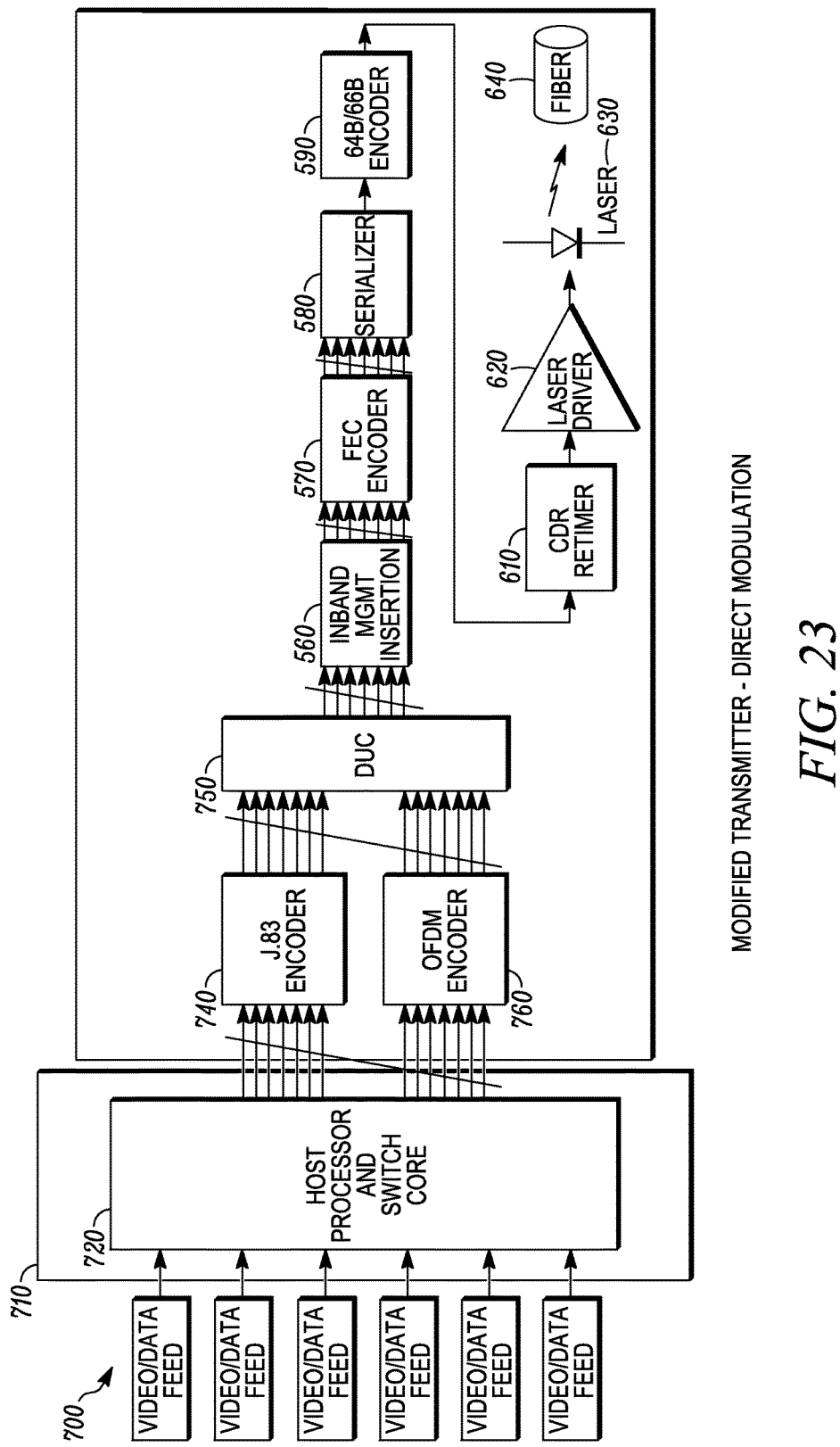
FIG. 23 shows a modified exemplary transmitter having direct modulation.
Figure 24:
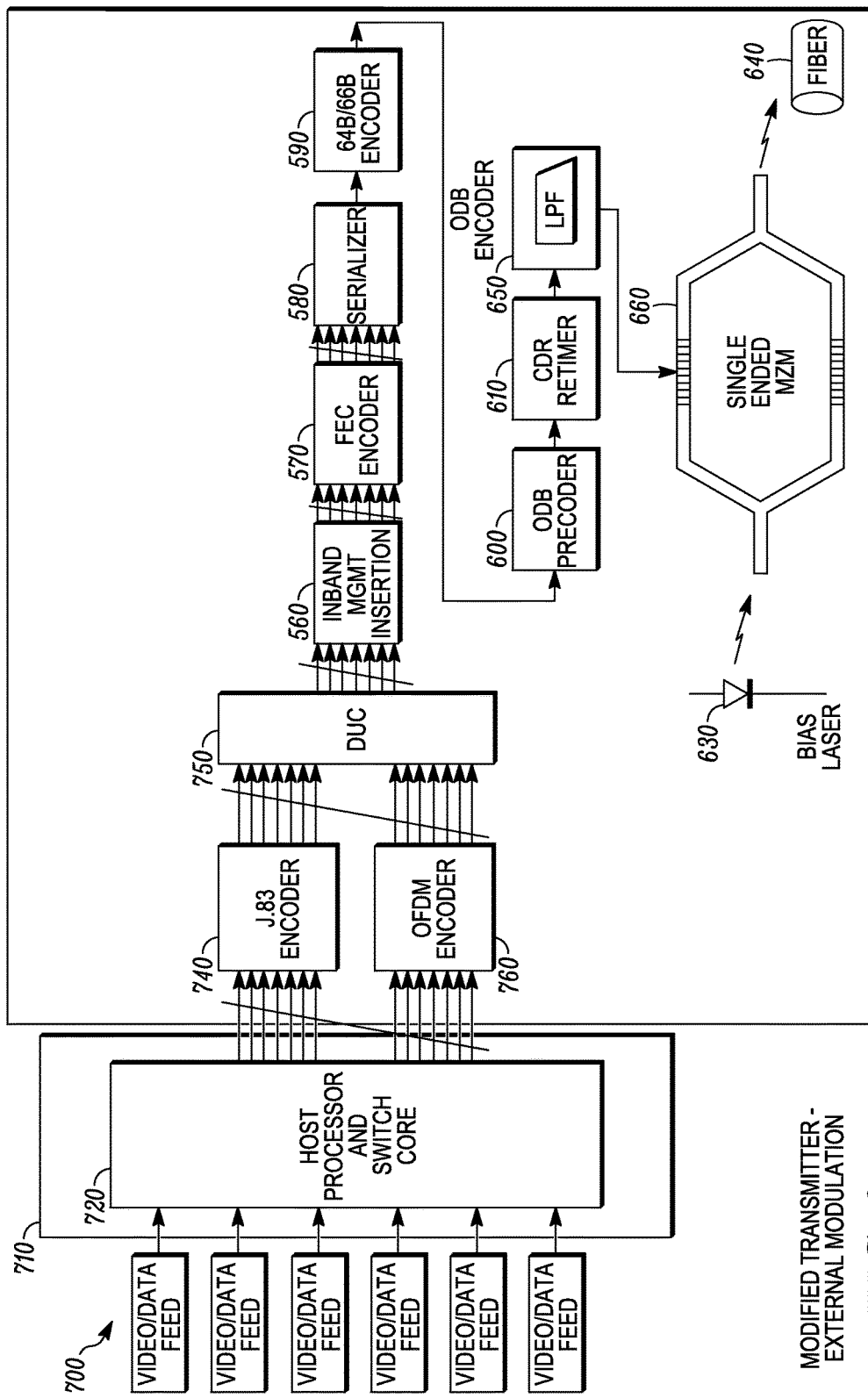
FIG. 24 shows a modified exemplary transmitter having external modulation.

Referring to FIG. 23, the AFL and ADC components of FIG. 17 may be replaced by the J.83 encoder 740 and the OFDM encoder 760 together with the DUC 750 to provide a modified transmitter with direct modulation. Similarly, referring to FIG. 24, the AFE and ADC components of FIG. 18 may be replaced by the J.83 encoder 740 and the OFDM 760 encoder together with the DUC 750 to provide a modified transmitter with direct modulation.

Figure 25:
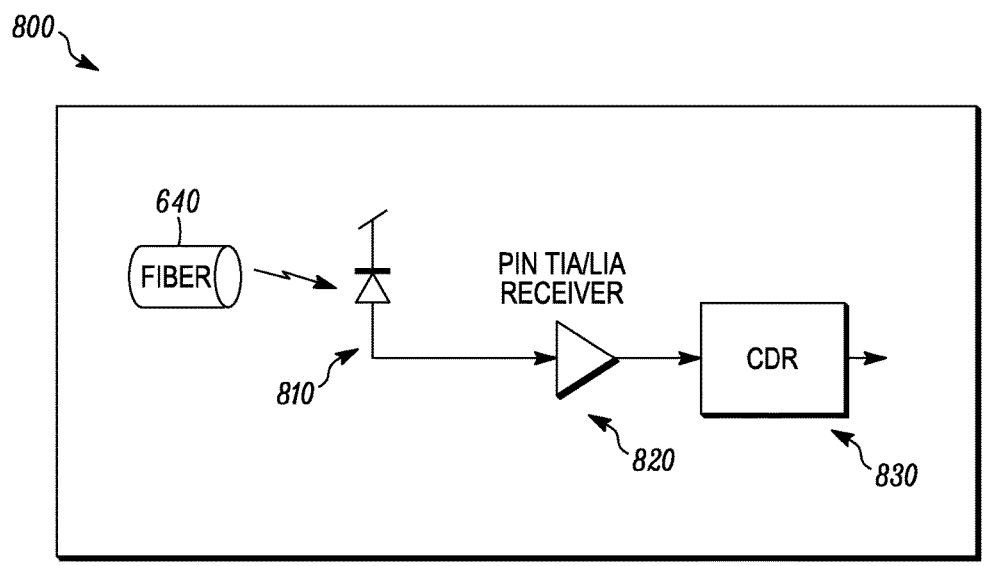
FIG. 25 shows a receiver including a diode and a CDR.

One function of the receiver at the node is to convert the baseband digital optical bit stream received from the fiber 640 into a full spectrum RF signal. Referring to FIG. 25, a first stage 800 of the receiver may perform this optical to electrical conversion. The receiver may use a direct detection photodiode 810 to receive the optical signal from the fiber 640. Either a PIN diode, an APD or any other device that performs an optical to electrical conversion may be used. The photodiode 810 converts the optical signal received from the fiber 640 into an electrical signal with a magnitude that is generally proportional to the optical power intensity on the fiber 640. In the case of a multi-wavelength system, an optical filter or demultiplexer (not shown) would be optically located between the fiber and the photodiode. The photodiode 810 is preferably connected to a Trans-Impedance Amplifier ("TIA") 820 which converts the photocurrent into a voltage as a function of the trans-impedance gain. The output of the TIA 820 is provided to a limiting amplifier (LIA) and then provided to a Clock/Data Recovery and Retiming ("CDR") circuit 830. In some embodiments, the limiting amplifier function may be included in the CDR 830. The CDR 830 may provide substantial jitter, noise and distortion reduction and improved signal eye quality, which in turn improves the overall link budget.

In embodiments where the transmission is not Optical Duo Binary, a direct detection receiver may use, for example, the average power level of the signal eye as the vertical decision threshold. This works for both standard NRZ (Non Return to Zero) and ODB, but is not ideal for both. The TIA and LIA 820 are preferably capable of operating in one of three modes. Mode 1 is a threshold mode that is preferred for NRZ reception. Mode 2 is a threshold mode that is preferred for ODB transmission. Mode 3 is a compromise mode between the first two modes. Multiple threshold modes are not required, but using multiple thresholds improves the link budget performance. NRZ signals may be received in ODB mode and ODB signals may be received in NRZ mode, but in both cases, link budget will suffer due to degradation in the optical to electrical converted eye diagram.

Figure 26:
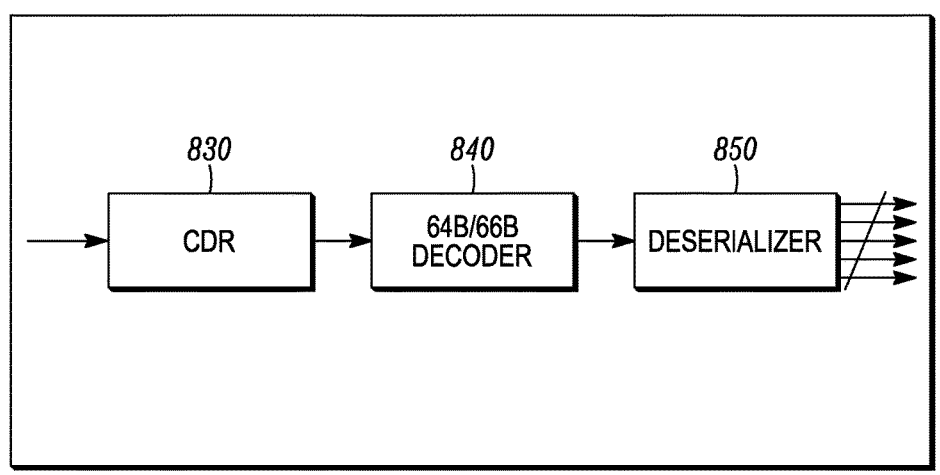
FIG. 26 shows a receiver with including a CDR, a decoder, and a deserializer.

Referring to FIG. 26, after the signal has passed through the CDR 830, it may pass through a 64b/66b decoder 840, or similar, if the original signal was 64b/66b encoded. In some embodiments the 64b/66b decoding function may be included in the CDR 830, or otherwise performed separately. After 64b/66b decoding, the signal may be deserialized by deserializer 850 for further processing.

Figure 27:
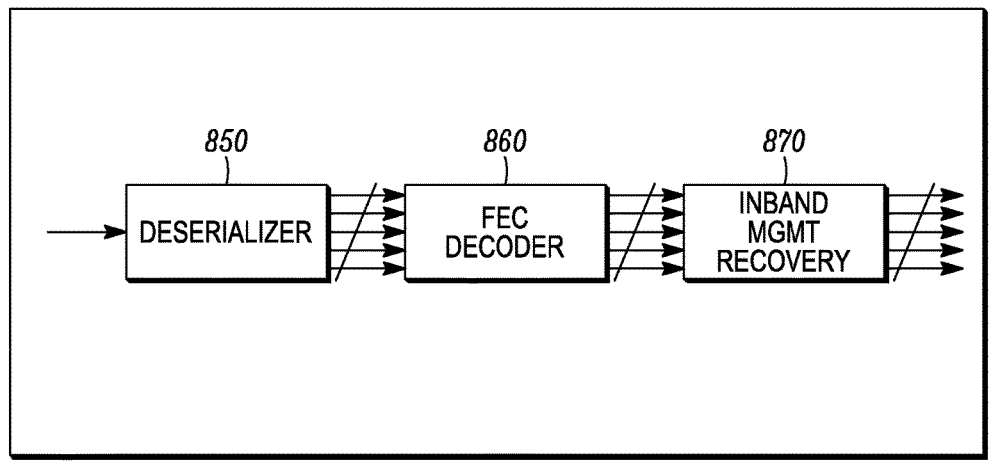
FIG. 27 shows a receiver including a deserializer, an FEC decoder, and a recovery.

Referring to FIG. 27, after the signal has been deserialized, it is passed to an FEC decoder 860 and error correction block 870 (e.g., in-band management recovery), if FEC encoding and in-band management recovery was performed at the encoder. The FEC parity may be checked and any errored bits may be corrected. After Error Correction, the in-band management control words may be removed from the bit stream and used to control functions, such as a TIA/LIA threshold adjustment or a range delay control.

Figure 28:
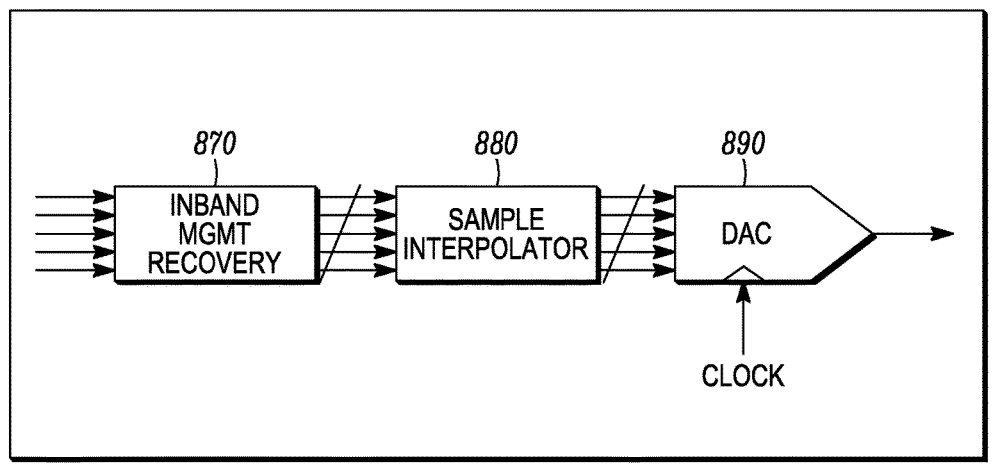
FIG. 28 shows a receiver including a recovery, an interpolator, and a DAC.
Figure 29:
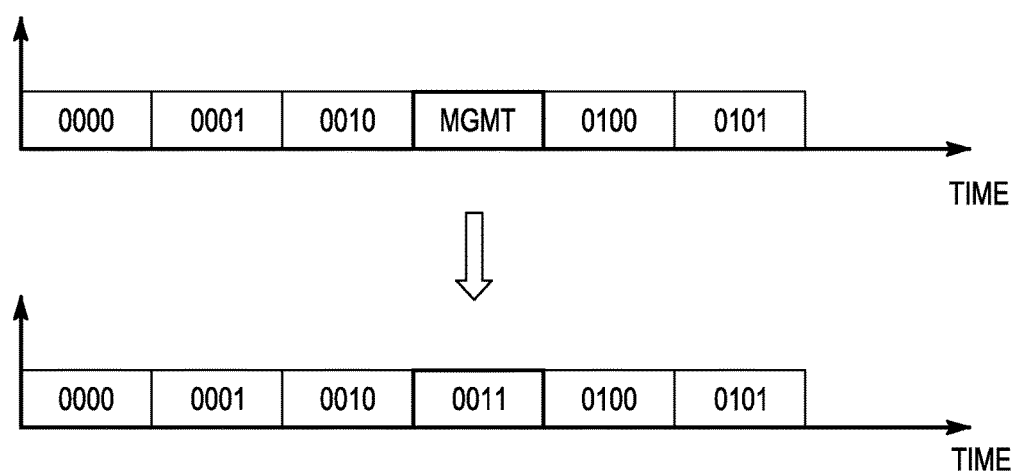
FIG. 29 shows an embodiment of data recovery.

Referring to FIGS. 28 and 29, a sample interpolator 880 may fill back in the gaps due to the removal of the in-band management control words. The sample interpolator 880 provides multiple benefits. First, the in-band management signals use up line bandwidth and the sample interpolator 880 restores this bandwidth. Second, the timing relationship between the data codewords and the conversion clock and the sample interpolator 880 maintains this relationship without causing a word skip to occur. Third, the signals of interest are sensitive and the signal interpolator reduces the distortion of the intended RF signal. FIG. 29 shows the functionally of the signal interpolator 880 as it takes the codewords on either side of the gap where a management control word was included and calculates an estimated value of what the signal most likely should be at that sample point and inserts that word in its place. After the sample interpolator 880, the codewords may be provided to a Digital to Analog Converter (DAC) 890. The codewords may be formatted to match the interface of the DAC.

The accuracy of the conversion clock for the DAC 890 in large part controls the overall performance of the system and may determine the signal quality of the final RF spectrum. The conversion clock used at the DAC 890 should be at "precisely" the same frequency at which the codeword samples of the digitally represented bit stream were either generated in a direct digital synthesis system or captured in an ADC sampled system. Phase offsets or delays do not necessarily affect the signal quality, but may be relevant with regards to latency and quality of service, particularly when delivering voice traffic. Rather than phase offsets or delays, the conversion clock should have an accurate frequency and low phase noise (clock jitter). In generating such a conversion clock for the DAC 890, the frequency of the line is not identical to the conversion clock frequency. At a minimum, the line rate of an NRZ bit stream in a system should be equal to the conversion clock frequency multiplied by the bit depth. For example, if a sampling frequency of 2.5 GSps, along with a bit depth of 10 is used, the line rate would be 10 bits times 2.5 GSps, which equals 25 Gbps. It is unlikely that the system would be able to maintain that bit rate without any additional overhead. Likely sources of additional overhead, may include for example, the 64b/66b encoding and forward error correction. Each of these overhead sources increases the line rate required on the physical link. Accordingly, the actual clock rate should be recovered and extracted to determine a conversion clock for the DAC 890, rather than using the clock rate of the link.

Figure 30:
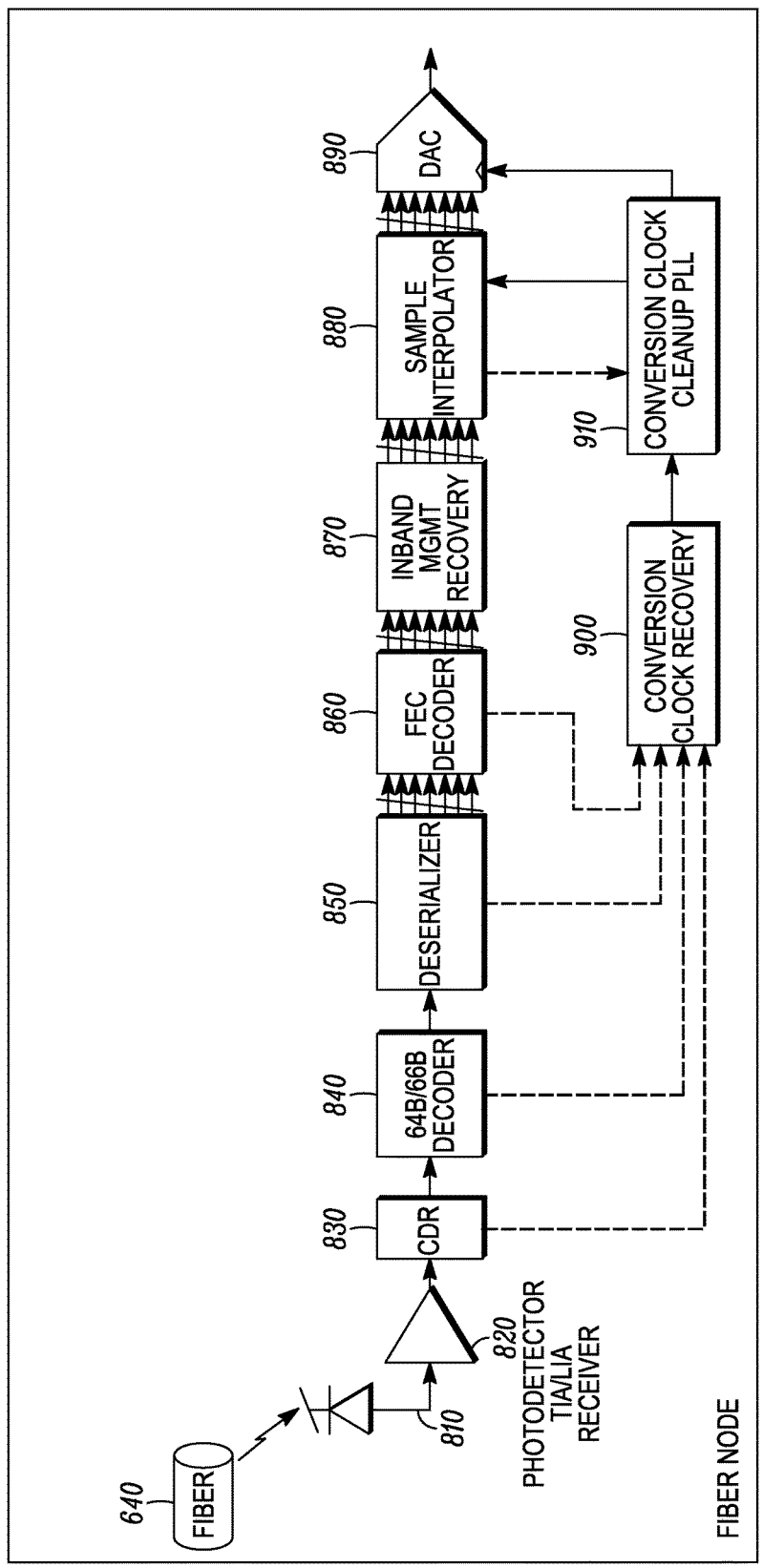
FIG. 30 shows an exemplary embodiment of a receiver omitting an AFE.

Referring to FIG. 30, the conversion clock may be effectively recovered from a number of different locations within the receiver circuit. The preferred location(s) to recover the conversion clock depends upon the particular embodiment and will be affected by details such as whether or not a fractional Phase-Locked Loop (PLL) is used and whether the line rate is an integer multiple of the conversion clock frequency. In some implementations, it may be advantageous to choose a FEC encoding scheme which provides an overhead which, when added to the 64b/66b encoding scheme results in a final line rate which is an integer multiple of the conversion clock. Due to these variations in implementations, there are several different locations within the receiver at which the data stream clock can be used to recover the conversion clock.

If the line rate is an integer multiple of the conversion clock, it is preferred to use the output from the Clock and Data Recovery and Retiming block to recover the conversion clock. In this case the CDR extracts the clock from the line data and feeds this clock into a first PLL 900 which uses a prescaler to produce a divided down version of the line clock that is equal to the conversion clock frequency. For improved performance, it is preferable to use a second PLL 910 to lower the phase noise and "clean up" the conversion clock. In some embodiments, such an asynchronous embodiment, it may be desirable to use the recovered clock as a reference to clock the data out of the sample interpolator and into the DAC. In some embodiments, such as a synchronous embodiment, the recovered clock may not need to be used as a reference.

Often the overhead created by the 64b/66b encoding in and of itself will affect the line rate such that it is not an integer multiple of the conversion clock frequency. In cases where 64b/66b encoding is used, but FEC is not used, it is preferable to extract the clock at a point after the 64b/66b encoding has been removed. In addition to the 64b/66b encoding, the FEC encoding overhead may or may not result in a line rate that is an integer multiple of the sampling clock. While it may be advantageous to keep the line rate at an integer multiple of the sampling clock, other factors such as channel characteristics or link budgets or system error rates may necessitate the use of FEC encoding which is not compatible with this approach. Therefore depending upon the particular embodiment, the 64b/66b encoding and the Forward Error Correction, any of the conversion clock recovery approaches shown in the diagram above may be employed.

Figure 31:
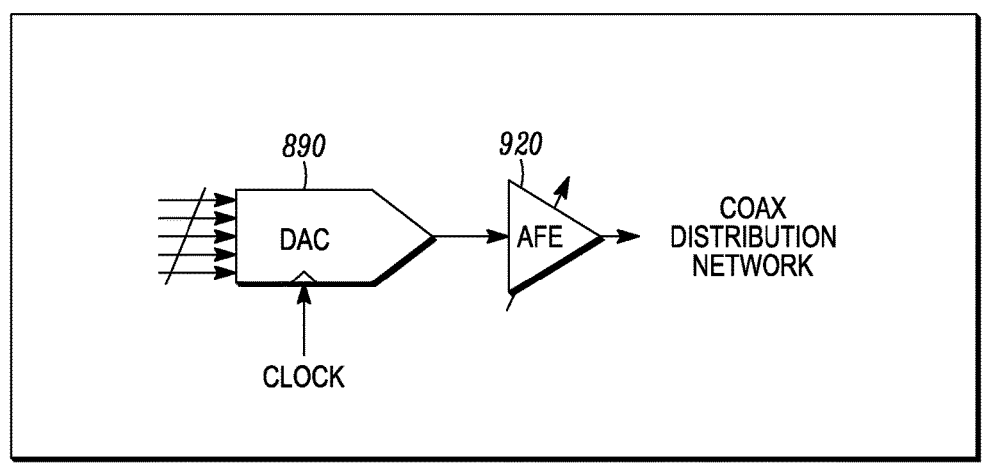
FIG. 31 shows a receiver including a DAC and an AFE.

Referring to FIG. 31, after the digital codewords that represent the RF spectrum are determined, and a conversion clock has been recovered, the data may be sent to the Digital to Analog Converter 890 for conversion to an analog RF spectrum. The Digital to Analog Converter 890 transforms the digital codewords back into a broadband RF signal. However, the output of the DAC may not be appropriate for direct connection to the coaxial distribution network. Therefore, an Analog Front End (AFE) 920 is used in order to prepare the RF output of the DAC for delivery into the coaxial network for distribution. One function of the AFE 920 is to provide anti-aliasing filtering to remove the high frequency alias images and the harmonics of the conversion clock frequency from the spectrum. The alias images and clock harmonics are effectively noise that would otherwise be added to the distribution network, and can adversely affect the performance of the RF amplification and gain control stages that follow. Another function of the AFE 920 is to provide RF amplification, gain control and tilt to allow the operator to set the output levels of the downstream spectrum as required for the particular network topology that the particular spectrum is serving. Yet another function of the AFE 920 is to provide RF Diplex Filtering such that the upstream signals can travel together with the downstream signals through the coax distribution network, but can be separated for proper handling through the node.

Figure 32:
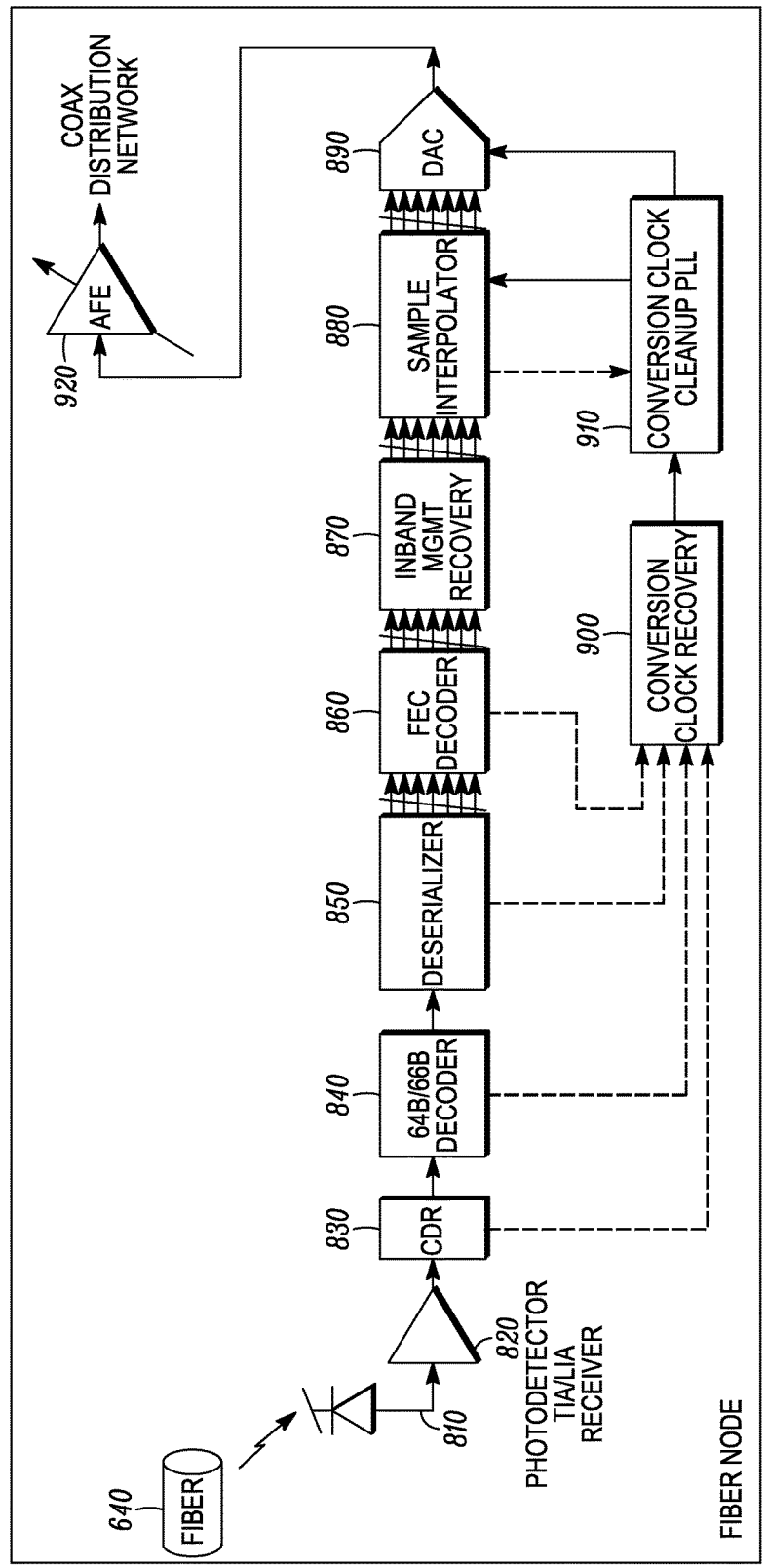
FIG. 32 shows an exemplary embodiment of a receiver including an AFE.

FIG. 32 shows an exemplary resulting receiver system block diagram.

Figure 33:
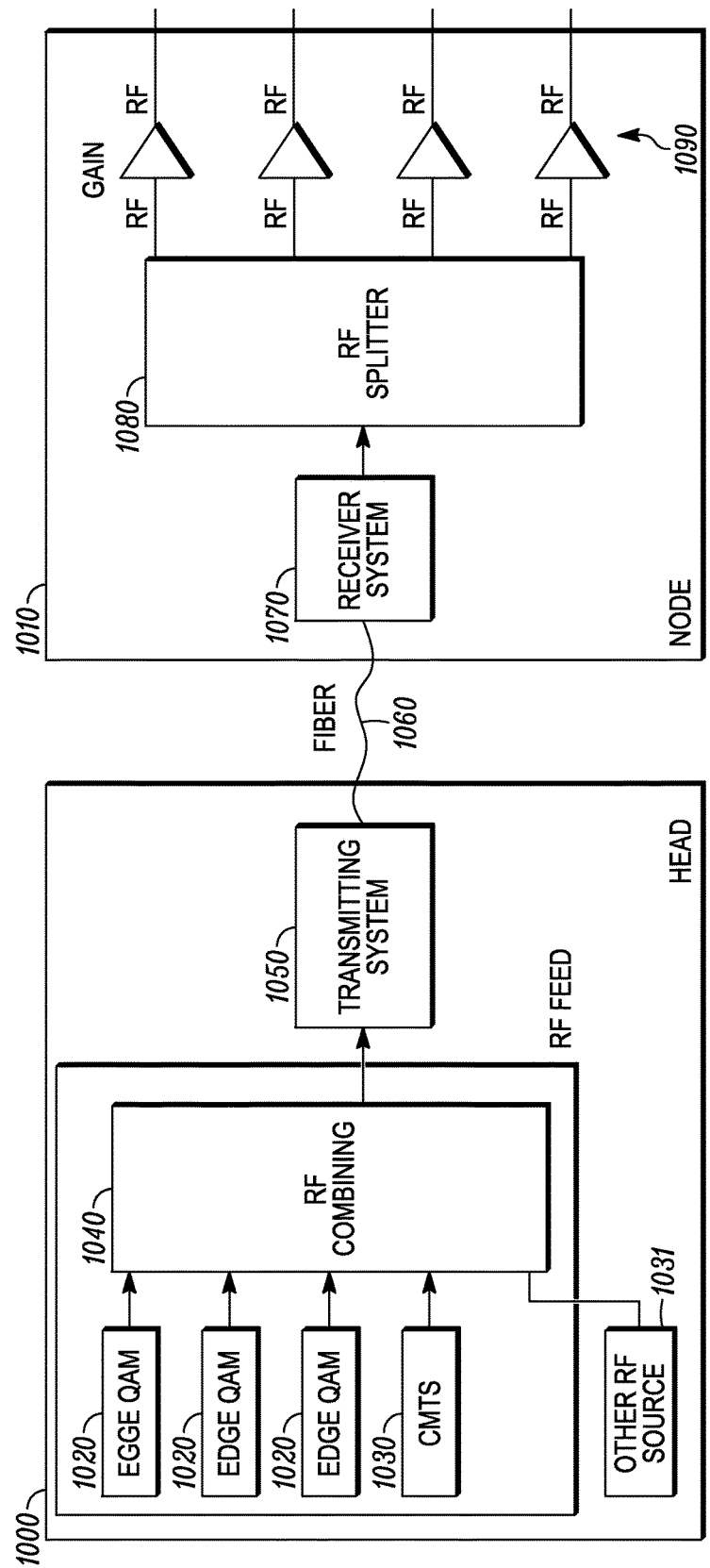
FIGS. 33-45 show respective exemplary embodiments of a digital transmission system suitable for a hybrid fiber/coax system.

FIG. 33 shows one embodiment of the digital fiber transmission system between a head end 1000 and a node 1010 that is suitable for inclusion within existing hybrid fiber/coax networks. The analog outputs of the edge QAM units 1020, the CMTS 1030 and any other RF sources 1031 are combined together with in an RF combining network 1040 in the head end 1000 of the system. These components may be referred to as the RF Feed, for purposes of identification. The analog output of the RF Feed is provided to a transmitter system 1050, which may be one as previously described in FIGS. 8-18, where the analog output is sampled and serialized for digital transmission to the fiber 1060. Once the optical signal is received at the node 1010, the receiver system 1070, which may be one as previously described in FIGS. 25-32, converts the digital bit stream back into the RF spectrum that existed at the input to the transmitter system. Once the received signal is converted back into an analog RF spectrum, it may be split by RF splitter 1080 and amplified to serve any number of output ports 1090 for distribution. In the case of a primary node, this often includes four outputs. In the case of a "mini-bridger" amplifier which has been converted to a node, this could be a single RF output. Such a node may be located on a pole, on a line, in a pedestal, in an underground enclosure, and/or inside of a building. If additional signals are also traveling on the same fiber, additional optical WDM filtering, blocking, multiplexing and/or demultiplexing may be included. A use for this class of embodiment would be to enable longer head end to node links such as may be required when a number of head ends or hubs are consolidated. In this case, a single digital transmission system can provide identical content to multiple RF feeds.

Figure 34:
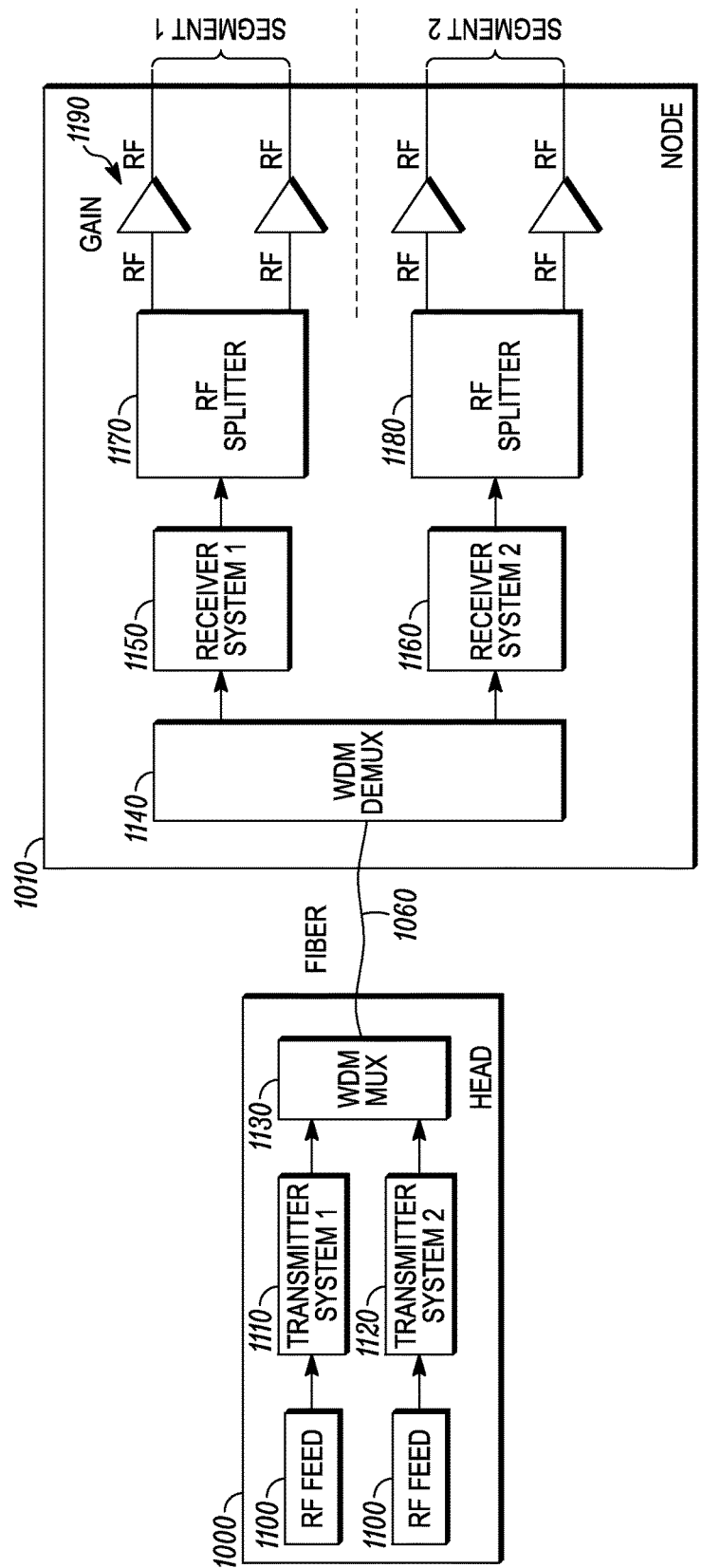

Referring to FIG. 34, another embodiment of the digital fiber transmission system is illustrated suitable for including together with existing hybrid fiber/coax networks. In this exemplary case, two RF Feeds 1100 may be included. These RF feeds 1100 may include content different from one another or they may include a combination of some content that is different and some content that is identical (typically referred to as broadcast content). For example, the same content may be a video feed of one or more channels. These RF feeds 1100 are each sent to their own independent transmitter system 1110 and 1120, respectively, where each are separately sampled and converted into serial digital bit streams. The two serial digital bit streams may travel down separate fibers, or they may be operated at different wavelengths and may be combined a combiner 1130 using, for example, either an optical power combiner or an optical WDM coupler in order to use a single fiber. At the node 1010, the two optical signals are provided to associated receiver systems 1050 and 1060, respectively. In the case where the signals are traveling on separate fibers, each receiver system would be connected to the appropriate fiber. In the case where both signals are traveling on the same fiber, an optical WDM demultiplexer 1140, for example, may be included to separate the signals. The receiver systems 1050 and 1060 convert the optical digital bit streams back into RF spectrums where they can be split and amplified by RF splitters 1170 and 1180, respectively, if desired, for distribution. The number of RF outputs 1190 may be selected based upon the node topology. The two receivers 1150 and 1160 in the configuration illustrated in FIG. 34 do not need to each serve the same number of RF ports.

Depending upon how imbalanced the node port loading is, it may be desirable to have one receiver serve a single port and have a second receiver serve the remaining three ports. This node 1010 may be located on a pole, on a line, in a pedestal, in an underground enclosure, and/or inside of a building. If additional signals are also traveling on the same fiber, additional optical WDM filtering, blocking, multiplexing, and/or demultiplexing may be included. The optical WDM demultiplexer may be inside the fiber node or outside the fiber node in a separate enclosure, such as a fiber optic splice enclosure. A use case for this class of embodiment would be to enable longer head end to node links such as may be required when a number of head ends or hubs are consolidated. In this case, dual digital transmission systems can provide two independent content feeds, each of which are then split between two (or more) RF feeds.

Figure 35:
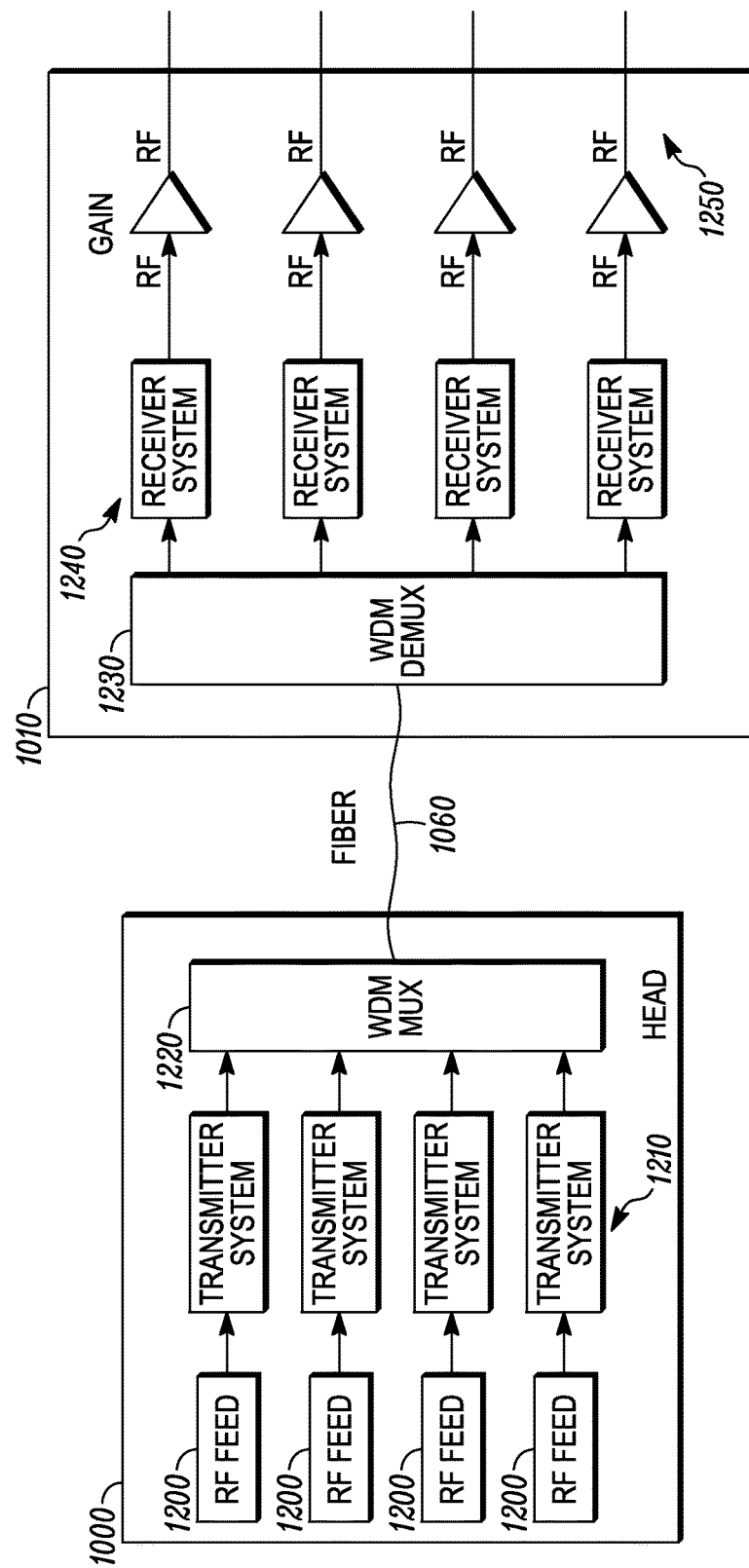

Referring to FIG. 35, another embodiment of the digital fiber transmission system is illustrated suitable for including together with existing hybrid fiber/coax networks. In this embodiment, a set of four transmitter systems 1210 are included together with four RF Feeds 1200. These four RF feeds 1200 may each include content different from one another or they may consist of a combination of some content that is different and some content that is identical (typically referred to as broadcast content). Each of these RF feeds 1200 are each sent to a separate transmitter system 1210 where each is sampled and converted into a corresponding serial digital bit stream. The four optical outputs may travel down separate fibers, or they may be operated at different wavelengths and may be combined at combiner 1220, for example, using either an optical power combiner or an optical WDM coupler in order to use a single fiber 1060. At the node 1010, the optical signals are provided to respective receiver systems 1240. In the case where the signals are traveling on separate fibers, each receiver system would be connected to the appropriate fiber. In the case where the signals are traveling on the same fiber, an optical WDM demultiplexer 1230, for example, may be used to separate the signals. Each of the receiver systems 1240 convert the optical digital bit streams back into corresponding RF spectrums where each may be amplified for distribution on RF outputs 1250. The node 1010 could be located on a pole, on a line, in a pedestal, in an underground enclosure, and/or inside of a building. If additional signals are also traveling on the same fiber, additional optical WDM filtering, blocking, multiplexing and/or demultiplexing may be used.

Figure 36:
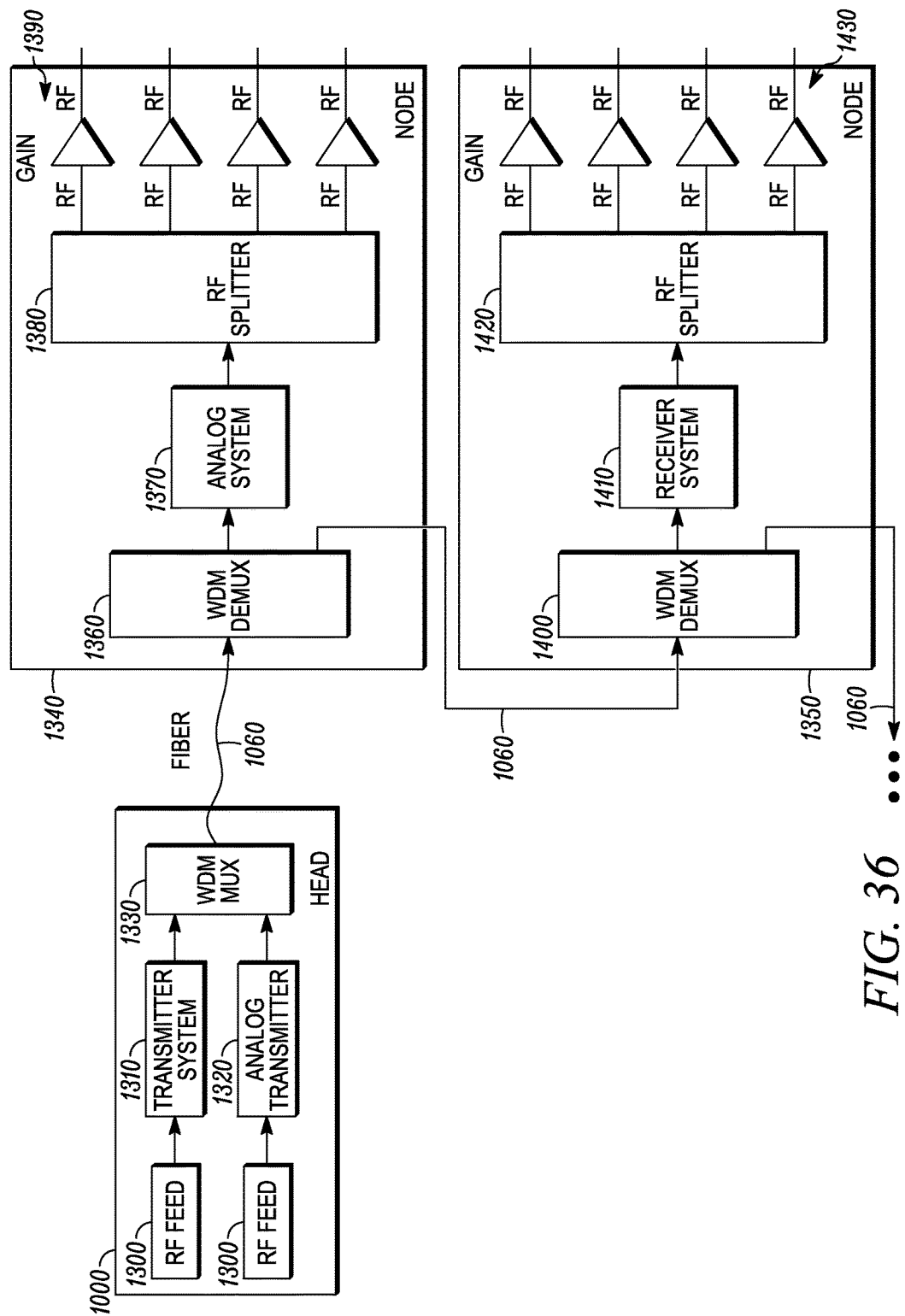

Referring to FIG. 36, another embodiment of the digital fiber transmission system is illustrated suitable for including together with existing hybrid fiber/coax networks. In this embodiment, two RF Feeds 1300 are illustrated. The RF feeds 1300 may include content different from one another or they may consist of a combination of some content that is different and some content that is identical (typically referred to as broadcast content). These feeds 1300 are each sent to an associated one of two transmitters 1310 and 1320, respectively; one being legacy analog transmitter 1320 and the other being a transmitter system 1310 such as one described in FIGS. 8-18. There may be one or more additional analog transmitters 1320 and/or transmitter systems 1310. The two transmitter outputs are operated at different wavelengths and combined by combiner 1330, for example, using either an optical WDM coupler or an optical power combiner. As illustrated, there may be multiple nodes 1340 and 1350 which are provided signals by a single trunk fiber (which may be separated into multiple partitions) and each of these nodes 1340 and 1350 may be a mixture of standard analog nodes and digital receiver nodes. As illustrated, the trunk fiber 1060 runs to the first fiber node 1340 where a WDM demux 1360, for example, strips off the analog wavelengths and feeds that signal into a legacy analog receiver 1370 where it is converted into an RF waveform and split by RF splitter 1380 for distribution among RF outputs 1390. The remaining signals continue down the trunk fiber 1060 until the second node 1350 is reached. At the second node 1350, another optical WDM demultiplexer 1400, for example, strips off the second wavelength which in this case is a digital signal. This digital signal is provided to a receiver system 1410 such as the ones described in FIGS. 25-32, where the digital signal is converted back to an RF spectrum and split by RF splitter 1420 for distribution among RF outputs 1430. As with the first node 1340, the remainder of the optical signals, if any, may continue along the trunk fiber 1060 to further nodes. A use case for this class of embodiment would be to enable head end to node links using digital transmissions for some (new) nodes while allowing existing analog nodes to continue operating.

Figure 37:
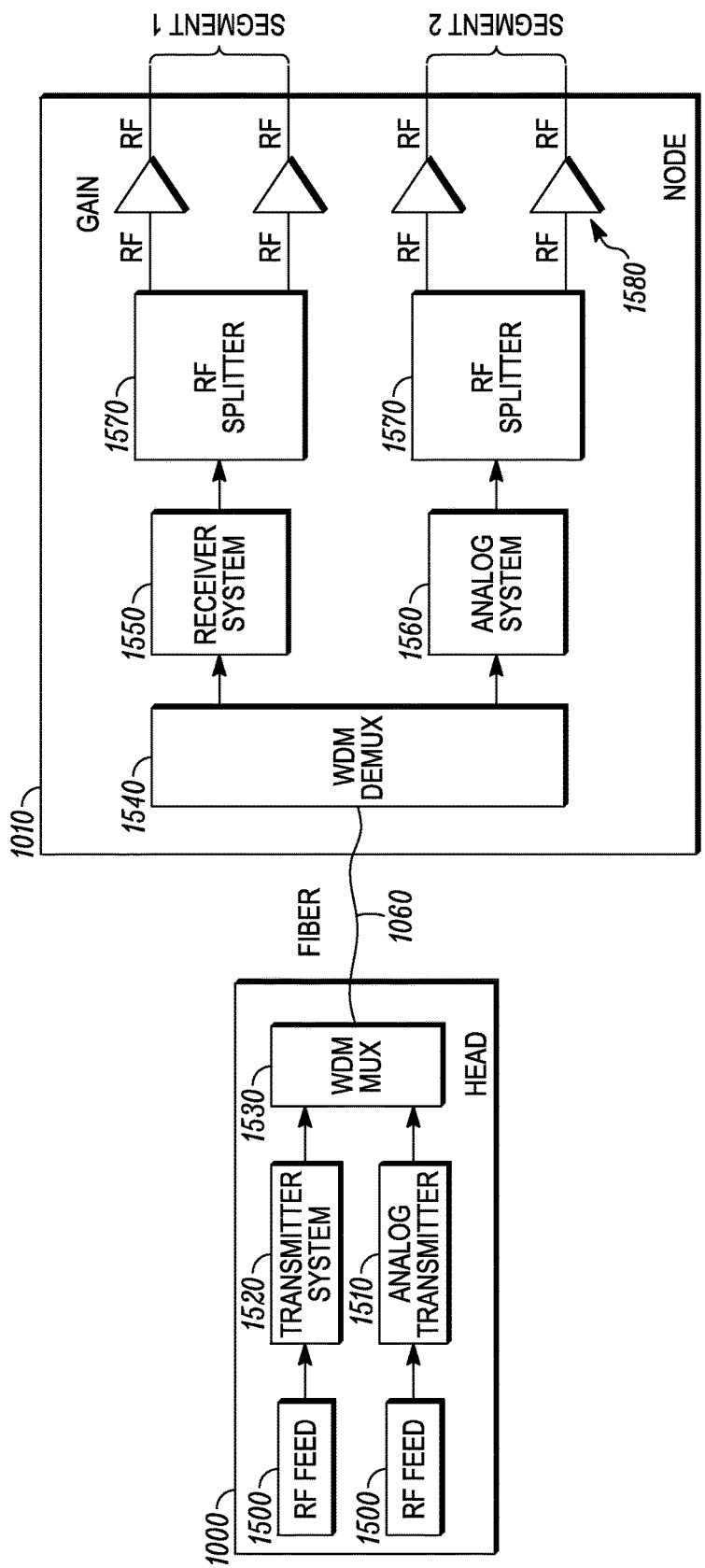

Referring to FIG. 37, another embodiment of the digital fiber transmission system is illustrated suitable for including together with existing hybrid fiber/coax networks. In this embodiment, two RF Feeds 1500 are illustrated, for example. Each of these RF feeds 1500 may include content different from one another or they may consist of a combination of some content that is different and some content that is identical (typically referred to as broadcast content). These feeds 1500 are each provided to their own transmitter system where one is a legacy analog transmitter 1510 and the other is a digital transmitter system 1520. There may be additional analog transmitters and/or digital transmitter systems together with corresponding RF Feeds. The outputs of the two transmitters 1510 and 1520 are provided with different non-overlapping wavelengths and are combined by combiner 1530 using either an optical WDM coupler or an optical power combiner, for example. The combined optical signals travel over a fiber 1060 to the fiber node 1010 where an optical WDM demultiplexer 1540, for example, is used to separate the wavelengths. Each optical wavelength is sent to its appropriate digital receiver 1550 or analog receiver 1560 where it is split by a respective RF splitter 1570 and amplified for distribution along RF outputs 1580. The number of RF outputs may depend upon the specific node topology. The two receivers 1550 and 1560, as illustrated, do not need to each serve the same number of RF ports, if desired. Depending upon how imbalanced the node port loading is, it may be desirable to have one receiver serve a single port and have a second receiver serve the remaining three ports. The node 1010 could be located on a pole, on a line, in a pedestal, in an underground enclosure, and/or inside of a building. If additional signals are also traveling on the same fiber 1060, additional optical WDM filtering, blocking, multiplexing and/or demultiplexing may be included. A use for this class of embodiment would be to enable head end to node links using digital transmissions for some services, while allowing legacy services to continue using analog transmission. This would simplify the transition to digital.

Figure 38:
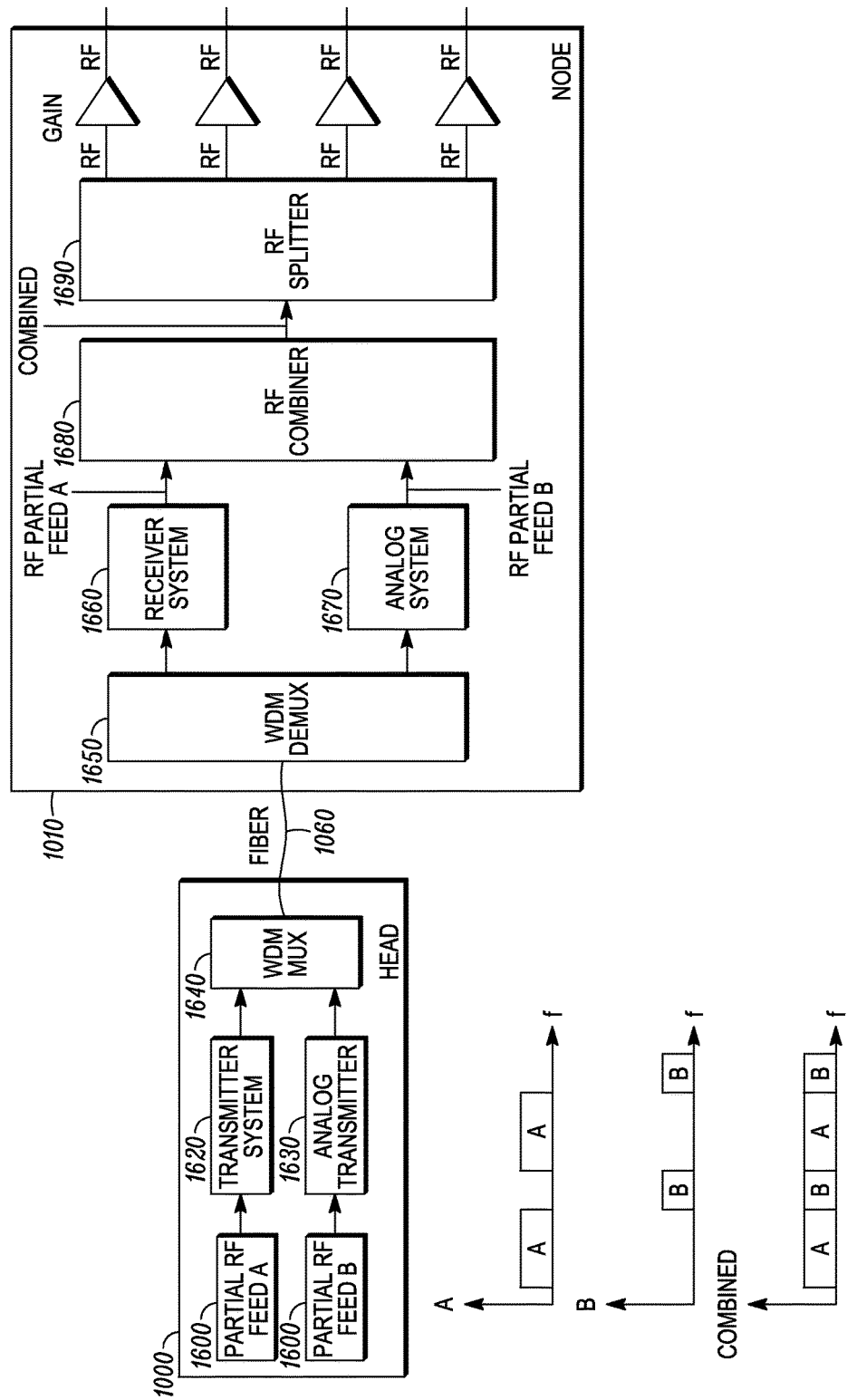

Referring to FIG. 38, another embodiment of the digital fiber transmission system is illustrated suitable for including together with existing hybrid fiber/coax networks. In this embodiment, two partial RF feeds 1600 and 1610 are created. Partial RF feed 1610 is one for legacy analog transmission and partial RF feed 1600 is for digital transmission. The two RF spectrums from the partial RF feeds 1600 and 1610 are created such that they do not overlap in frequency with one another. Also, the two RF spectrums do not necessarily include all the frequencies of the available spectrum. Each of these partial spectrums is provided to an associated legacy analog transmitter 1630 or digital transmitter system 1620, respectively. The respective outputs of the two transmitters may travel on different fibers, or they may operate at different wavelengths and be combined onto a single fiber using an optical combiner 1640 such as an optical WDM multiplexer or an optical power combiner, for example. The signals travel down the fiber 00 to the fiber node 1010. If separate fibers are used, then the appropriate fiber is connected to the appropriate receiver (e.g., receiver system and analog system). If a single fiber is used, then an optical WDM demultiplexer 1650 may be used to separate the two wavelengths and provide them each to the appropriate receivers (e.g., digital receiver system 1660 and analog receiver system 1670). The receiver system 1660 converts the digital bit stream back into an RF spectrum and the legacy analog receiver system 1670 converts the analog optical wavelength back into an electrical RF spectrum. The two RF waveforms are then combined with one another in an RF combiner 1680. This combination may occur, for example, using either an RF power combiner or RF filter combiners such as an RF diplexer. An RF filter combiner tends to reduce signal loss, while an RF power combiner tends to provide flexibility for channel allocation in the frequency domain. Once the RF signals are combined, they may be split by an RF splitter 1690 and amplified for distribution. A use for this class of embodiment would be to create channel line ups at a node from a mixture of analog digital transmissions. This could be used to combine an existing analog broadcast system with a digital narrowcast system for example.

Figure 39:
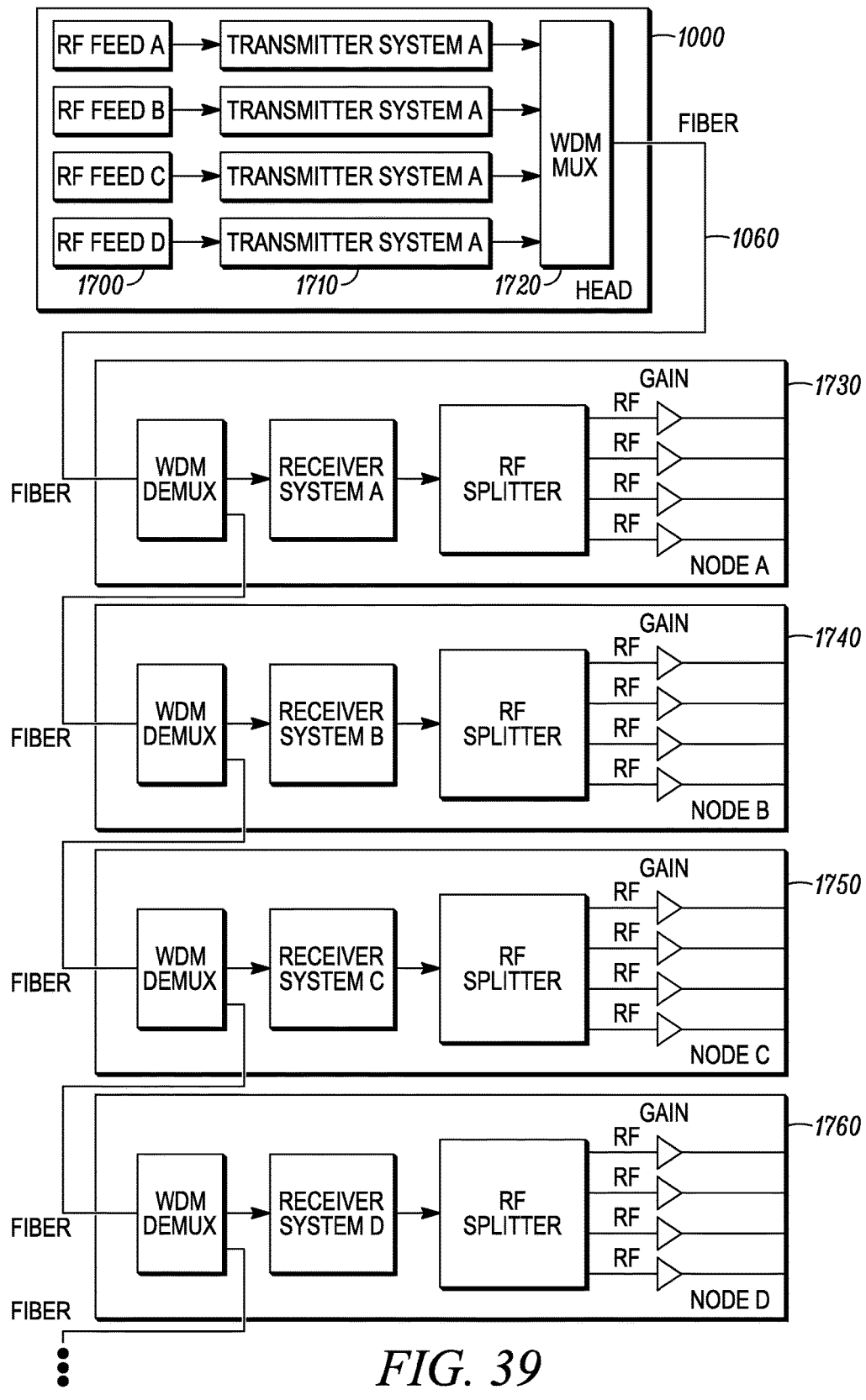

Referring to FIG. 39, another embodiment of the digital fiber transmission system is illustrated suitable for including together with existing hybrid fiber/coax networks. An exemplary system includes four transmitter systems 1710 together with four RF feeds 1700 in a head end 1000. Also, additional wavelengths may be combined and "simultaneously" transmitted down the same fiber, if desired. Additional wavelengths from additional transmitters may be combined and transmitted down the fiber simultaneously. These feeds 1700 may include content different from one another or they may consist of a combination of some content that is different and some content that is identical (typically referred to as broadcast content). The four optical outputs may travel down separate fibers, or they may be operated at different wavelengths and may be combined at combiner 1720, for example, using either an optical power combiner or an optical WDM coupler in order to use a single fiber 1060. The fiber 1060 carrying all of the wavelengths, for example, runs from the head end 1000 to a first fiber node 1730. At the first fiber node 1730, the signal at the appropriate wavelength is received. In the case of a segmented fiber node, signals on multiple wavelengths could be received. This wavelength carrying the digital bit stream is sent to the receiver system where it is converted back into an RF spectrum for distribution. Either, all of the signal wavelengths, or just the remaining signal wavelengths, continue on down the trunk fiber 1060 to the successive nodes 1740, 1750, 1760, etc. at which selected signal wavelengths are received. This process may repeat over and over again down the trunk fiber 1060. A use for this class of embodiment would be to enable head end to node links using digital transmissions for long distances with multiple wavelengths. This enables nodes to be connected in series over a long distance thus saving pulling additional fiber. An obvious use case for this would be the conversion of amplifiers to nodes as serving areas are subdivided.

Figure 40:
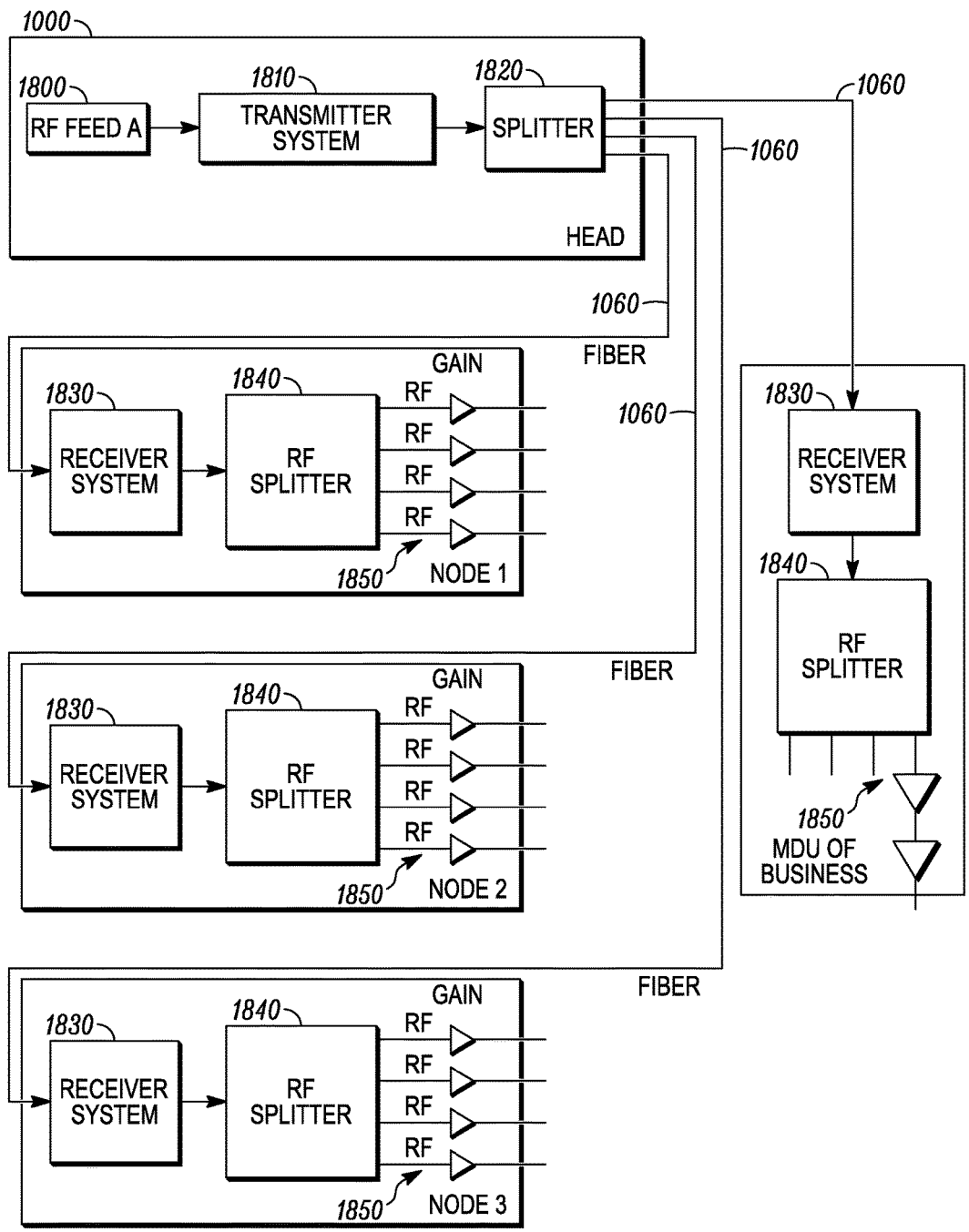

FIG. 40 shows another embodiment of the digital fiber transmission system suitable for including together with existing hybrid fiber/coax networks. In this embodiment, an RF Feed 1800 is sent to a transmitter system 1810. The output of the transmitter is sent to an optical power splitter 1820. Based upon the link budget an extremely large number of optical splits can be served by the single transmitter 1810, particularly when Erbium Doped Fiber Amplifiers (EDFAs) are used to further extend the link budget. Also, the optical splitter is not required to have symmetrical outputs. Asymmetric, tap style splitters may be used, if desired. Each optical splitter output is connected to a respective node 1010 by respective fibers 1060 where the digital bit stream is processed by respective receivers 1830 to convert the signals back into an RF spectrum for splitting and distribution by RF splitters 1840 and RF outputs 1850. The receivers 1830 may preferably be any of those described in FIGS. 8-24. A use for this class of embodiment would be to enable a single digital transmission to support multiple head end to node links using an optical splitter. This provides a very cost effective solution to signal distribution to multiple nodes where each node has the same content.

Figure 41:
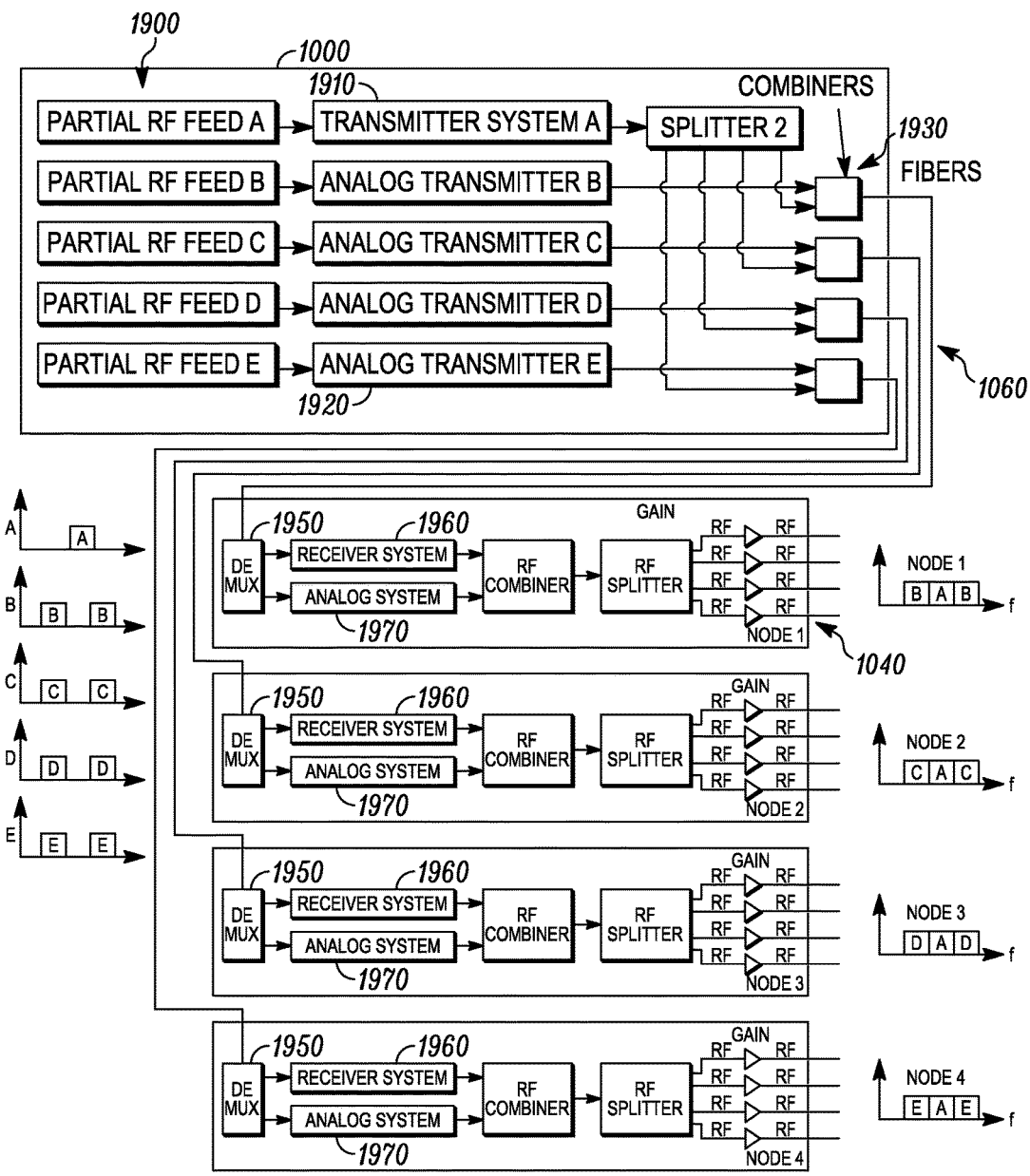

FIG. 41 shows another embodiment of the digital fiber transmission system suitable for including together with existing hybrid fiber/coax networks. The architecture includes a single transmitter spectrum that is shared across multiple analog spectrums. In this case, multiple partial RF feeds 1900 are created such that none of the feeds directed towards analog transmitters 1920 are overlapping in frequency with the RF feed that is sent to the shared transmitter system 1910, which may preferably be any of those described in FIGS. 8-24. The partial feeds 1900 may be completely unique or they may consist of a combination of some unique content and some identical (typically referred to as Broadcast) content. In the head end 1000, the analog transmission path remains virtually unchanged, with the exception that an optical WDM or power combiner may be used in order to combine the legacy analog wavelengths with the new transmitter system wavelengths. In parallel with the analog transmission paths, a separate RF feed may be provided to transmitter system 1910 where it is sampled and digitized for transmission. The output of the transmitter system 1910 may be sent to an optical power splitter and the outputs of the optical power splitter are sent to an optical combining network 1930. A set of fibers 1060 which each contain an analog signal with a distinct wavelength, and a copy of the signal from the transmitter system 1910 with its own distinct wavelength, are sent out to fiber nodes 1940 where each includes an optical WDM demultiplexer 1950 used to separate the analog and digital wavelengths, with each being sent to an appropriate receiver 1960 or 1970. The receiver 1960 may preferably be a digital receiver such as any of those described in FIGS. 25-33 while the receiver 1970 may be any appropriate analog receiver. Then, the two complementary RF spectrums are combined, and then split and amplified for distribution. A use for this class of embodiment would be to enable a single digital transmission carrying the broadcast signals for the system to be combined with individual analog based per node narrowcast signals to create a full spectrum line up on a per node basis.

Figure 42:
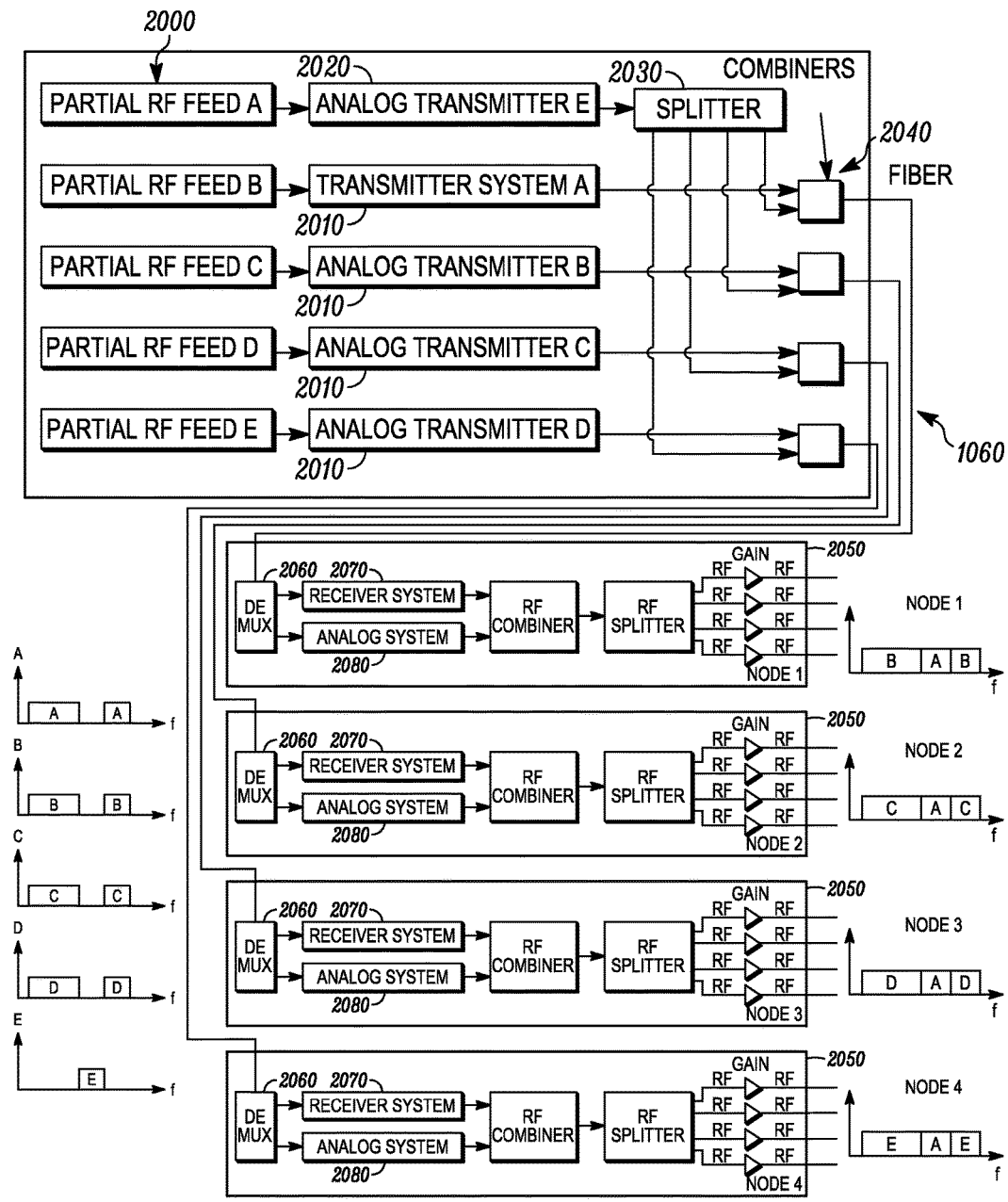

FIG. 42 shows another embodiment of the digital fiber transmission system suitable for including together with existing hybrid fiber/coax networks in which a single analog transmitter spectrum is shared across multiple transmission system spectrums. In this case, multiple partial RF feeds 2000 are created such that none of the feeds that are directed towards the digital transmission systems 2010 (which may preferably be any of those described in FIGS. 8-24) overlap in frequency with the RF feed that is sent to a shared analog transmitter 2020. The partial feeds 2000 may be completely unique or they may consist of a combination of some unique content and some identical (typically referred to as Broadcast) content. In the head end, the output of the analog transmitter 2020 may be sent to an optical power splitter 2030 so that it can be shared across multiple transmission systems. The analog signal at its individual wavelength is combined with the respective outputs of transmission systems 2010 using one or more optical combiners 2040 such as, for example, an optical WDM or optical power combiner. A set of fibers which each contain respective signals at distinct digital wavelengths along with a copy of the analog signal at its distinct wavelength are sent out to fiber nodes 2050 where, for example, each includes an optical WDM demultiplexer 2060 used to separate the analog and digital wavelengths. Each signal is sent to an appropriate one of a digital receiver system 2070, such as any of those described in FIGS. 25-33, and an analog receiver system 2080. Then, the two complementary RF signals may be combined, split, and amplified for distribution. A use for this class of embodiment would be to enable a single analog transmission carrying the broadcast signals for the system to be combined with individual digital per node narrowcast signals to create a full spectrum line up on a per node basis. It is in effect the inverse of FIG. 41.

Figure 43:
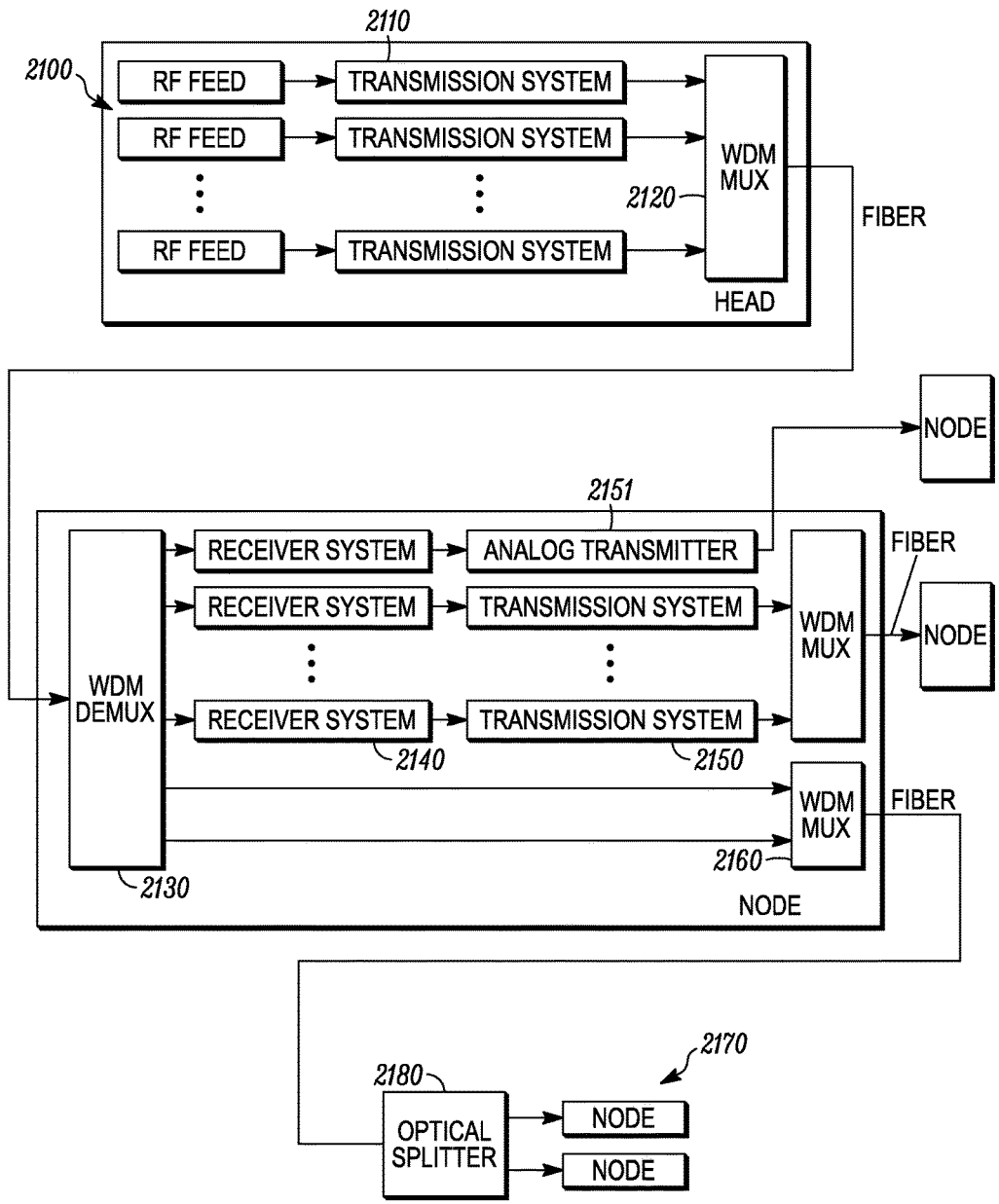

FIG. 43 shows another embodiment of the digital fiber transmission system suitable for including together with existing hybrid fiber/coax networks, in which transmission systems may be used to bypass a hub or to perform a hub-to-node conversion. In this case RF feeds 2100 are sent to the transmitter systems 2110, which may preferably be any of those described in FIGS. 8-24, where they are sampled and digitized for transmission. Receiver systems 2110 may preferably be any of those described in FIGS. 8-24. Many transmitter system outputs can be combined onto a single fiber using, for example, an optical power combiner or a WDM multiplexer 2120, if they operate at different wavelengths. The digital wavelengths are delivered to the child hub or the node used in the hub to node conversion where they can be separated using, for example, an optical WDM demultiplexer 2130. Once separated, the digital bit streams can be converted back into RF spectrums by receiver systems 2140, after which they can either be fed into standard analog transmitters 2151 (or converted once again back into digital bit streams using additional transmitter systems 2150) and distributed to the fiber nodes. In addition, outputs from the optical demultiplexer 2130 in the child hub or node can be sent directly to fiber nodes 2170 either on independent fibers, or recombined and re-split using optical WDM multiplexers/demultiplexers 2160, optical power combiners, and/or optical power splitters 2180. A use for this class of embodiment would be to enable a node to act as a "virtual hub" to distribute signals to multiple nodes further downstreram. This can then enable physical hub consolidation.

Figure 44:
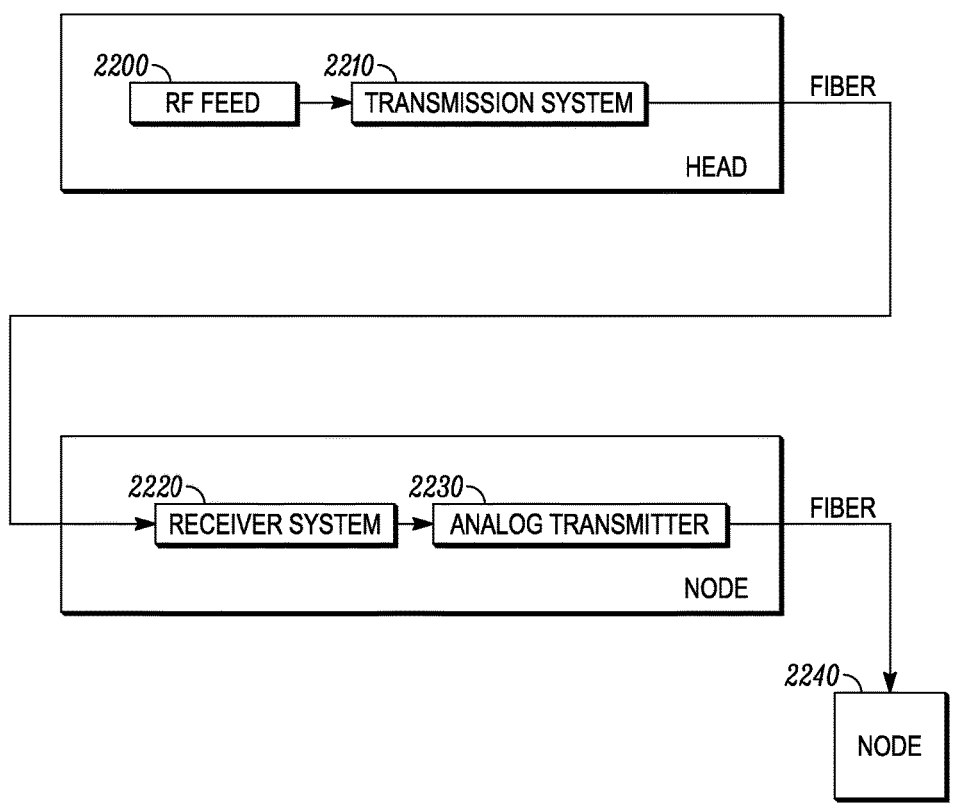

FIG. 44 shows another embodiment of the digital fiber transmission system suitable for including together with existing hybrid fiber/coax networks, in which a transmission system may service a legacy fiber node with an analog downstream optical receiver. In this example, RF feed 2200 is connected to a transmitter system 2210, which may preferably be any of those described in FIGS. 8-24, for distribution to the optical network. This signal is received by a receiver system 2220 that has been physically disassociated with the fiber node 2240 it is serving. The modified receiver system 2220 converts the digital bit stream back into an RF spectrum and passes the signal to an analog optical transmitter 2230. In this example, the connection between this receiver system 2220 and the node 2240 it serves may be very short, in which case the performance of the analog transmitter does not need to be particularly good. The analog optical output of receiver 2200 is then connected to the optical node it is serving, allowing the operator to continue to utilize their existing node base while taking advantage of the advantages of a transmission system. A use for this class of embodiment would be to enable a digital transmission to be deployed as an "add on" to existing analog nodes.

Figure 45:
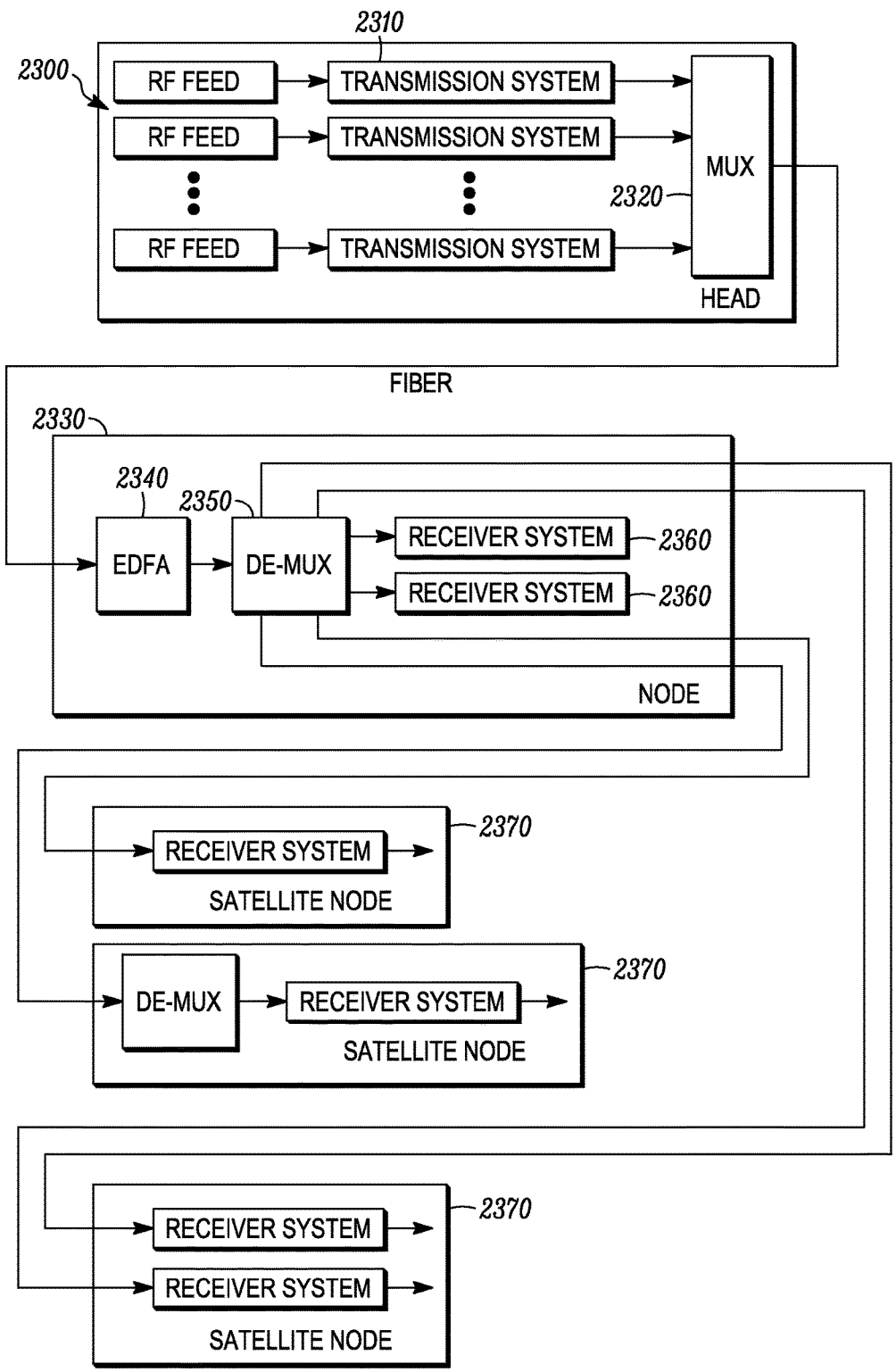

FIG. 45 shows another embodiment of a digital fiber transmission system suitable for integration with existing hybrid fiber/coax networks, where multiple transmitter systems may be utilized to efficiently segment a fiber node and drive fiber deeper within the transmission cascade using amplifier-to-node conversion. RF feeds 2300 are created in the hub or head end and are connected to independent transmitter systems 2310 which are operating at different wavelengths. These transmitter outputs are combined together onto a single fiber using, for example, an optical WDM multiplexer 2320 or an optical power combiner and are sent down the fiber to the primary node 2330 within the serving area which is going to be segmented. Often, in cases where many optical wavelengths are being combined and separated, an EDFA 2340 will be used to overcome the losses in the optical WDM couplers and decouplers. In the case of a digital bit stream, such as illustrated, the likelihood of requiring an EDFA 2340 and the requirements placed upon the EDFA 2340 is far more relaxed than in an analog application. The output of the EDFA 2340 (if included) is then fed into an optical WDM demultiplexer 2350 to separate the wavelengths of the respective signals. In this case, some of the signals at specified wavelengths are connected to local receiver systems 2360 for segmenting the primary node in the system. Other signals at their own distinct wavelengths are delivered via fiber to new satellite nodes 2370 which have been created by converting amplifiers into nodes, or to new nodes which have been installed to reduce the sizes of the serving groups per node. A use for this class of embodiment would be to enable splitting of existing nodes without the need to add additional fiber to the head end to node link.

Figure 46:
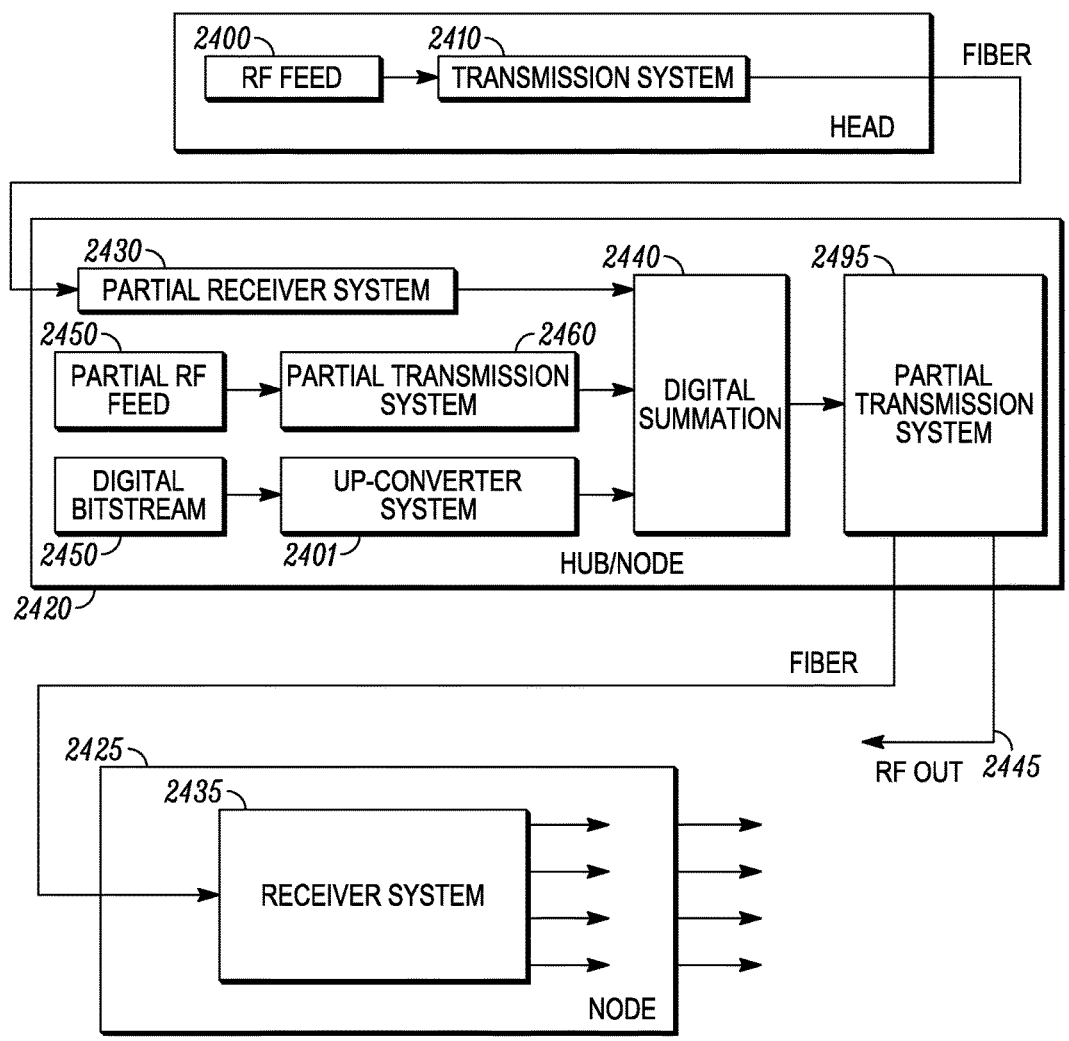
FIG. 46 shows an exemplary embodiment of a digital transmission system suitable for a hybrid fiber/coax system that processes local narrowcast insertions using partial receiver and transmission systems.
Figure 47:
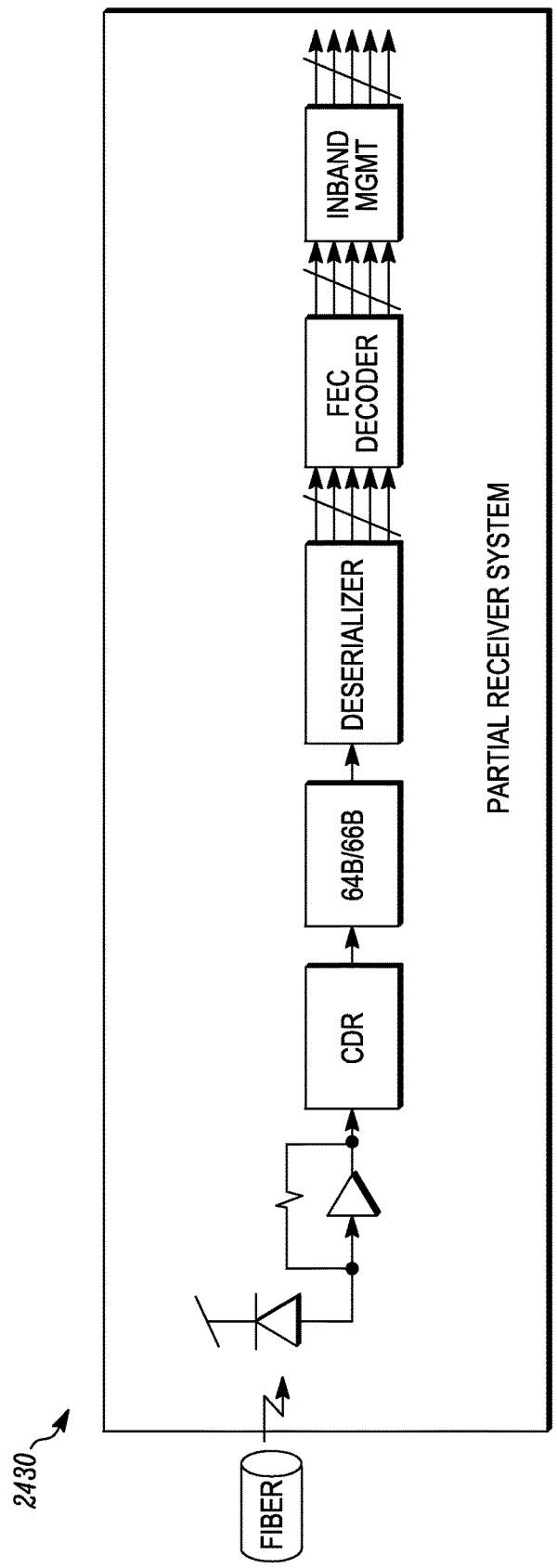
FIG. 47 shows an exemplary embodiment of the partial receiver system of FIG. 46.
Figure 48:
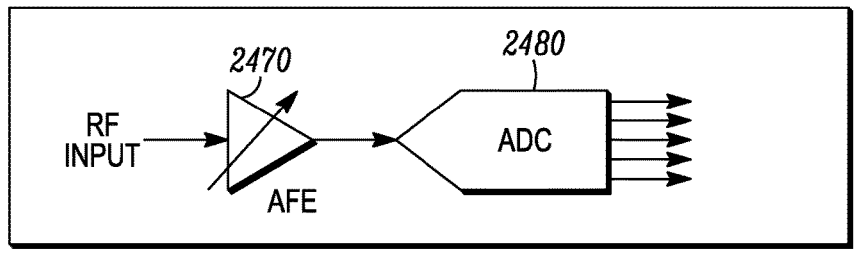
FIG. 48 shows an exemplary embodiment of the partial transmitter system of FIG. 46.
Figure 49:
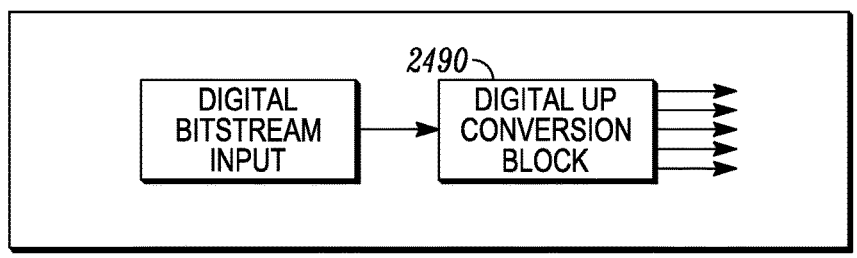
FIG. 49 shows another exemplary embodiment of the partial transmitter system of FIG. 46.
Figure 50:
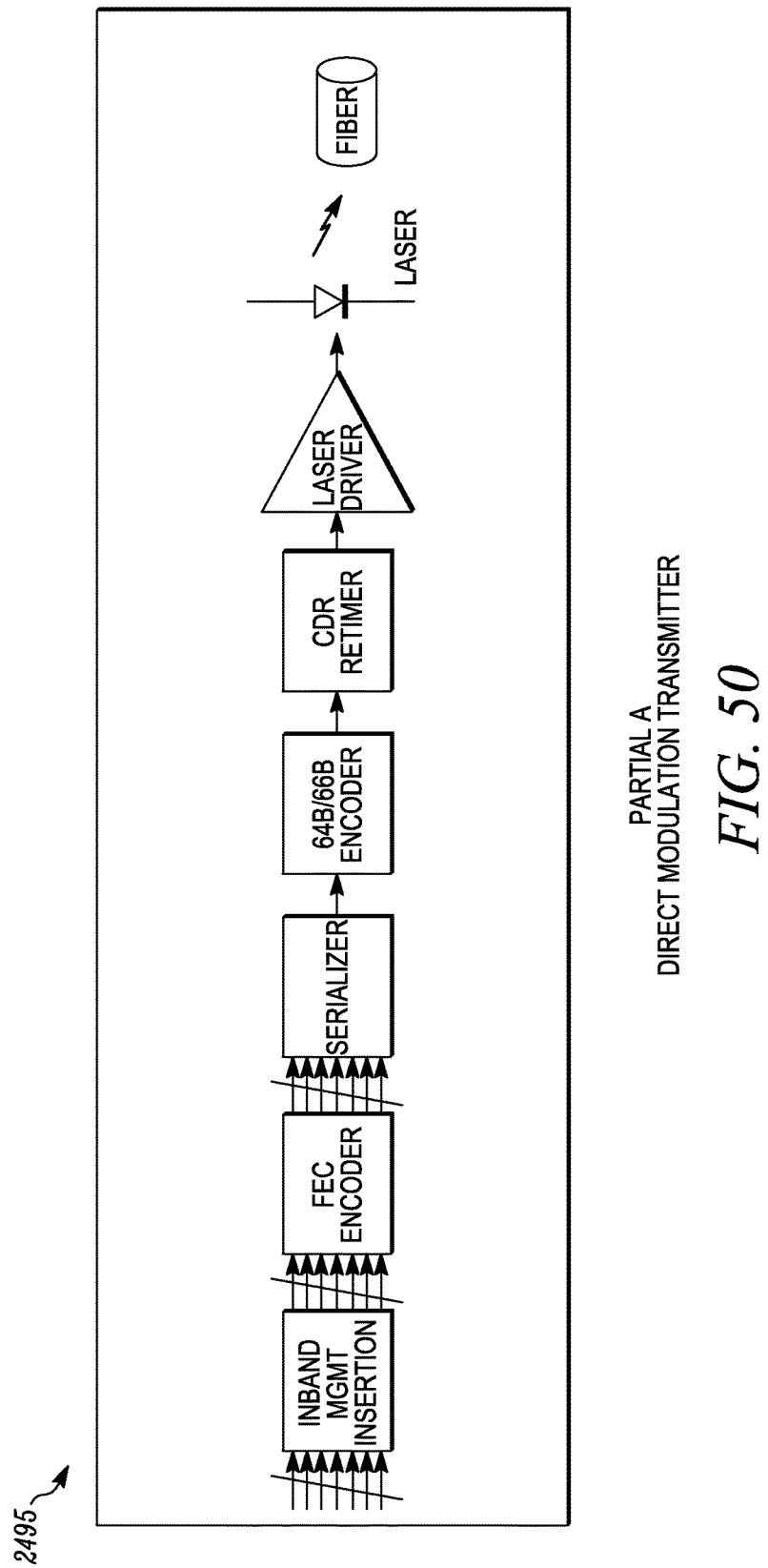
FIG. 50 shows a partial direct modulation transmitter system capable of use in the system of FIG. 46.
Figure 51:
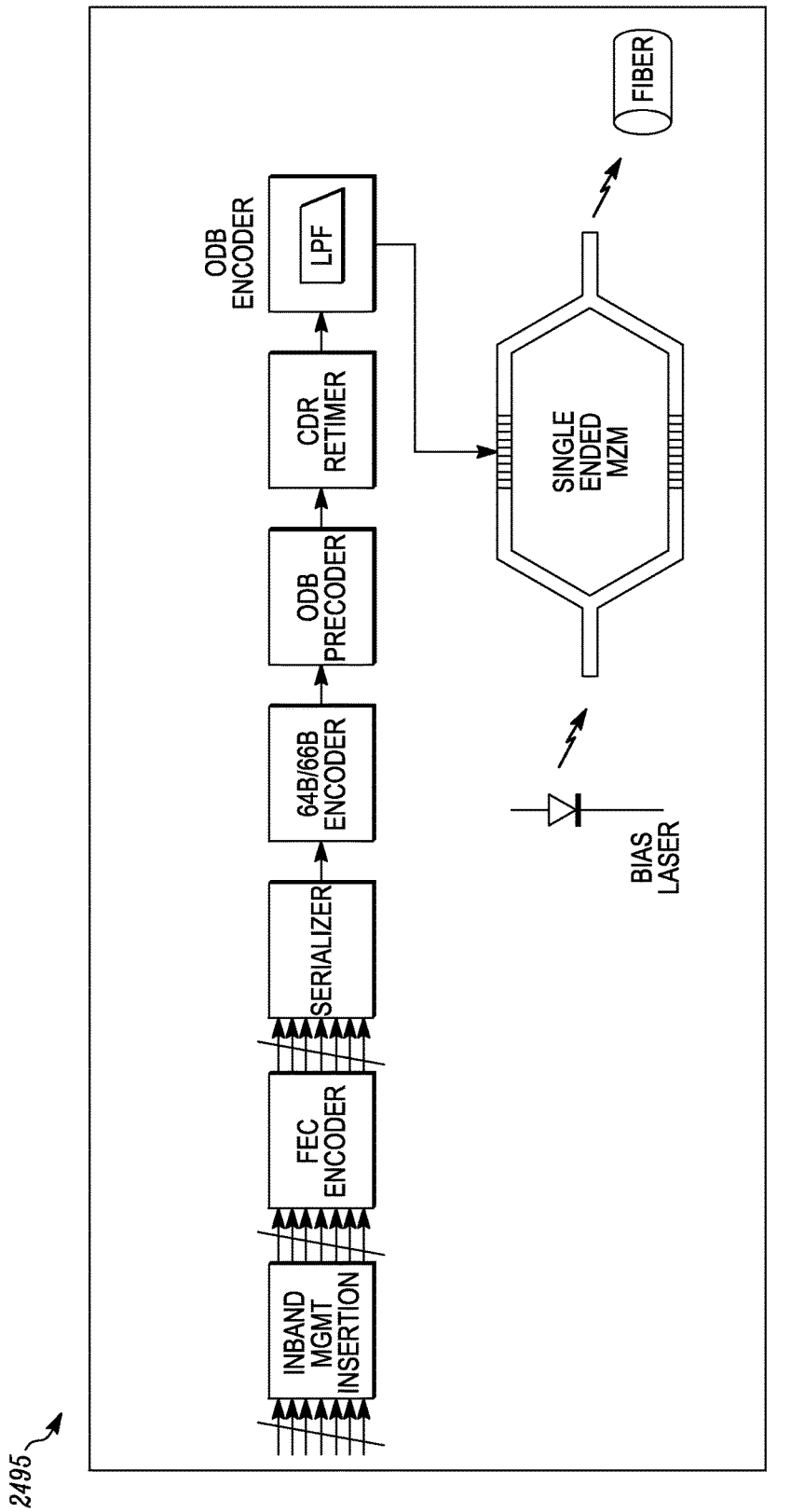
FIG. 51 shows a partial externally modulated transmitter system capable of use in the system of FIG. 46.

FIG. 46 shows an embodiment of a digital fiber transmission system suitable for including together with existing hybrid fiber/coax networks. An RF feed 2400 is generated at a head end. The RF feed 2400 may typically be a broadcast spectrum that will be shared across a large number of end customers. This RF feed 2400 is sent to a transmitter system 2410 where it is converted into a digital optical bit stream and launched into the fiber. The fiber delivers the signal to a partial receiver system 2430 in a hub/node 2420 where local insertion occurs through partial RF feeds 2450. FIG. 47 shows one illustrative example of a partial receiver system 2430. Once the partial receiver system 2430 converts the signal from optical to electrical and removes all of its encoding so that it can be processed digitally, the signal is fed into the digital summation block 2440. Narrowcast local insertion of partial RF feeds 2450 can either be added from an RF source, converted to digital format with an ADC, or from a digital bit stream source such as Gigabit Ethernet. In the case where the narrowcast insertion is provided in an RF form, the RF narrowcast spectrum is sent to one or more partial transmission systems 2460 which may each comprise an Analog Front End 2470 and A/D Converter 2480 as shown in FIG. 48. This output is then sent to the digital summation block 2440. In the case where the local narrowcast insert is provided in a digital bit stream form, the upconversion systems 2401 receiving the digital data may comprise a digital up conversion block 2490 as illustrated in FIG. 49, and the output sent to the digital summation block 2440. The digital conversion clock frequency which is used in the initial transmitter is the same as the frequency used in the conversion clock used by the A/D Converter 2480 in the partial transmission system used for the RF insert. This same frequency may be used by the sample generator inside of the digital up conversion block 2490 in the digital bit stream insert. Inside of the digital summation block, the samples are broadcast and narrowcast inputs are synchronized, added, and scaled mathematically. The output of the digital summation block is then sent to a partial transmission system 2495. This partial transmission system may be a subset of the full transmission systems illustrated in FIGS. 8-24, omitting or bypassing the ADC or the digital up conversion block as applicable in those full transmission systems. FIG. 50 illustrates one example of a partial transmission system 2495 having a directly modulated transmitter. FIG. 51 illustrates one example of a partial transmission system 2495 having an externally modulated transmitter.

The output of the partial transmission system 2495 may be fed to a receiver system 2435 at a node 2425 downstream from the node 2420. Though the partial transmission system 2495 preferably delivers a digital signal down the fiber by means of optical pulses through laser transmitters such as those shown in 50 and 51, the partial transmission system 2495 may instead be configured to deliver an RF signal to the node 2425 through RF output 2445 according to conventional RF transmission techniques, or may even be configured to deliver any combination of digital and RF signals, separated by distinct optical wavelength bands, through the techniques disclosed in FIGS. 36-45. A use for this class of embodiment would be to enable insertion of signals at a hub or node using digital summation techniques rather than RF combining. For example a broadcast signal could be transmitted from the head end over a long distance to a hub where it is combined with narrowcast signals specific to the serving area. The narrowcast signals may originate as either RF or a digital bitstream The previous examples illustrate numerous deployment scenarios in which the methods of the present disclosure may be used. This is not a complete list and other scenarios can be derived from the basic building blocks described.

As can be seen from the foregoing disclosure, one key advantage of substituting digital transmission for analog RF signals is the increase in transmission distance that a CATV signal can travel over fiber optic transmission lines. The approaches described in the foregoing disclosure require a high bit rate link when serial digital bit streams are used. In an HFC (Hybrid Fiber Coax) plant, typically fiber optic cables are used to carry the link from the head end or hub to the fiber node, where the optical link is converted into an RF link for coax distribution. While digital links are typically far more tolerant of distortion or impairment due to spectral dispersion than analog links, they are not immune from such distortion or impairment. Also, as the data rate of the digital link increases, the penalty due to dispersion increases at an even greater rate due to a combination of shorter bit time and greater spectra spreading.

In addition, as application of the teachings of the foregoing disclosure enables operators to carry a larger number of optical signals over longer fiber links, the ability to compensate for the effects of dispersion become more important. Typical approaches to compensate for dispersion involve manual compensation, which is not always practical—particularly when dealing with large numbers of access side links that may not have accurate build topology information, which is typical with core or metro fiber optic networks. Thus it would be greatly beneficial to provide a more effective approach for automatically compensating for the negative effects of dispersion on an optical signal.

Figure 52:
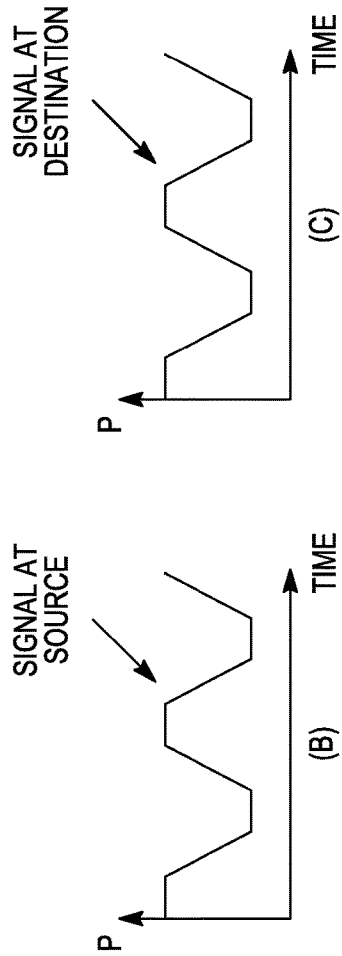
FIGS. 52 and 53 illustrate optical dispersion.

FIG. 52 shows the optical spectrum of a theoretical "zero dispersion" signal when spectral spreading due to the modulation has been ignored. As can be seen in the graph marked (a) there is only a single theoretical wavelength present. The graph marked (b) shows the time domain waveform at the point where the signal is launched into the fiber, which in this case is a simple pulse train. The graph marked (c) shows the time domain waveform after it has traveled through the fiber across a distance which would show measureable dispersion at the chosen bit rate. In this case, because the signal contains only a single wavelength, the signal at the destination shows no dispersion.

Figure 53:
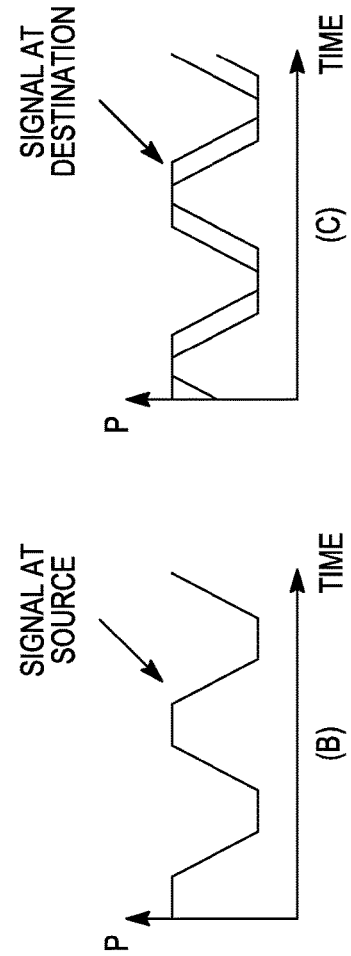

FIG. 53 shows a theoretical bi-modal dispersion signal, where the term "bi-modal" refers to the fact that the laser emits at two wavelengths, as can be seen in the graph marked (a). The graph marked (b) shows the time domain waveform at the point where the signal is launched into the fiber, which in this case again is a simple pulse train. The graph marked (c) shows the time domain waveform after it has traveled through the fiber across a distance which would show measureable dispersion at the chosen bit rate. In this case, because the two wavelengths which compose the signal travel at slightly different speeds through the fiber, the signal at the destination looks like the original time domain signal plus an identical copy which is slightly delayed in time. The further apart in wavelength the two modes of the laser, the greater the time delay between the two signals at the destination, and consequently the more severe the dispersion penalty. In addition, the relative propagation delay through the fiber for the two wavelengths is not dependent upon the bit rate of the transmitted signal, therefore the shorter the bit time, the less tolerant the signal of interest will be of dispersion effects through the fiber.

The scenarios described with respect to FIGS. 52 and 53 describe the theoretical relationship between bit rate and dispersion penalty due to a fixed amount of spectral spreading. In reality, bit rate and spectral spreading are linked and combine to create an even greater sensitivity to dispersion penalty.

Figure 54:
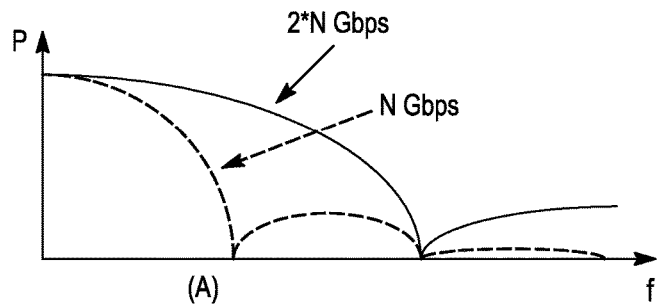
FIG. 54 shows the frequency spectrum of two PRBS patterns.

When a laser's output light is modulated, the carrier wavelength spreads based upon the frequency transformation of the modulating waveform. FIG. 54 shows the frequency spectrum of two different PRBS (Pseudo Random Bit Stream) patterns. A PRBS pattern is a commonly used simulation of actual signal content as would exist in a commercial system. The lower spectrum, represented by the dotted line, is a PRBS pattern at a nominal bit rate at "N Gbps". The upper spectrum, represented by the solid line, is a PRBS pattern at a bit rate twice that of the nominal spectrum. Furthermore, the frequency spectrum of the pattern which is operating at twice the bit rate is also twice as large.

Figure 55:
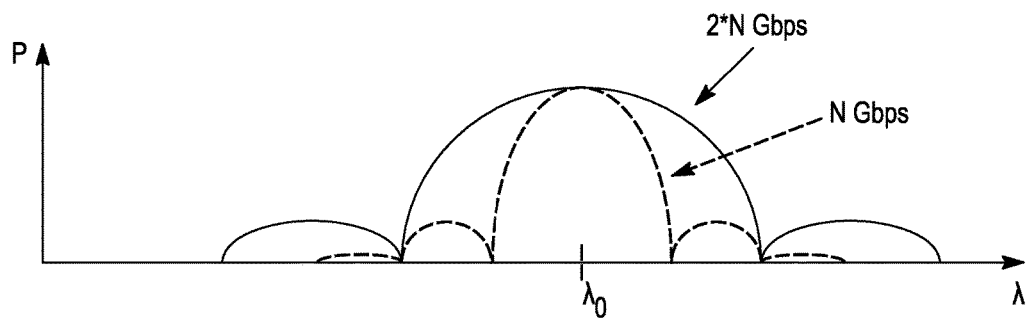
FIG. 55 shows spectral spreading of an optical signal as a function of wavelength.

FIG. 55 shows a plot of the upper and lower spectrums of FIG. 54 modulated on a laser wavelength plot. In this plot, the spectral spreading is simply a $Sinc^2$ function of the modulation waveform centered about the nominal wavelength of the laser ($\lambda_0$). The higher the data rate of the PRBS pattern, the more spectral spreading is observed. This creates a particularly challenging problem from the point of view of system implementation because as the data rate of the link is increased, a dispersion penalty occurs twice. The first penalty is due to the greater wavelength spreading. This means a larger delta in the relative wavelength propagation delay. The second penalty is due to the shorter bit time, which makes the message signal less tolerant of waveform degradation due to dispersion.

The dispersion power penalty can be approximately as $$P_D = 5 \log(1 + 2\pi(BDL\sigma)^2)$$

where D is the dispersion coefficient of the link, L is the link distance, is the spectra spreads and the B is the transmission data rate. Without the compensation, the fiber link distance is limited by $$L < \frac{8\lambda^2 D}{\pi c B^2}$$

With optical duobinary format transmission, the optical spectra spread can be reduced to ¼ and thus dispersion tolerance will increase four times. For system implementation, pre-chirping the modulator and making it negatively chirped so that less dispersion compensation may also be needed. Pre-chirping the modulator and making it negatively chirped may also be necessary for an over-clocked transmission system, where a narrow band spectrum is being transported. This advantage can mainly be achieved by receiver equalization, not transmitter equalization The dispersion-caused eye closure can also be a result of transmitter chirp. The chirp refers to the instantaneous frequency shift. For a directly modulated laser, the chirp is usually positive, which means the front of wave form has low frequency while the rear of the waveform has higher frequency. Due to the dispersion of the fiber, the waveform will be spread quickly. For an external modulated laser (EML), the chirp can be designed as either positive or negative. An EML used in the Gbps and 28 Gbps transmitter can also be used to make chirp positive or negative. A negative chirped system is preferred.

The present disclosure describes the use of a digital bit stream transmission system to deliver broadband RF signals in a number of different fiber optic network segments. These network segments are typically described as "core", "metro" or "access". As CATV operators move to drive fiber deeper into their networks, and also work to consolidate their Head Ends and Hubs, there is a need to combine more signals at different respective optical wavelengths per fiber and to simultaneously transmit these signals over greater and greater distances. The result will be for dispersion to become a major limitation of the distances that these signals can travel and the fiber topology data, which would be used to calculate the distance that the fiber optic signal must travel, will become less accurate. In addition, the number of fiber optic links and wavelengths that will need to be compensated will increase exponentially. A manual trial and error approach could be used, but it would be unnecessarily cumbersome.

There are a few types of commonly used dispersion compensation technologies. The first one is using dispersion compensation fiber with a dispersion response that is the inverse of the fiber used in the physical plant. Thus the total dispersion can be minimized. The second is the fiber Bragg compensation; the third is the etalon. Both fiber Bragg grating (FBG) and etalon can be made tunable. The automatic dispersion compensation can be implemented by tunable Bragg grating, tunable etalon filter and electronic compensating methods. In addition, the electronic dispersion compensation can be made tunable and adaptive.

Figure 56:
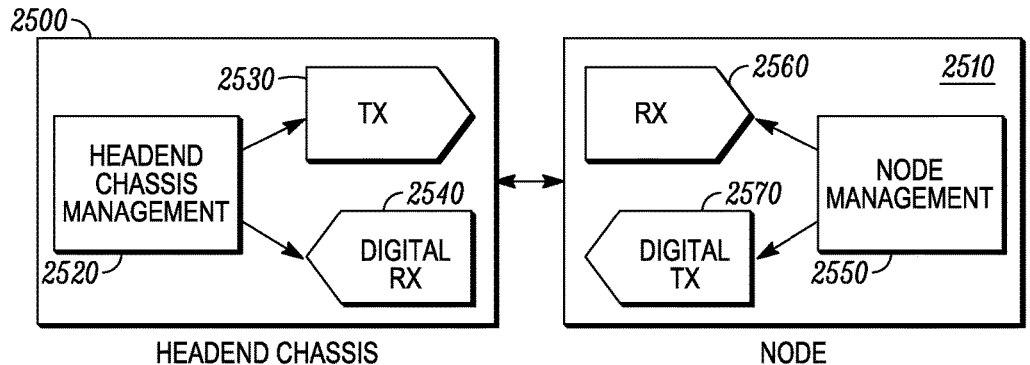
FIGS. 56 and 57 show a system that compensates for optical dispersion.
Figure 57:
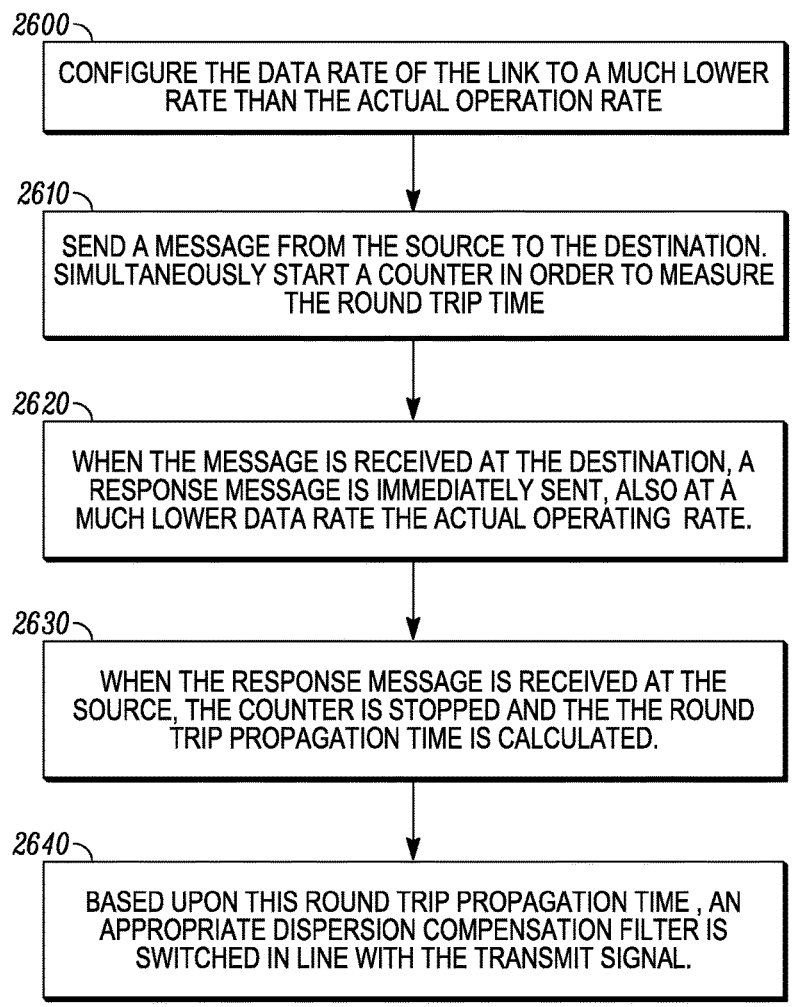

FIGS. 56 and 57 generally show a novel automated dispersion compensation technique for a fiber-optic network. Referring specifically to FIG. 56, a head end chassis 2500 preferably communicates with at least one node 2510. The head end chassis 2500 preferably includes a chassis management module 2520, a transmitter 2530, and a receiver 2540. The transmitter 2530 and receiver 2540 are preferably digital. Similarly, the node 2510 preferably includes a node management module 2550 along with a receiver 2560 and transmitter 2470, again both preferably digital. The transmitters and receivers of the head end chassis 2500 and the node 1510, respectively, may preferably be any of those shown in FIGS. 8-32.

The head end chassis 2500 and node 2510 are preferably configured to execute an auto-range mode that automatically determines the distance that an optical signal travels between the head end chassis 2500 and the node 2510, and on that basis, automatically correct for dispersion over that distance. The auto ranging mode may require that the transmitter and receiver have a common path to pass data. The auto-ranging procedure, which can be implemented in many different architectures, is generally illustrated in FIG. 57. In step 2600, the data rate of the link is configured to a much lower rate than the actual processing rate, i.e. any data rate where the chromatic dispersion penalty is not significant, and the transmitters and receivers on both the head end chassis 2500 and the node 2510 still work well, with or without the special configurations disclosed below.

Figure 58:
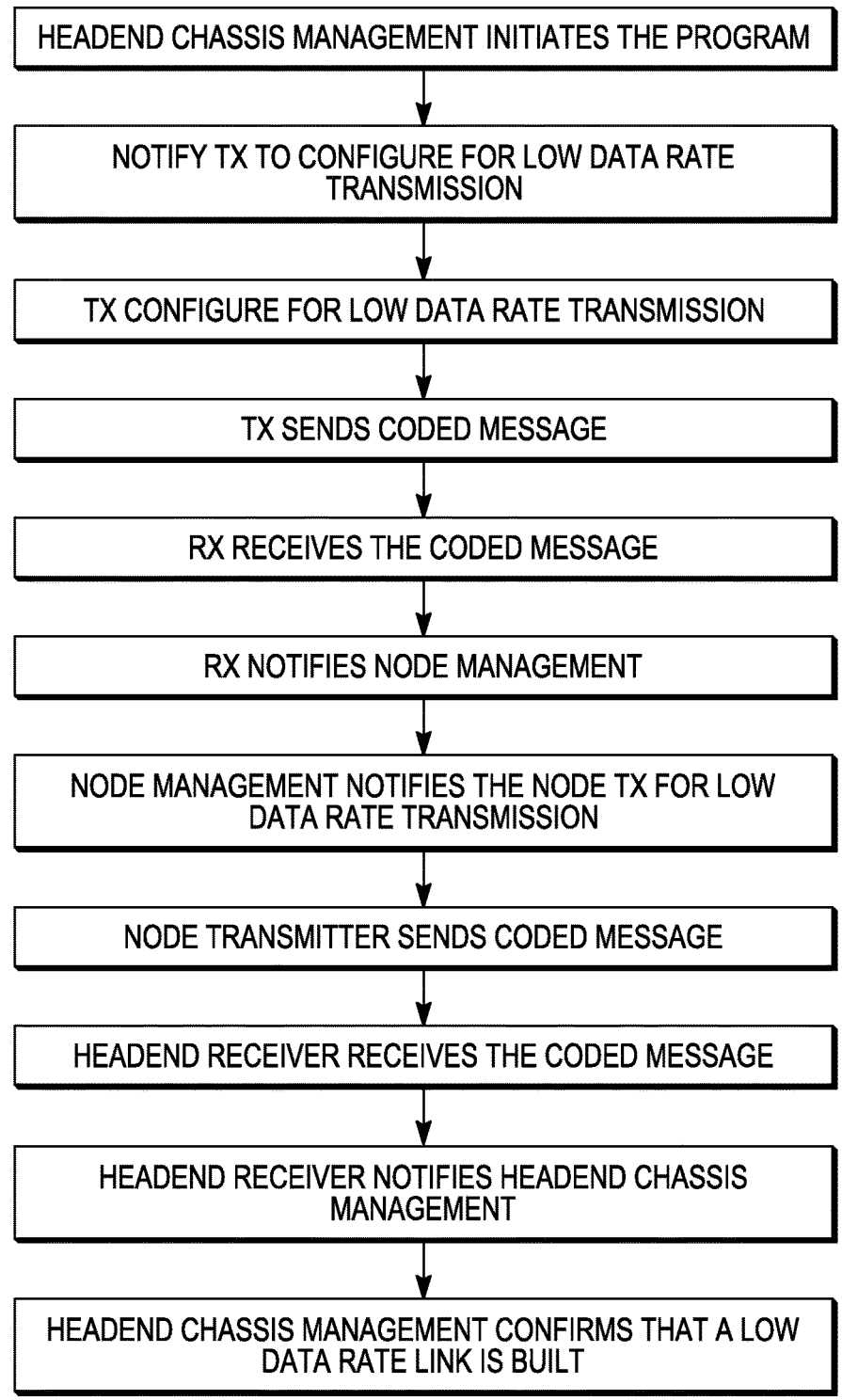
FIGS. 58-60 each show a respective routine by which low data rate, for determining the amount of dispersion in an optical transmission path, can be initiated by the system shown in FIGS. 56 and 57.
Figure 59:
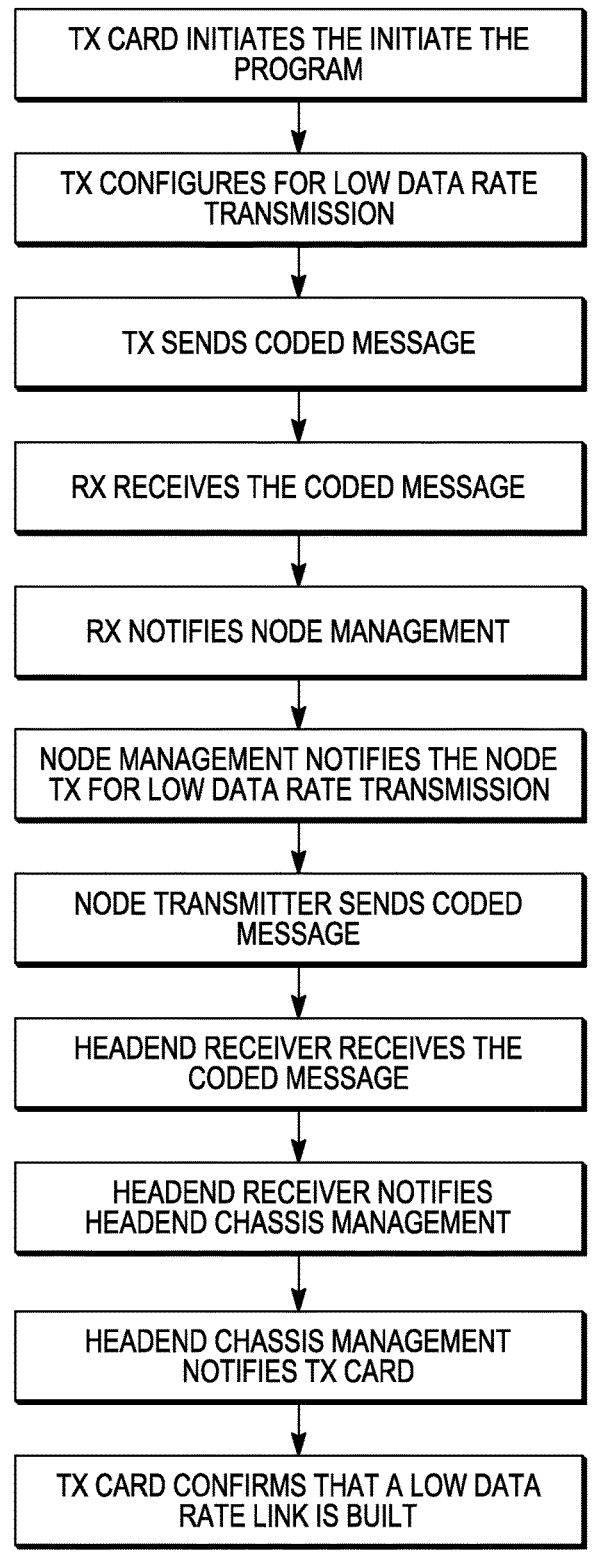
Figure 60:
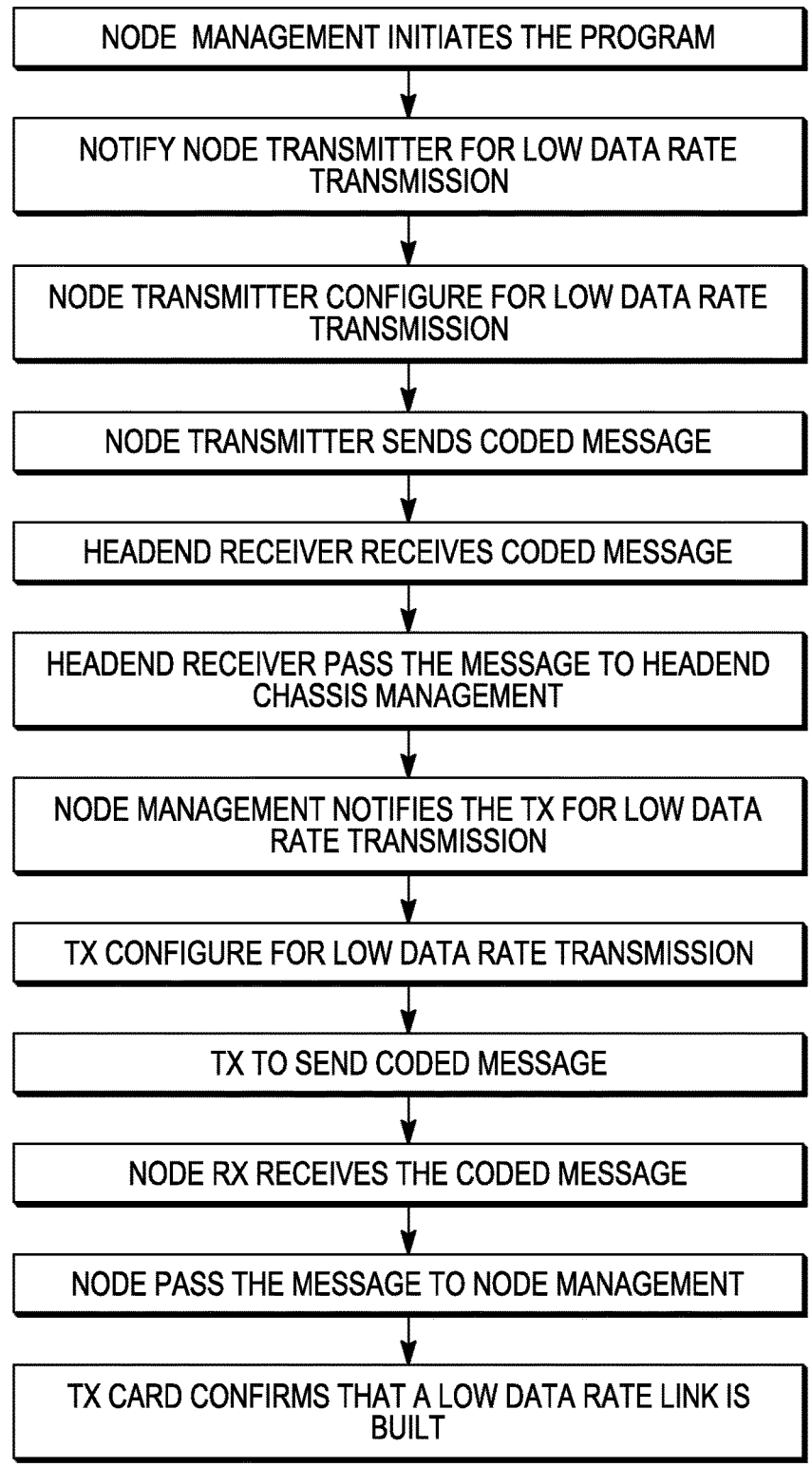

This lower data rate may be achieved by many different software routines executed between the head end chassis 2500 and the node 2510, as illustrated by FIGS. 58-60. FIG. 58, for example, illustrates a routine where the head end chassis management module 2520 initiates the low data rate transmission. Similarly, FIG. 59 illustrates a routine where the transmitter 2530 initiates the low data rate transmission while FIG. 60 illustrates a routine where the node management module 2550 initiates the low data rate transmission. This reduction in data rate can be accomplished by using the same system clock rate, but by creating a transmit bit pattern that has extended strings of logic ones and zeros such that the bit pattern appears to be a much lower rate binary signal.

After the low data rate has been achieved, the routine proceeds to step 2610 where either the transmitter 2530 in the head end chassis 2500 or the transmitter 2570 in the node 2510 sends a message to the receiver on the other end of the transmission link, i.e. either receiver 2560 or receiver 2540. At the same time, a counter is started. In step 2620, when the message is received at the destination, a response is immediately sent, also at a much lower data rate than the actual operating rate and preferably at the same rate that the message from the source was sent. In step 2630, when the response is received at the source (i.e. the originator of the message for which the response was sent), the counter is stopped and the round trip propagation time is calculated.

Figure 61:
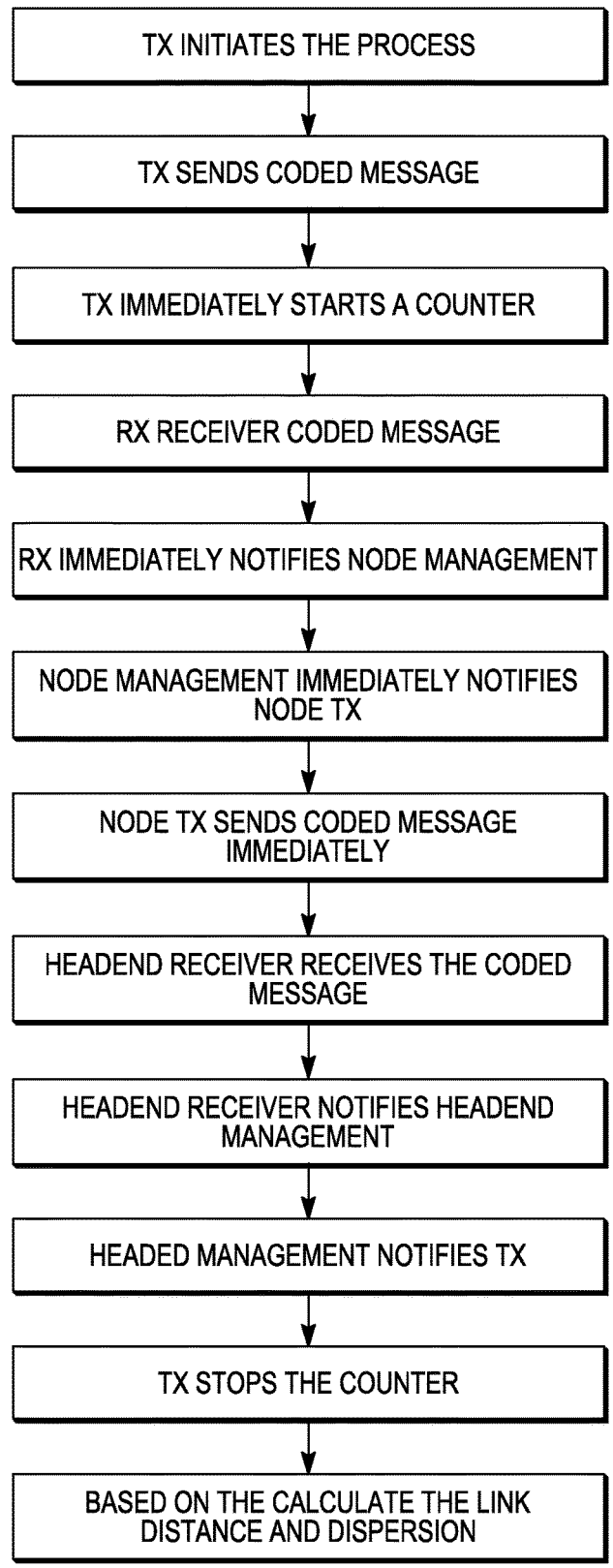
FIGS. 61-63 each show a respective routine by which dispersion can be estimated by the system shown in FIGS. 56 and 57.
Figure 62:
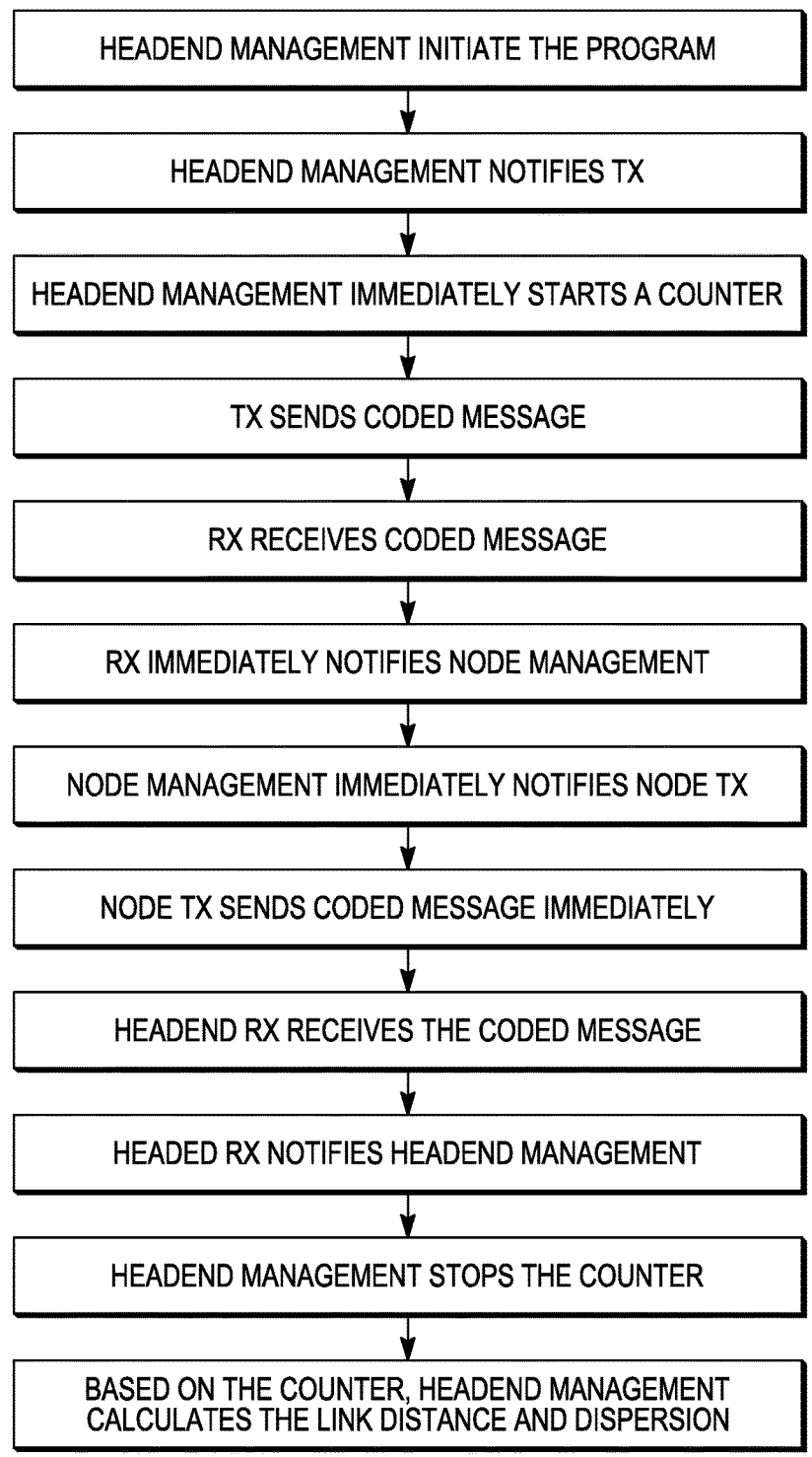
Figure 63:
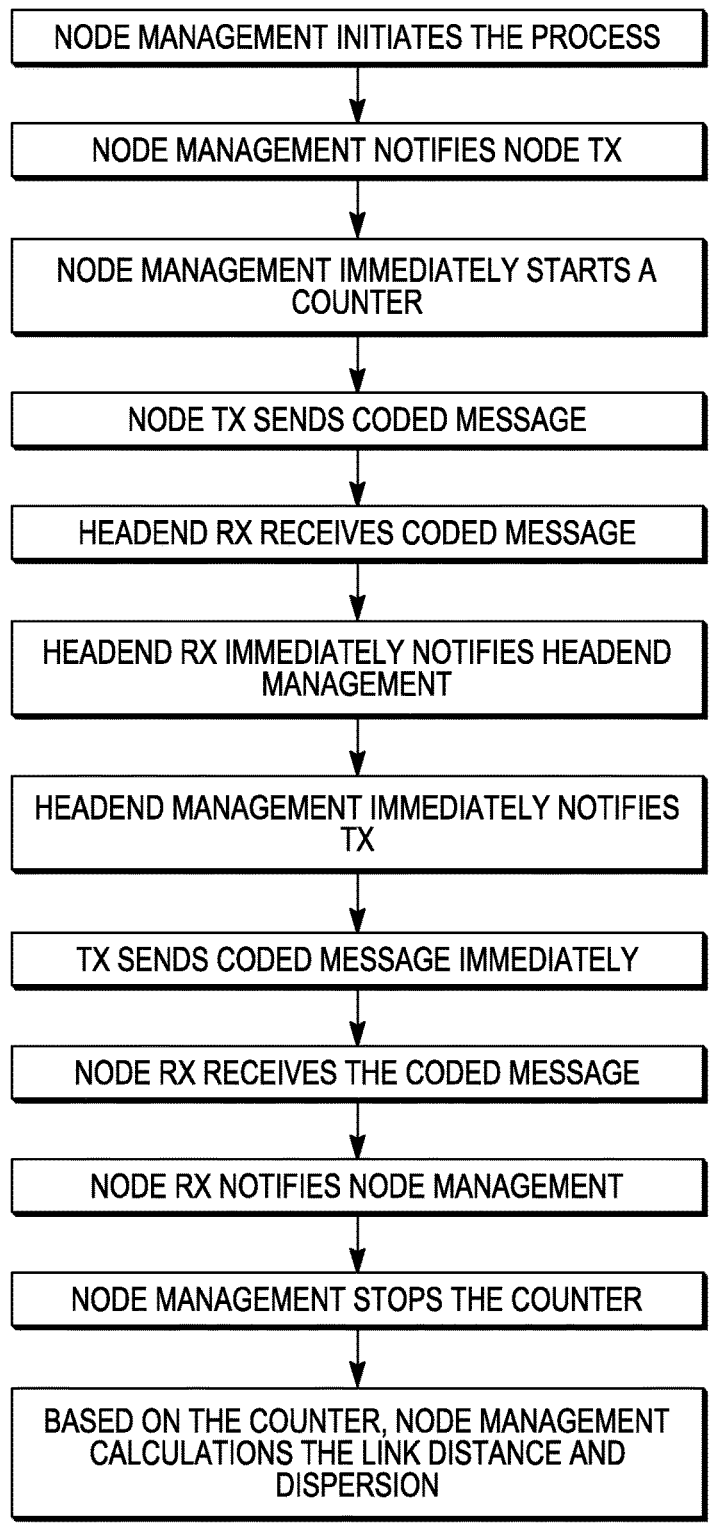

Steps 2610 to 2630 may be achieved by many different software routines executed between the head end chassis 2500 and the node 2510, as illustrated by FIGS. 61-63. FIG. 61, for example, illustrates a routine where the transmitter 2530 performs these steps. Similarly, FIG. 62 illustrates a routine where the head end chassis management module 2520 performs these steps while FIG. 63 illustrates a routine where the node management module 2550 performs them.

It should be understood that, in the foregoing discussion, though the software routines were described using the assistance of management modules in the head end chassis 2500 and the node 2510, respectively, the involvement of these management modules is not required as long as some form of communication channel between the transmitter and receiver in the head end equipment, and data passing between the transmitter and receiver in the node can be achieved.

Again referring to FIG. 57, in step 2640, once the round trip propagation time has been calculated, an appropriate dispersion compensation filter is applied to the transmission signal. The filter aims to shift the zero dispersion window (or minimum dispersion window) such that it is centered on the receive window based upon the calculated delay through the fiber. This process may, in some embodiments, be semi-automatic, in which case the system would indicate to an operator how much dispersion compensation needs to be provided, or in other embodiments may be fully automatic, where the system itself adjusts or switches in the proper amount of dispersion compensation.

Figure 64:
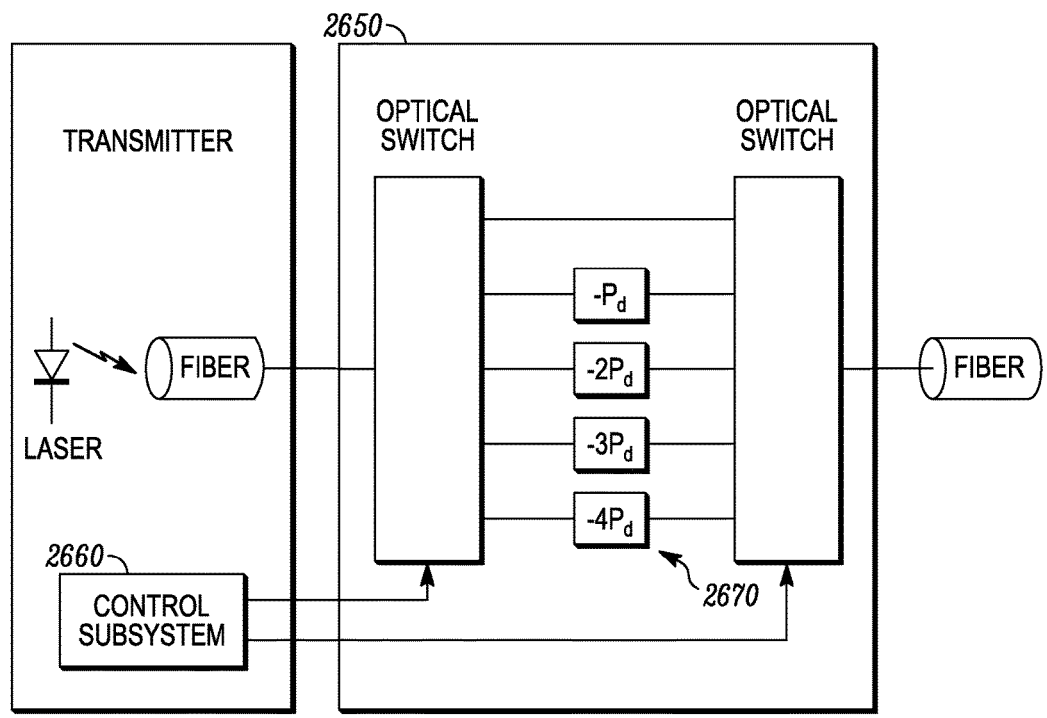
FIGS. 64-66 each show an alternate embodiment of a dispersion compensation filter used in the system shown in FIGS. 56 and 57.

A fully automatic dispersion compensation system may be implemented in several different ways. Referring to FIG. 64, a first approach is to use an optical switch network 2650 which is controlled by the digital control system 2660 in a transmitter in order to switch in the proper amount of dispersion compensation, based upon what is calculated by the delay calculation. The number of compensation elements 2670 included in the switch network, and the granularity of each element may vary from case to case based upon the network implementation. The elements 2670 which are switched in may be fixed or tunable, and may be fiber based or grating based. Furthermore, though the elements 2670 depicted in FIG. 64 are arranged in parallel, other configurations may arrange such elements in series with intervening switches to selectively apply a desired amount of compensation.

Figure 65:
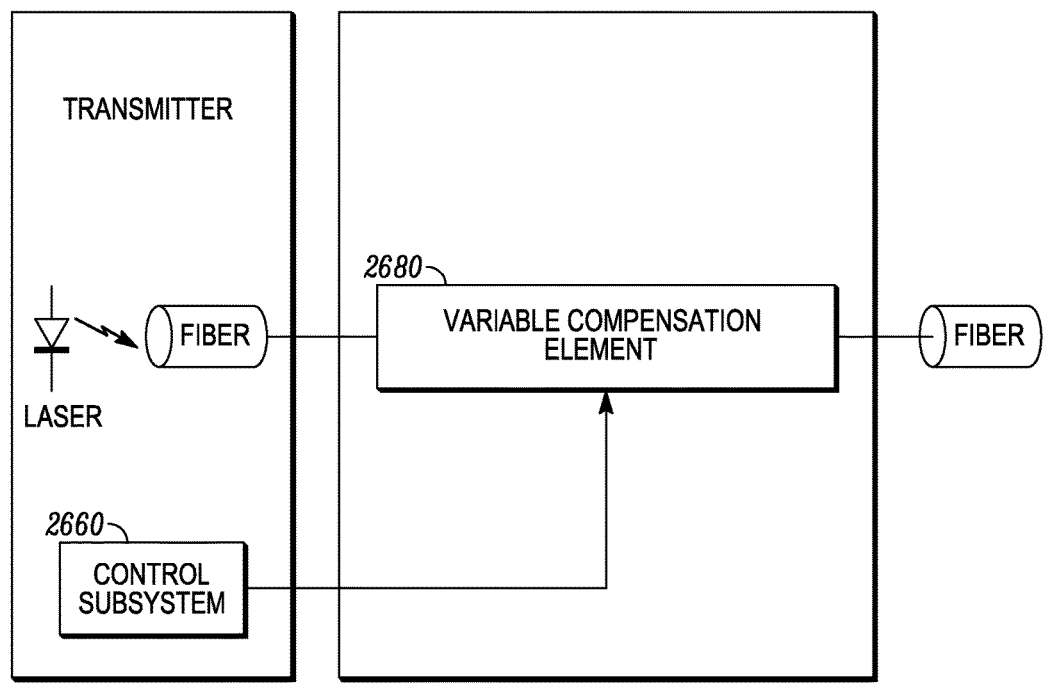
Figure 66:
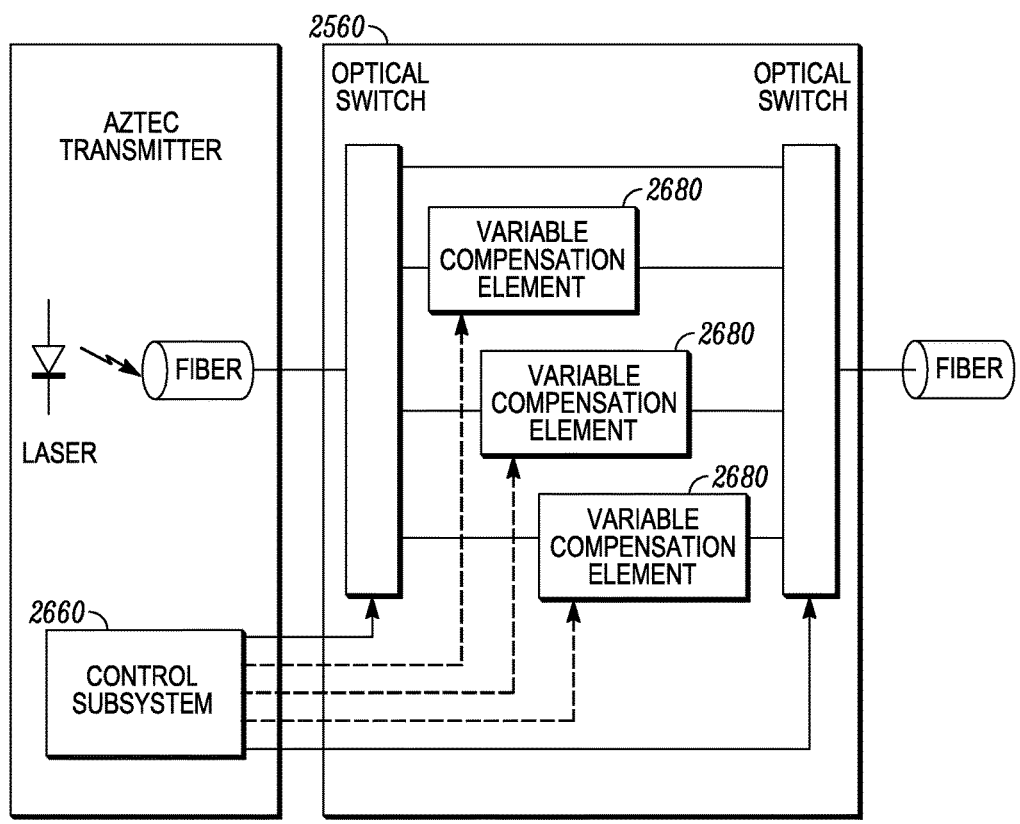

Referring to FIG. 65, a second approach for fully automated dispersion compensation is to use a tunable dispersion control element 2680 which can be controlled by the control subsystem 2660. Referring to FIG. 66, a third approach for fully automated dispersion compensation combines the first two options together into a hybrid solution that includes an optical switch network 2560 controlled by the digital control system 2660. This hybrid solution switches between a plurality of variable compensation elements 2680, where again the granularity of each element may vary from case to case based upon the network implementation. Yet a fourth option for automatic dispersion compensation is to use digital pre-distortion of the signal prior to electrical-to-optical conversion. This approach is easily understood from a system diagram point of view and is not illustrated.

One implementation is to execute auto-ranging mode during initial setup. When this is being done, the configuration program may first build a temporary round trip of low data rate link between the source and node as shown in FIG. 57. Then the program starts the auto-ranging program to find the fiber distance and calculate the total dispersion. Thirdly, a proper dispersion compensation filter module can be installed or switched on, or tuned to the proper dispersion compensation as shown, for example, in any of FIGS. 63-65. Finally, the program shall terminate itself by setting the node and head end transmitters and receivers to the operation mode.

The auto-ranging dispersion compensation technique disclosed herein assumes known fiber (for example G652) with deterministic dispersion properties. For example, G652 fiber has a zero dispersion wavelength $\lambda_0$ between 1300 nm to 1324 nm, and a chromatic dispersion coefficient $S_0$ of less than 0.092 ps/(nm$^2$*km). The uncertainty of the zero dispersion wavelength $\lambda_0$ results in 92% accuracy while a better than normal dispersion coefficient may result in over-compensation. This disclosure may be used in any other point-to-point fiber communication, but success depends on the knowledge of the dispersion properties of the fiber deployed.

In order to facilitate the low data rate link between the head end and node, the transmitter and receiver in both ends may or may not need to have a special configuration. For example, in the transmitters of FIGS. 17 and 18, to implement the auto-ranging and dispersion compensation routine, the in-band management insertion unit 560 may preferably be capable of sending a message down the signal path while ignoring the output of the ADC 550, while the FEC encoder 570 and the ODB precoder should be 600 turned off during the routine (as well as the 64b/66b encoder 590, if desired). Also, if necessary, the CDR retimer 610 may need to be reconfigured.

Figure 67:
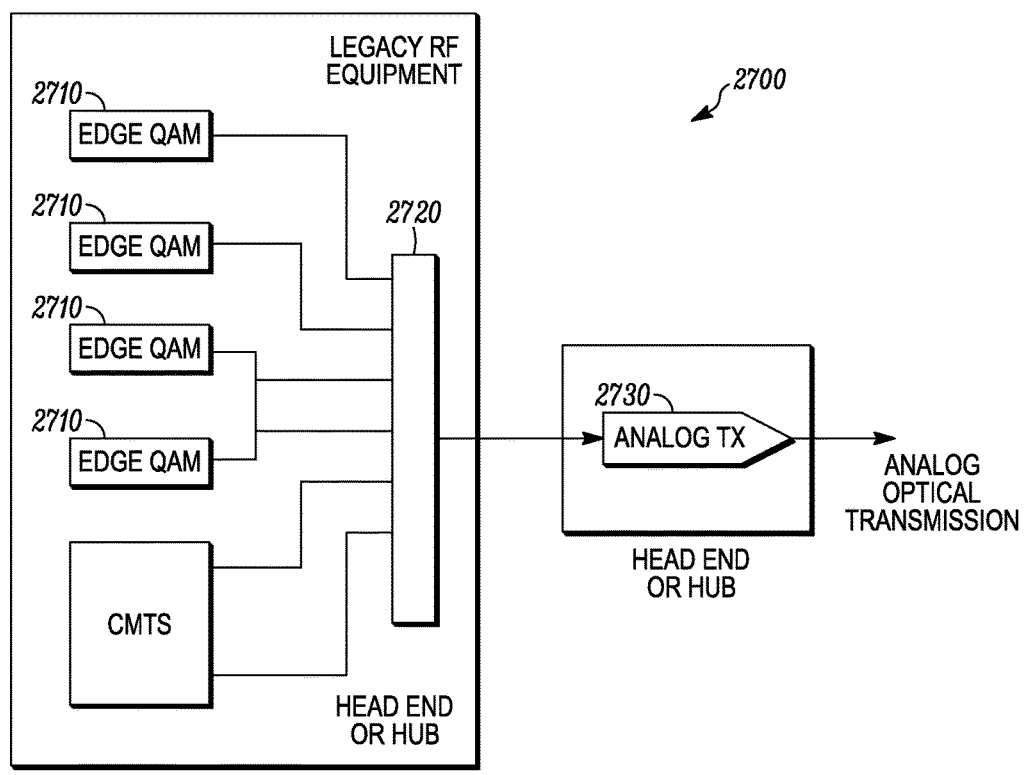
FIG. 67 shows an implementation of a transmitter at a head end.

Referring to FIG. 67, voice, video and data service signals propagated over hybrid fiber coax (HFC) networks from a head end 2700 are typically a combination of analog signals encoded using Quadrature Amplitude Modulation by, e.g. EdgeQAM modulators 2710 or other QAM modulators and are combined together in an RF combining network 2720 into a single spectrum using Frequency Division Multiplexing (FDM). This spectrum is then propagated along the fiber optic signal path using an analog optical transmitter 2730 that modulates the amplitude of a laser or other light-emitting device. Accordingly, a large variety of equipment is required in order to create all the signals that will ultimately be combined onto a single transmission spectrum. Some of these signals may be Broadcast QAMs, which are generally shared across many serving groups. Other signals may be Narrowcast QAMs, which are unique to a particular serving group. Each of the channels is assigned a specific frequency band in which to operate (hence the reference to a television or broadcast "channel"). By placing each channel in a unique band of the frequency spectrum, each can be transmitted simultaneously with minimal interference to the other channels. The terminal device at the location of the customer, whether a TV set, a "set-top" box, or a cable modem, can select a given channel to demodulate and present to the customer.

Figure 68:
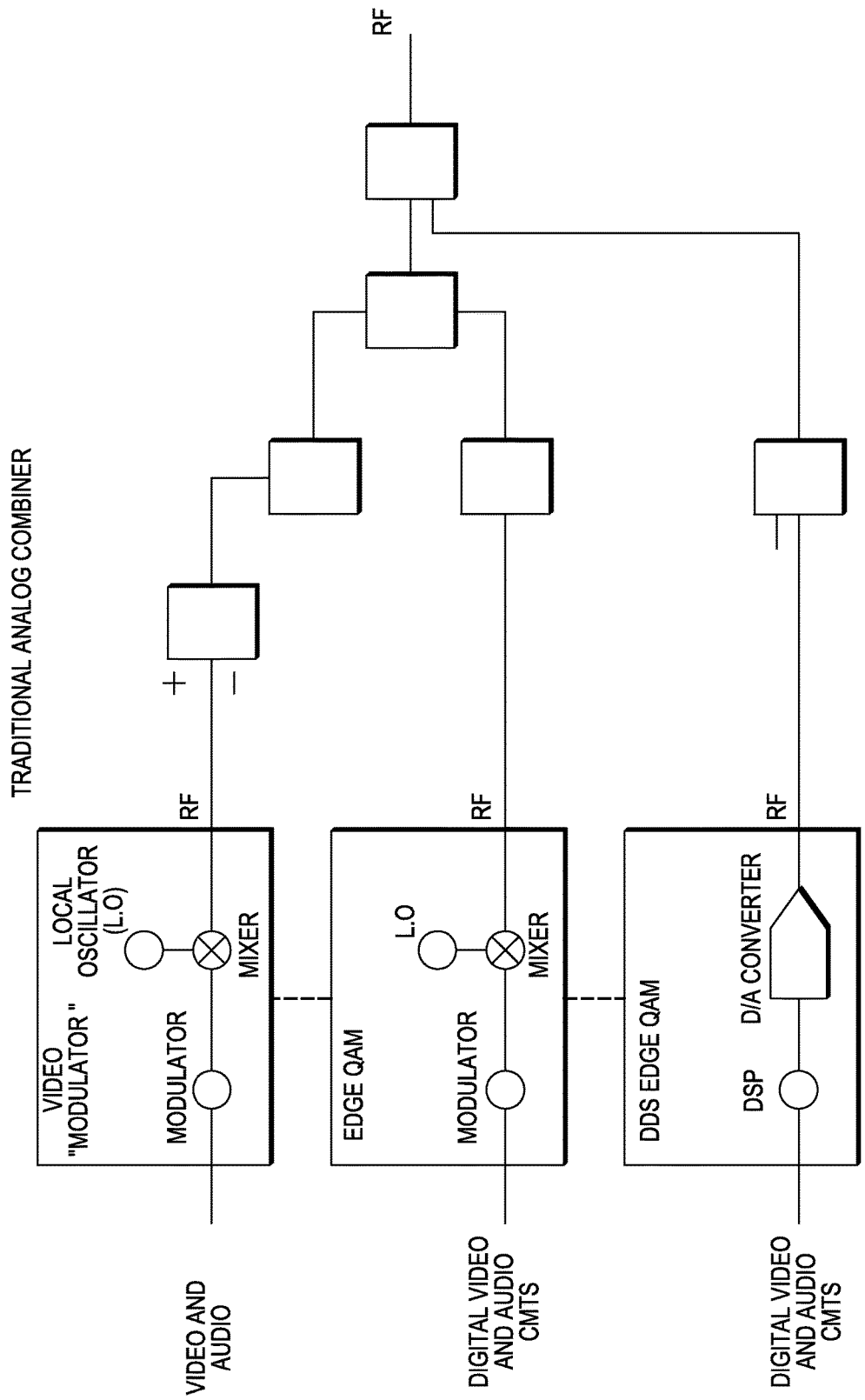
FIGS. 68 and 69 illustrate an RF analog combining network.
Figure 69:
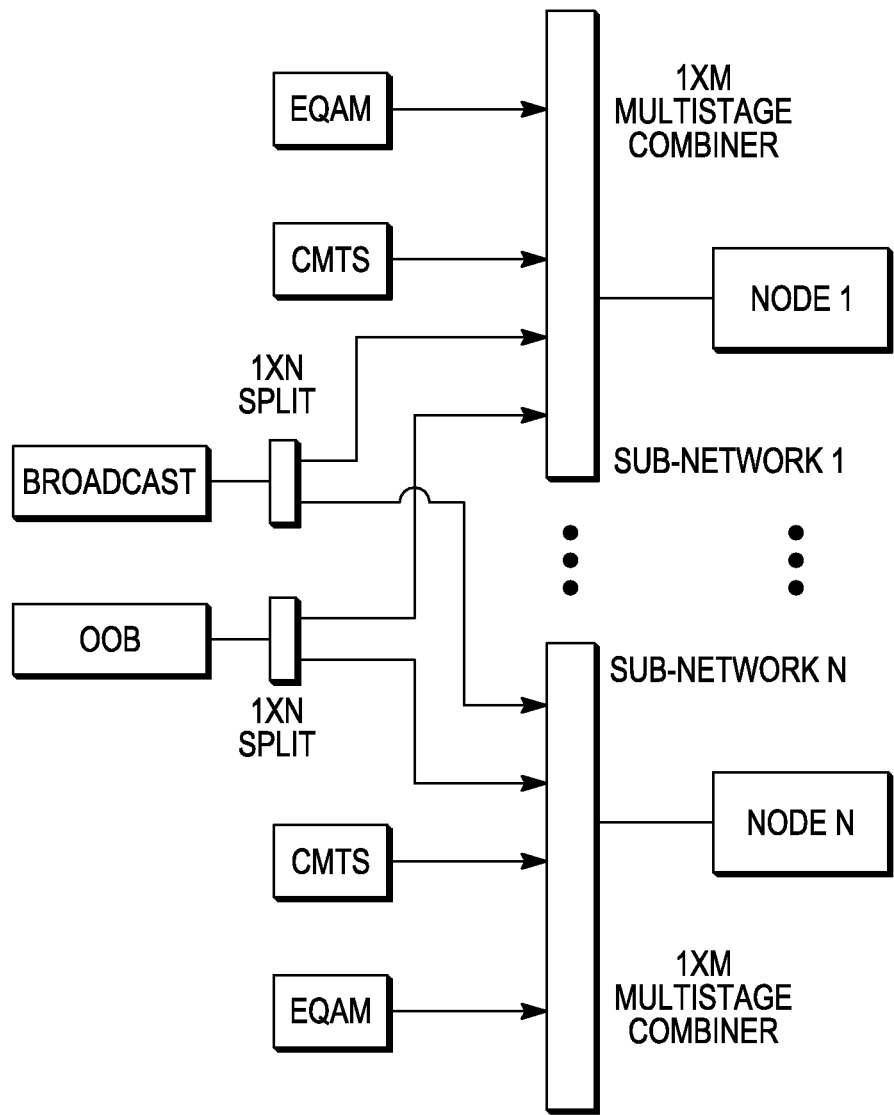

Given this architecture, the RF combining network 2720 combines, in the analog domain, the respective signals from each of the various sources that it receives as an input. FIGS. 68 and 69 schematically show how a typical RF combining network combines signals received from several sources. While conceptually a simple addition of signals at multiple frequencies, this type of combining network presents a number of challenges to the implementer of an HFC network. RF power combiners typically present 3.5 dB of loss for every 2×1 combination. This high level of loss, combined with the variability in the number of RF sources and the potential combination permutations, means that the equipment providing these RF signals needs to be capable of a significant output dynamic range. In addition, this combining network is a major potential point of interfering signal ingress, and requires skilled maintenance in order to make sure that all of the connections are properly tightened and that all unused ports are properly terminated. Also, since the loss will vary from port to port on every combiner and through each of the cable connections, careful RF signal level balancing is required. Another major concern with RF combining of signals is the challenge of adding or changing the services that are being combined together. Often, adding new services will require disruptive changes to this RF combining network which will potentially affect the quality of the other services which are sharing this combining network. In practice, and as can be easily seen from FIGS. 67 and 68, this RF combining network is actually a rat's nest of cables and passive splitters that are connected together and locked in a cabinet inside of a Head End or Hub.

Figure 70:
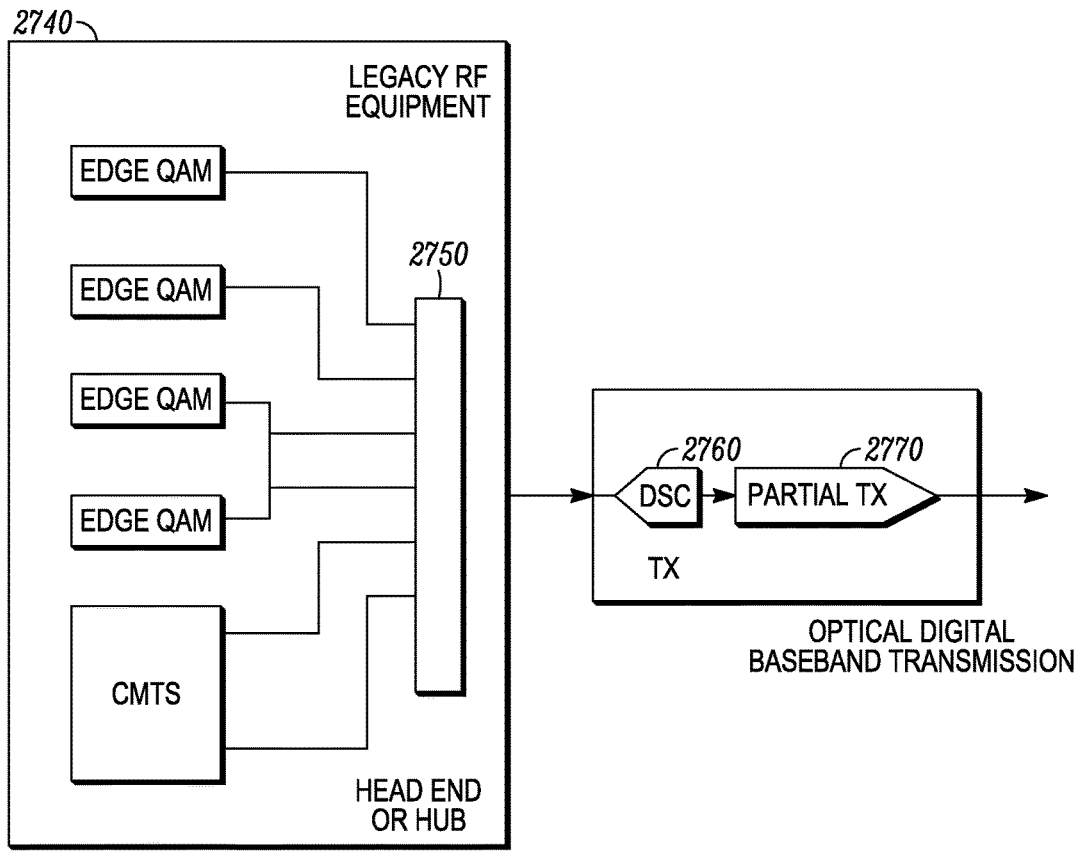
FIG. 70 shows a modified implementation of a transmitter at a head end.
Figure 71:
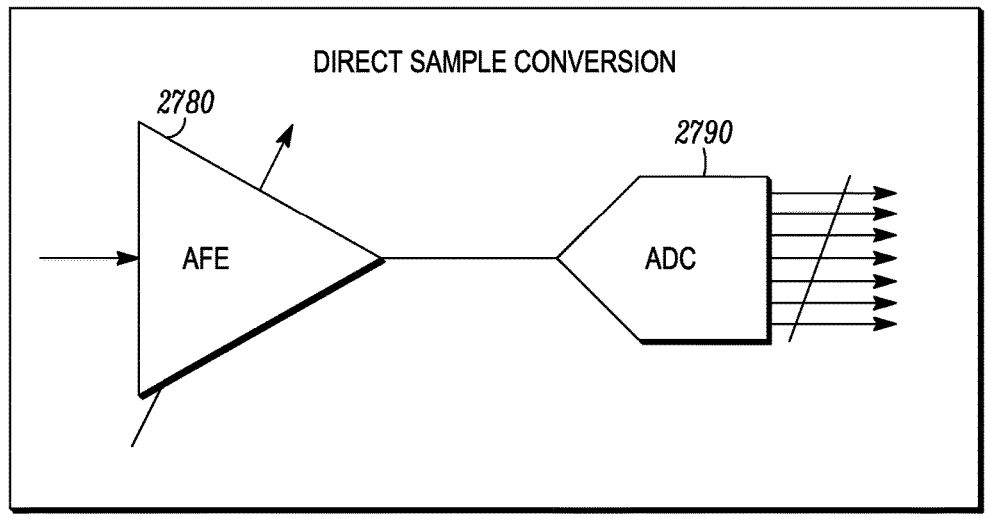
FIG. 71 shows a Direct Sample Conversion (DSC) module.

Referring back to FIGS. 8, 17, and 18, the present disclosure shows a new transmitter that receives a signal from an RF combining network and processes it for subsequent propagation down a fiber optic cable. As shown in FIG. 70, as an initial step in this processing, the signal received from the RF combining network 2750 in head end 2740 undergoes Direct Sample Conversion (DSC) through module 2760 before processing by the remainder 2770 of the transmitter. Referring to FIG. 71, DSC involves passing the combined RF signal first through an Analog Front End (AFE) 2780 and an Analog-to-Digital Converter (ADC) 2790. The AFE 2780 provides impedance transforms etc. to prepare the signal for digital conversion, and also preferably adjusts the composite signal strength of the output of the RF combining network so that substantially the full dynamic range, or frequency scale, of the input of the ADC is used. The ADC samples the output of the AFE and converts it to digital codewords.

Preferably, the DSC module 2760 and shown in FIG. 71 may be used regardless of the method ultimately used to modulate the optical signal provided down the fiber path to the node. For example, either the transmitter shown in FIG. 17 (a transmitter with direct laser modulation) or the transmitter of FIG. 18 (a transmitter with an externally modulated laser) may be used in the system of FIG. 70. It should be understood that, with respect to FIG. 18, the ODB precoder and ODB precoder may be omitted if desired (an externally modulated coherent laser transmitter). In addition, the EML transmitter partially shown in FIG. 73 may be used in the system of FIG. 70. The EML transmitter of FIG. 73 is generally similar to that shown in FIG. 18, except instead of using a Mach-Zehnder modulator to selectively pass or cancel the output of a laser, the EML transmitter of FIG. 72 uses a second stage, such as the P/N junction depicted for example, to selectively absorb light from a laser at a level proportional to the modulation signal.

Referring back to FIGS. 21, 23, and 24, the present disclosure shows another new transmitter that receives a signal and processes it for subsequent propagation down a fiber optic cable. Unlike the transmitters of FIGS. 8, 17, and 18 which use DSC to initially process the signal received from the head end, the transmitters of FIGS. 21, 23, and 24 each use a process called Direct Digital Synthesis (DDS), which is specifically shown in FIG. 72. DDS is a procedure that up-converts a series of synthesized individual channels, or groups of channels, in a manner that allows for conversion of the digital signals back into analog format, but at the frequency desired for the channel plan on the analog transmission plant. For example, a DDS module 2800 may comprise a J.83 QAM encoder 2810 and an OFDM encoder 2820 arranged in parallel so that each is capable of receiving an input signal (typically representing a great number of channels of CATV content, ancillary data, etc) from a head end, based on which modulation format is desired at the node for the encoded channel. After encoding, the encoded signal is sent to a digital up-converter (DUC) 2830 for up-conversion.

DDS may initially seem less intuitive than the DSC approach. The input is typically some form of conventional digital bit stream such as Gigabit Ethernet, 10 Gigabit Ethernet. The data stream is sent to the modulation encoder where it is encoded into the spectral representation of the modulated RF waveform at a virtual baseband carrier frequency. The modulation encoding scheme used is not important, so long as it matches the encoding scheme expected by the network termination device such as the set top box or cable modem.

Once the video and data signals have been encoded in the appropriate modulation format, the next step is digital up-conversion which creates a digital representation of the final RF spectrum that is intended to be generated. Typically, digital up-conversion is used in the application of an EdgeQAM, where the up-converter is used to locally create the RF spectrum. In the case of an EdgeQAM, the DUC is co-located with the Digital to Analog Converter (DAC) and the DUC directly feeds the DAC. However, with respect to the transmitters disclosed in the present application, this is not the case as the DAC is potentially located hundreds of kilometers away.

Figure 72:
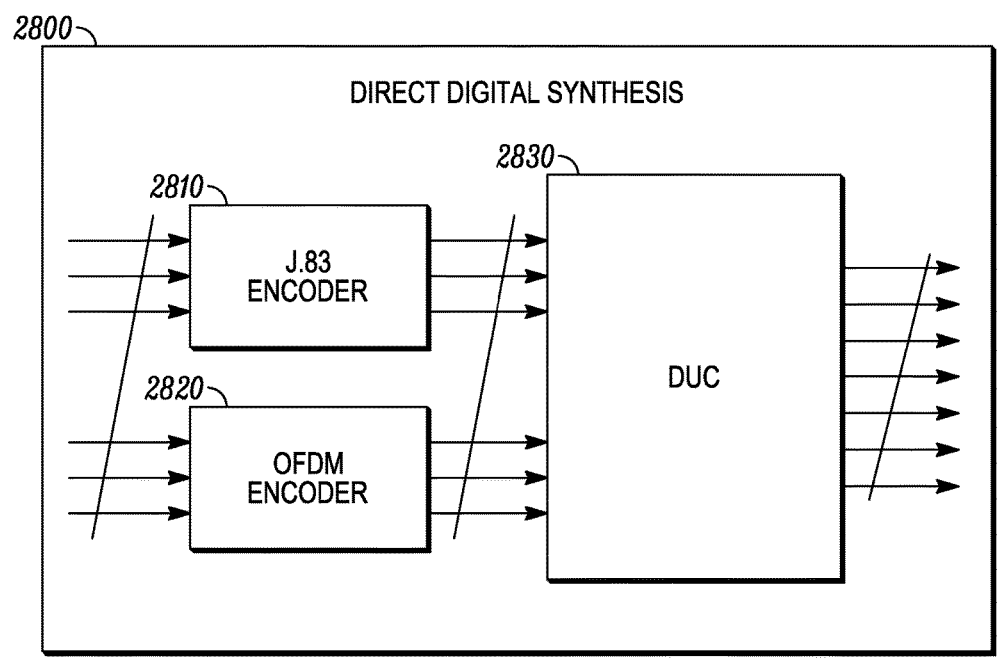
FIG. 72 shows a Direct Digital Synthesis (DDS) module.
Figure 73:
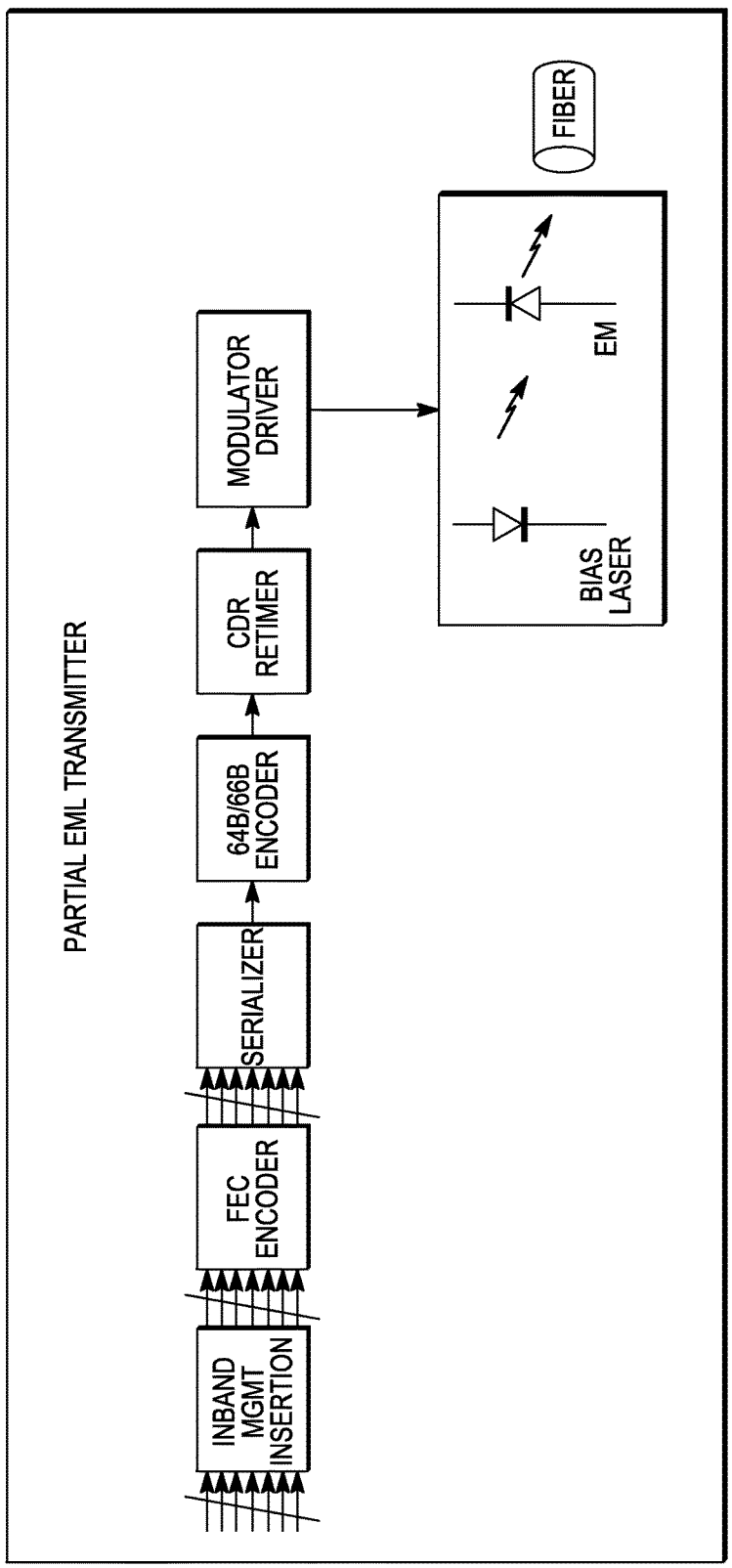
FIG. 73 shows a partial EML transmitter.

Again, the DDS module shown in FIG. 72 may be used regardless of the method ultimately used to modulate the optical signal provided down the fiber path to the node. For example, either the transmitter shown in FIG. 23 (a transmitter with direct laser modulation) or the transmitter of FIG. 24 (a transmitter with an externally modulated laser) may be used in the system of FIG. 72. It should be understood that, with respect to FIG. 24, the ODB precoder and ODB encoder may be omitted if desired (for example with an externally modulated coherent laser transmitter). In addition, the EML transmitter partially shown in FIG. 73 may be used in the system of FIG. 72.

Referring back to FIG. 22 and the accompanying portions of the present specification, a DUC can conceptually be viewed as a processor that receives one modulated sequence of digital codewords and produces a different sequence of codewords modulated to a new frequency band, by multiplying the input codewords with a locally-generated representation of an oscillator. This is directly analogous to heterodyne mixing in the analog domain. The new codewords are then processed so that unwanted mathematical mixing products are filtered and removed through digital processing. The final codewords represent the relative power level of the RF spectrum at the precise intervals of the conversion clock.

The following disclosure shows a variation of the DSC and DDS circuitry that perform digital conversion and combination to produce digital code words that represent the signals to be combined within the system. These code words are the new signal domain converted into the digital domain. Despite the complexity of the digital processing disclosed below, this approach allows for simpler system design and use in actual practice. Since the signals to be added are now in the digital domain, the digital processing subsystem can now manipulate the signals mathematically to wherever they need to be placed in the CATV analog spectrum when they are converted back to the RF domain. In addition, the possibility exists to remove and, if desired, replace existing channels carried on the system so that the frequency spectrum can be more efficiently used for multiple channels. The use of digital combining eliminates the existing requirement of a combining network, simplifying the overall system. The RF levels ultimately generated can also be adjusted through mathematical processing performed in the digital signal processing circuitry. Finally, more robust and less expensive approaches to digital transmission can be used to carry the desired signals to the digital signal processing combination point using this technique.

In existing CATV delivery systems, individual TV channels in the older analog VSB format are generated individually, with one channel per chassis in a rack. Newer QAM "digital" channels have been generated singly per chassis, with channel density per chassis increasing over time as new products are developed. Almost all existing systems have to contend with multiple RF channel sources, with a combination of legacy analog channels, varying packaging density QAM channels, for both video and cable modem use, as well as some unique signals used in the CATV transmission spectrum for control and signaling, such as authorization of video on demand and other set top box services. No one source supplies all the signals used in a CATV system, due to commercial as well as historical and economic reasons. In order to combine these signals into the full RF spectrum, combiner networks as described earlier are used. If a CATV operator wants to reconfigure the CATV spectrum in any way, somebody must go the CATV transmission site and manually move cables from one portion of the combiner network to another. In many cases, the actual configuration of the combiner system must be redone. This may require adjusting RF signal levels to be suitable for the new configuration. This is time consuming and difficult. It is possible to construct a large switching matrix to perform this function, but not only is this expensive and physically large and cumbersome, but accommodating every permutation would be prohibitively expensive and unwieldy.

Figure 74:
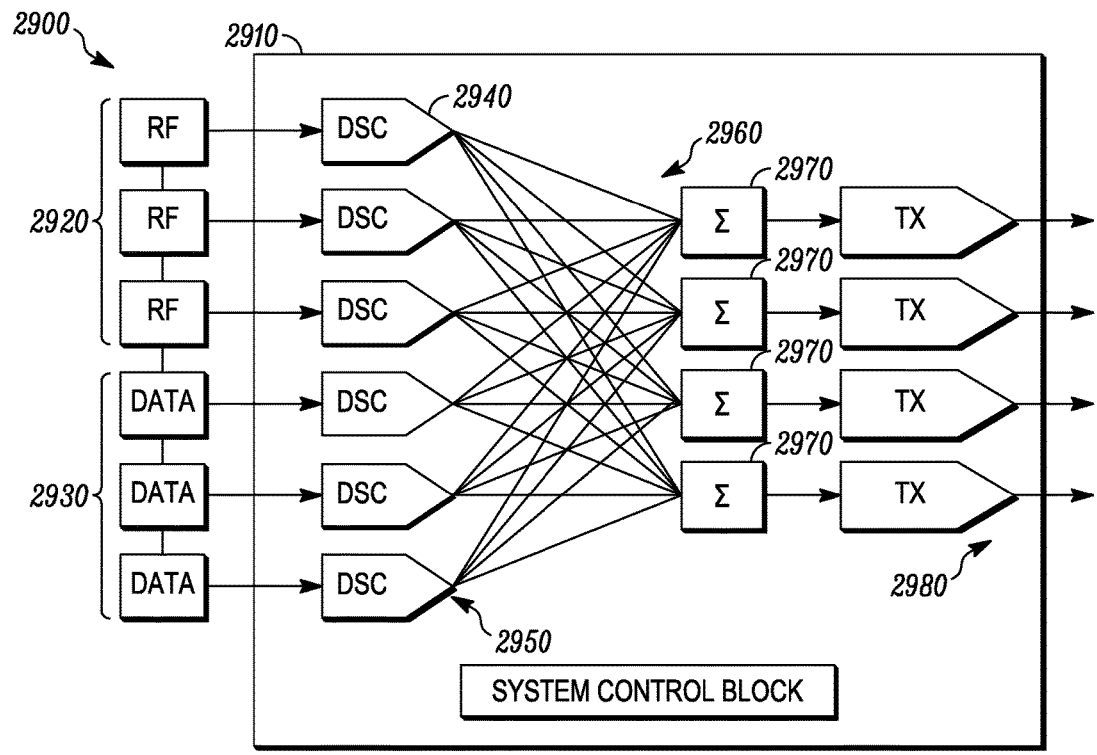
FIG. 74 shows a control block for combining and transmitting RF and data feeds.
Figure 75:
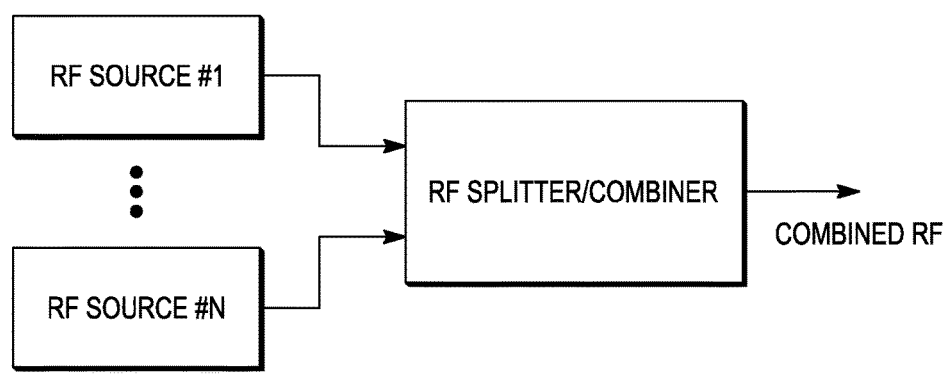
FIG. 75 shows two RF sources of FIG. 74 being combined in a single input.

Referring to FIG. 74, a plurality of inputs 2900 are provided to a system control block 2910. The inputs 2900 may be categorized into RF inputs 2920 and data inputs 2930. The RF inputs 2920 may comprise any combination of types of RF sources, such as broadcast sources, out of band (OOB) sources, proprietary third party signals, etc. as well as legacy CMTS and analog TV sources. The number of RF inputs 2920 is for illustration only, and can be any number greater or less than that depicted. Moreover, two or more RF sources can be combined into a single RF input prior to feeding into the system control block 2900, if desired (as shown in FIG. 75). The RF inputs 2920 are preferably each routed to a respective DSC module.

The data inputs 2930 can be either from an electrical interface, such as electrical transceiver, or optical interface, such as GbE or 10 G GbE. The number of data inputs 2930 is for illustration only, and can be any number greater or less than that depicted. The data inputs 2930 may contain any content, including video or data. These RF inputs 2900 have been traditionally handled by CMTS and Edge QAM. The data inputs 2930 are directly synthesized by DDS modules 2950 and routed through high speed digital connections.

After DDS or DSC processing, the respective signals from the RF inputs 2920 and data inputs 2930 are routed through high speed digital connections and combined by a summation network 2960, comprising individual Digital Summation blocks 2970 controlled the system control block 2910. The network 2960 of connections between DSC and/or DDS blocks 2940, 2950 and the Digital Summation blocks 2970 can be implemented in any appropriate combination of connections. The embodiment shown in FIG. 74 can be practically implemented in a number of different ways, e.g. a digital cross connect, data switching or multiplexing solution. Moreover, though FIG. 74 shows a relatively complex network 2960 of connections, any number of connections may occur, or the connections could be dedicated and not multiplexed. Once summation has occurred, the high speed digital data streams are sent to respective transmitters 2980 from the summation blocks 2970, which produces optical digital broadband transmission. Again, the number of transmitters 2980 is for illustration only, and can be any number suitable for the application.

Because the entire RF spectrum processed by the system of FIG. 74 is now represented by clocked digital codewords, it is now possible to perform combining through mathematical digital signal processing functions rather than by combining RF signals. The digital codewords are not susceptible to crosstalk or degradation from noise and non-linearity as is an analog signal, so the processing can be performed in a field-programmable gate array or other logic device that is essentially completely configurable, i.e. to match the permutations found in channels within a particular CATV system. When using system of FIG. 74, where the entire spectrum is represented by a set of time varying digital codewords rather than a set of individual time varying voltages, the entire function of the RF combining network can be replaced by a single chassis with multiple digital inputs.

In addition, since similar type digital signal processing components are used to perform the calculations needed for direct digital signal synthesis, this function can be integrated as well. The fundamental limitation is the computational capability of the digital signal processing components. With existing technology, this becomes simply a pricing consideration. So, simple Ethernet based transmission of program material can now be easily incorporated into the CATV network with far less expense than is required today for separate QAM modulator products.

Yet another advantage is the potential for reusing spectrum. The types of analog filters that would be required to delete an existing channel in the spectrum so that another channel on the same frequency could replace it are physically large and expensive, and often, their performance degrades adjacent channels. Hence a solution to reuse spectrum using existing technology is at best, extremely challenging Since digital filters are only mathematical computations and not actual physical products, subject to temperature drift, aging, and imperfect components, essentially perfect filters can be produced in the digital domain. The digital filters are only limited by the computational resources and the skill of filter designer.

From an operational perspective, the digital combining system shown in FIG. 74 is far simpler to use. Because no cables need be moved and no other adjustments are needed, the control of the switching function can be performed entirely through a computer-based user interface. This can even be done automatically, which is especially desirable for redundancy functions, or remotely by an operator. For the CATV operator, this greatly reduces operational costs. The convenience also permits frequent reconfiguration in response to customer and marketplace demands, which is currently impracticable.

Figure 76:
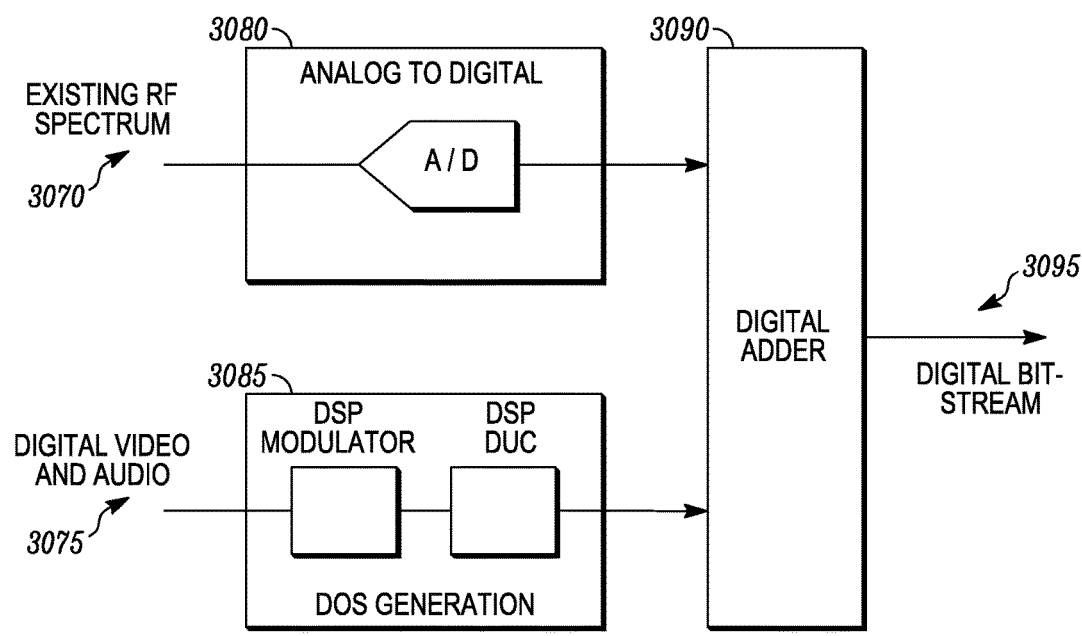
FIGS. 76-78 show respective embodiments implementing the system shown in FIG. 74.
Figure 77:
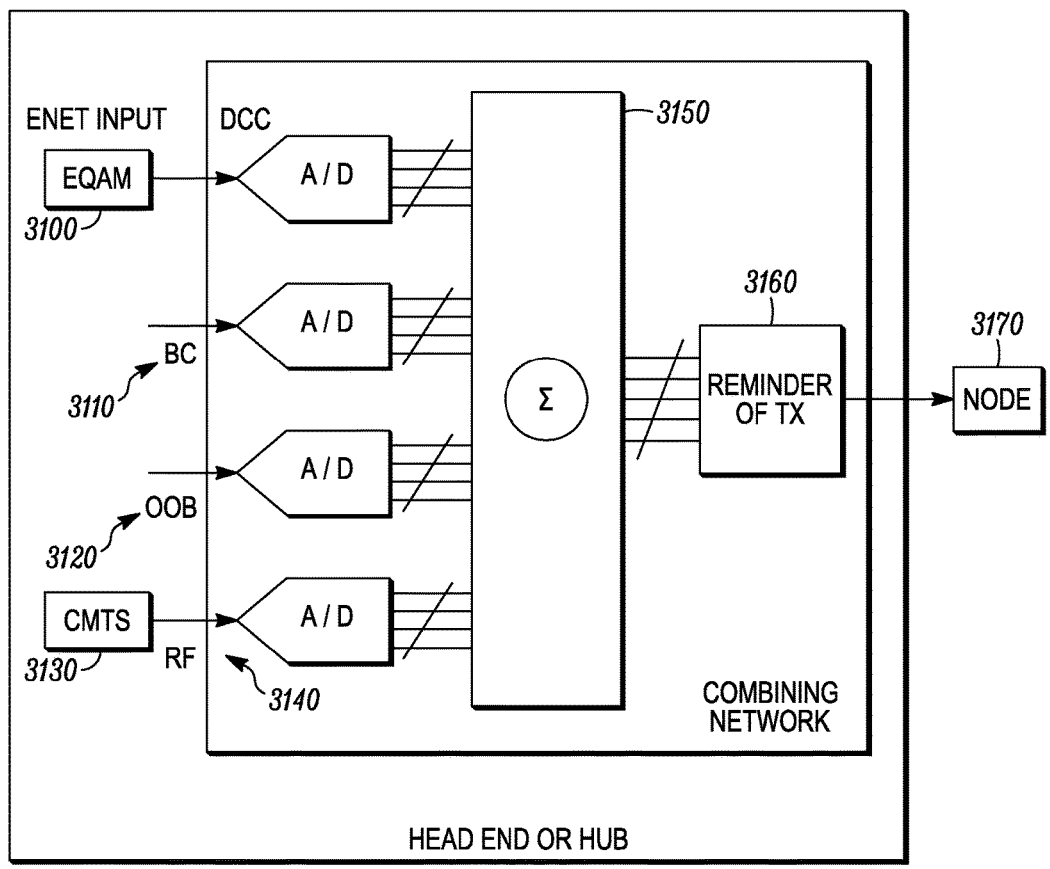
Figure 78:
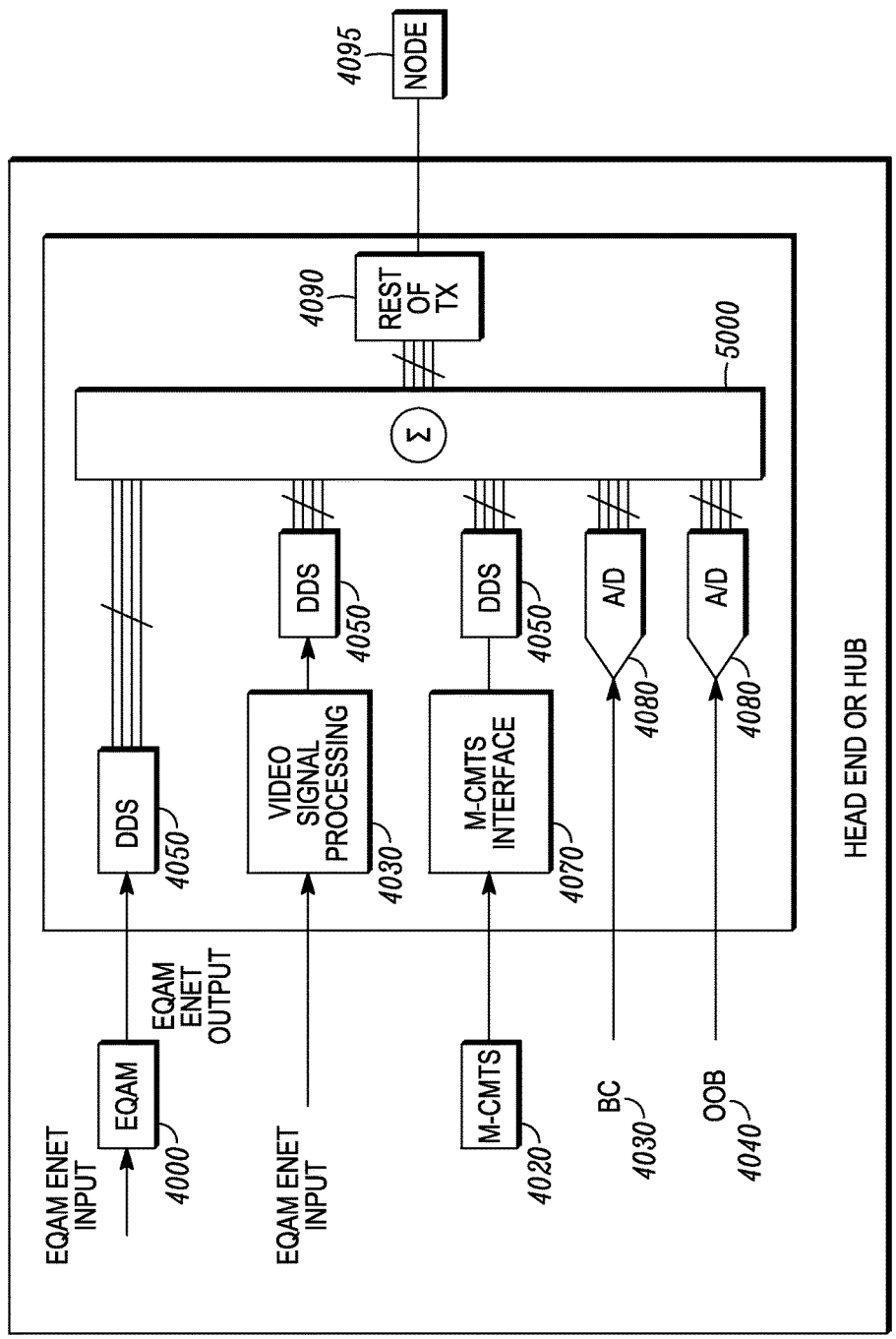

Additional implementation drawings for the system of FIG. 74 are shown in FIGS. 76-78.

FIG. 76 shows the most basic deployment of the invention as a digital combining system. An existing RF signal stream 3070 is converted into the digital domain by the DSC block 3080. Additional video or data streams in a digital format 3075 are modulated and upconverted by the DDS generator block 3085 to provide a digital representation of the RF signals. These two digital representations are fed into the summation block 3090 which adds them together digitally to produce a digital bitstream 3095 containing the combined input streams.

FIG. 77 shows a more practical use of a digital combining system. In this case RF inputs from existing EQAM 3100, CMTS 3130, broadcast 3110 and out of band 3120 sources are converted into digital signals by ADC blocks 3140. The digital outputs of these blocks are fed into the digital summation block 3150 where they are combined to create a composite signal containing all the input sources. This signal is then passed to the later stages of the transmission system as described earlier 3160 for forwarding to the node 3170.

FIG. 78 illustrates an operating scenario of the digital combining system with a mix of digital and analog inputs. In this case additional processing functions are incorporated into the system. Digital input from an EQAM system 4000 is received by a DDS block 4050 where a digital representation of the output RF spectrum is created and sent to the summation unit 5000. Alternatively the input to an EQAM system could be delivered directly to a video signal processing block 4030 within the system where EQAM functions are performed. In essence the EQAM functionality has been subsumed into the system. The output from the video signal processing block 4030 is again processed by a DDS block 4050 and fed into the summation unit 5000. Input from a Modular CMTS 4020 is shown being received into the M-CMTS interface block 4070. In current head ends the M-CMTS would interface to an external EQAM which would provide physical layer processing for the CMTS data stream. As with the video processing these EQAM functions may be subsumed into the system so that an external EQAM is no longer required. The output from the M-CMTS interface block 4070 is again processed by a DDS block 4050 and fed into the summation unit 5000. RF inputs from a broadcast source 4030 and an out of band signaling channel 4040 may be processing in the system by analog to digital conversion blocks 4080 as previously described. The output from these blocks is fed into the summation unit 5000. The output from the summation unit 5000 is a composite signal representing the summation of all the inputs (digital and analog). This signal is then passed to the remainder of the transmission system 4090 for processing and digital transmission to the node 4095 as described previously.

One key advantage of digital bit stream transmission for analog RF signals, as used in the systems of the present disclosure, is that the digital link is agnostic to the nature of the RF signals it carries. Characteristics such as the type of modulation, the symbol depth or rate, etc. are not directly visible to the transmission system. In addition, impairments in the digital bit stream transmission link do not necessarily have a one-to-one relationship impairing the signal carried by transmission itself. Instead, there is a combined effect between the sampling bit depth, the sampling clock rate, the SNR of the system, and the accuracy (jitter or phase noise) of the digital conversion clock, which will each combine with the performance of the digital optical link to determine the quality of the signals carried over the link. Existing CATV optical transmission systems are optimized for the performance needs of broadband RF services and for the expected formats that will be commercialized in the near future. However, given the industry trend of moving to increased services at ever-higher data rates, it is unclear whether existing architectures for delivering CATV can keep pace.

The systems described in the present disclosure, however, permit the adjustment of operating parameters in order to handle an ever-expanding demand for more content at higher data rates. Examples of such adjustable operating parameters include Forward Error Correction (FEC), the sampling rate, bit depth, as well as the required bit-error ratio (BER) and modulation error ratio (MER) based upon the application. These parameters are interdependent, and the overall improvement in performance by adjusting each of these parameters will vary based upon the specifics of the system, as well as the deployment architecture and the signals that are being carried by the transmission system.

The Forward Error Correction block within the system, such as block 570 in FIGS. 17, 18, 23, and 24 and block 860 in FIGS. 30 and 32 can be enabled, disabled or the encoding scheme, and in turn the overhead, can be changed, providing additional line bandwidth that can be used to increase the signal to noise ratio (SNR) when performance is preferred over the advantages of FEC protection. In a typical system which is designed for J.83 based 256 QAM and an upper frequency range of 1 GHz to 1.2 GHz, a bit depth of 10 bits would likely be chosen along with a sampling frequency of 2.5 GSps. This results in a nominal serial bit rate of 25 Gbps (ignoring the approximately 3% overhead of 64b/66b encoding if used). Typical FEC overhead for optical signals running at these data rates is approximately 3 Gbps, which brings the 25 Gbps line rate up to approximately 28 Gbps. If, in a particular system, Forward Error Correction is not required, but additional SNR is desired, FEC may be disabled and the extra line bandwidth of the system used to carry an extra sampling bit instead. Each additional sampling bit increases the serial line rate by an amount that is equal to the sampling rate. For example, if the sampling depth is increased from 10 bits to 11 bits, while operating at a sample rate of 2.5 GSps, the line rate will increase by 2.5 Gbps from 25 Gbps to 27.5 Gbps. This new line rate is less than the original line rate which included the FEC overhead, yet it theoretically provides an additional 6.02 dB of SNR (this improvement can also be analyzed as a reduction in quantization error). This increase is an example, and of course actual gain will depend upon implementation details such as the Effective Number of Bits (ENOB) available at conversion. If the Analog to Digital Converter or Digital to Analog Converter have an ENOB that is lower than the number of bits being transmitted, then little or no improvement in SNR will be observed. Depending on the application, a 6 dB improvement in SNR allows for an improvement in spectral efficiency of two bits in the depth of modulation. For example a 256 QAM system (8 bits/second/Hz) could become a 1024 QAM (10 bits/second/Hz) system or a 1024 QAM system could become a 4096 QAM (12 bits/second/Hz) system.

Sampling Rate within the system primarily affects two performance parameters of the signals being carried by the transmission system, the maximum channel frequency limit and the oversampling gain. The relationship between sampling rate and maximum frequency is straightforward and well understood. This relationship is commonly referred to as the Nyquist-Shannon theorem and states that at a minimum, the sampling clock must be equal to or greater than twice the highest frequency of interest. This requirement is in place both to guarantee that there will be enough samples in time in order to resolve the highest frequencies of interest and also to make sure that the aliasing image does not fold back into the spectrum of interest.

The relationship between sampling frequency and SNR is less common, but also well understood. In this case, increasing the sampling frequency actually improves the effective SNR of the system. This relationship is as follows:

$$\Delta SNR \text{ (dB)} = 10 * \text{Log}\left(\frac{\text{Sampling Frequency (Hz)}}{2 * \text{Signal Bandwidth (Hz)}}\right)$$

As the equation above shows, when the sampling frequency equals the Nyquist rate (twice the maximum frequency of interest) there is no oversampling gain (0 dB). When the sampling frequency is twice the Nyquist rate, there is a 3 dB improvement in SNR.

The above equation gave the oversampling gain, because the quantization noise is distributed over the frequency range from zero to one half of the sampling frequency. When the sampling rate is increased, the quantization noise within the signal bandwidth is reduced.

Another benefit of higher sampling rate is the tolerance to more absolute phase noise, i.e. given a constant absolute phase noise, the higher the sampling frequency, the smaller the jitter will be:

$$\text{Jitter} = \frac{1}{2\pi f}\sum_f \text{Phase\_noise.}$$

We can see from this formula that as the sampling frequency increases, system jitter proportionally decreases.

In the case of a CATV system, each channel is isolated, hence it might appear that the high sampling clock would cause oversampling gain for individual RF channels. Yet, in reality, because the ADC takes the entire spectrum of the RF channels combined and digitized, even though it is true that each channels noise is isolated, each channel's power level will be lowered at the same ratio. Assuming that the RF spectrum is flat, there would be no oversampling gain as long as the highest channel frequency is half the sampling frequency. In a multichannel CATV system, the oversampling gain cannot be calculated by a single channel bandwidth, rather it must be calculated by the entire bandwidth of all of the channels combined. An alternative way to view this relationship is that there is no oversampling gain as a long as the entire spectrum is filled. In the cases where fewer channels than the maximum are used, there can be oversampling gain. Certainly, the spectrum between 0 and 50 or so MHz would be unused. In addition, other segments might not be used when channels are left open or when the coaxial system bandwidth is less than half the sampling frequency. But, in normal implementations the gain is rather marginal.

With respect the effects of bit depth adjustment, it is well established that the SNR=6.02*N+1.76 (dB) when considering the ADC quantization error. When taking into account thermal noise and ADC nonlinearity noise, the digitized SNR becomes SNR=6.02*ENOB+1.76 (dB). ENOB is the effective number of bits and depends slightly on the RF frequency of the input signal. The higher the input RF frequency, the fewer ENOB, but the ENOB decrease is usually relatively small. And ADC vendor's datasheet will list the ENOB numbers.

On the other hand, system jitter will degrade the ADC SNR; assuming the worst case sine wave analog input, jitter induced SNR degradation is calculated as SNR=−20 log (2πfτ), and τ is the total RMS system jitter calculated as $\tau = \sqrt{\tau_{clk}^2 + \tau_{RF}^2}$. If the total system jitter is 0.5 ps, for example, the ADC SNR will be limited to 50 dB which correspond to roughly 8 Bits of ADC bits, meaning that the ENOB above 8 bits will increase the SNR much less effectively.

If system jitter is a limiting factor, and the jitter-limited SNR is on the margin of a good system performance, a stronger FEC can be used to reduce the signal degradation in the system and restore the system performance. When the system jitter is small and jitter is not a limiting factor in system performance, the FEC can be omitted and the extra bits used. In addition, more ADC bits can be used to increase SNR to the level that the system can support higher modulation formats, including 1024 QAM, 4096 QAM, etc. Thus, the transmitters disclosed in the present application may be configured to be capable of varying the amount of content that the transmitter processes and propagates onto a fiber optic network over the full range between 256 QAM to 1024 QAM, for example, or alternatively over the full range between 256 QAM and 4096 QAM (or 1024 QAM to 4096 QAM) etc. The other options are to increase the sampling frequency to lower the effective system jitter when the system performance is jitter limited.

In the transmission systems described in this disclosure, digitized signals are transmitted over an optical fiber. Moreover, different optical modulation formats may be used in these transmission systems. In the optical system, if the optical SNR becomes degraded, there will be bit errors in the receiver, which will impact the DAC's recovered SNR or MER. However, there is not necessarily a one-to-one relationship between errors on the baseband digital link and the content that is being carried over the link. In practice, bit errors on the baseband digital link will effectively turn into random noise bits which will be added to the DAC noise. For example, assuming a bit error ratio of 10^-4 on the baseband digital link, the 10^-4 errors of '0's and '1's in the receiver equivalently will cause an equivalent 10^-4 noise bits to be added to the DAC noise. From this, it can be deduced that the optical domain bit errors will have limited impact on the recovered MER value as long as the optical bit error ratio is not less than 10^-4. This assumes that the equalized MER is just the DAC-restored SNR after eliminating RF channel distortions. These calculations are simply an example, and the exact relationship will depend upon parameters such as the modulation and FEC encoding schemes that are used. This is fundamentally different than what occurs in today's CATV transmission systems where degradation in the optical link is inseparable from impairment in the content signal.

For a well designed system, the optical transmission will not degrade the RF signal quality or the pre and post FEC error rates. On the other hand, the optical transmission errors have different characteristics; it is well understood and easier to budget this type of transmission system.

Figure 79:
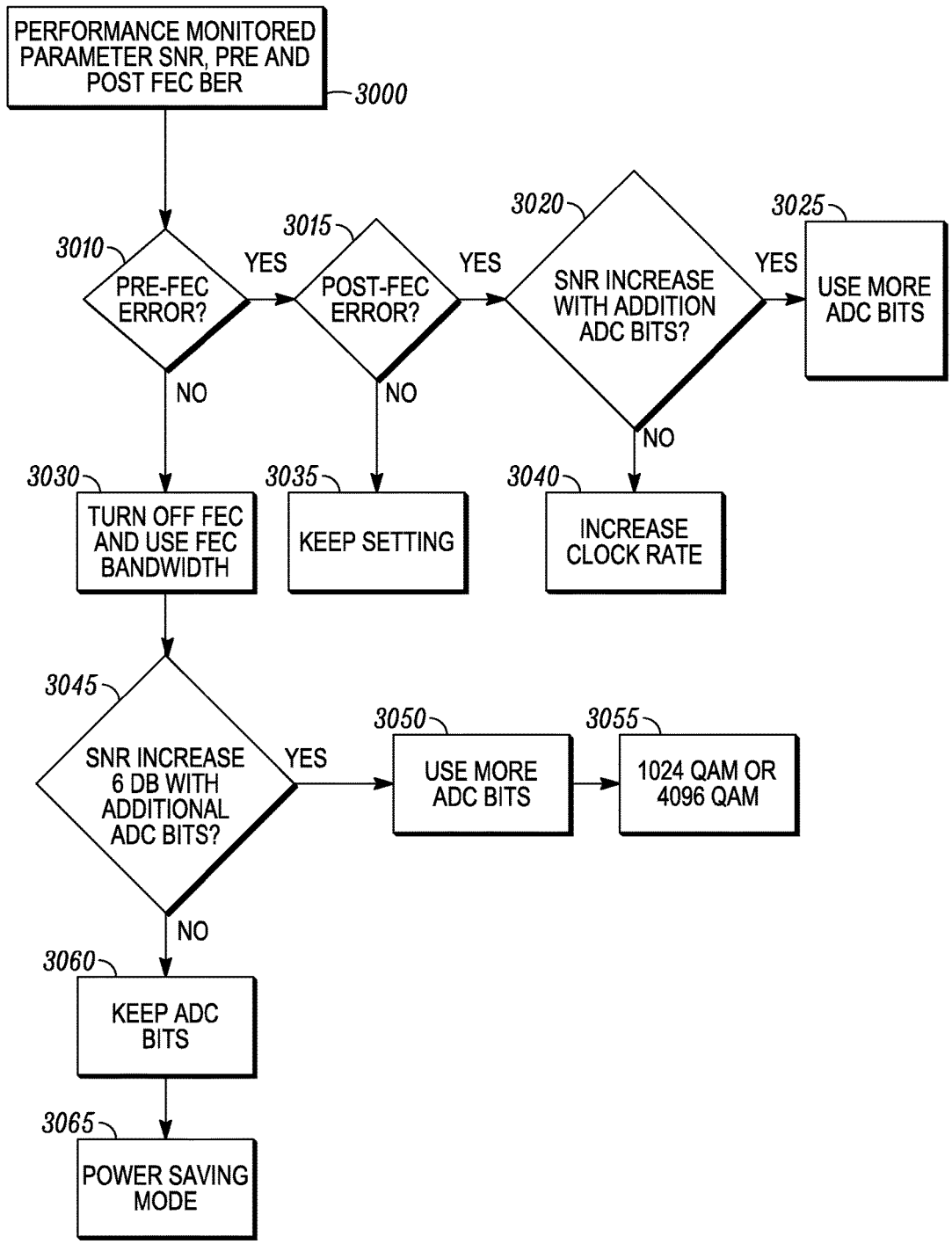
FIG. 79 shows a technique for optimizing the performance of a transmitter delivering CATV content over a fiber-optic link to a receiver.

FIG. 79 generally shows one example of a technique that allows selective parameters of a transmission system to be monitored, and based on the time-varying characteristics of those parameters, selectively adjusted to improve system performance. Specifically, in step 3000 one or more parameters can be monitored, which in this instance are the parameters of SNR, pre-FEC BER and post-FEC BER. These performance characteristics may be monitored by the cable modems and set top boxes in the downstream direction and by the CMTS in the upstream direction. These monitors are built into all of the demodulators. All of the performance characteristics for the data portion of the system are available to the operator either in or through the CMTS via SNMP. Downstream characteristics are captured by the cable modems and then the operator can query these values through the CMTS either manually or automatically through SNMP software connections. Some set top boxes have embedded cable modems, and these can also be queried through the CMTS. Set top boxes that do not have embedded cable modems can use external communication systems in order to query this data, such as the Motorola SmartStream Terminal Data Collector. All of these systems can be connected to and controlled by an external hardware/software solution. Based on the readings of the monitored parameters, the disclosed technique shows a number of decision steps that, when followed, produce five possible system adjustments as delineated below.

First, in step 3010, it is determined if pre-FEC errors are present, which are bit errors occurring before forward error correction. If the answer is yes, then in decision step 3015, it is determined if post FEC errors are occurring, which are bit errors after forward error correction. If the answer is no, then in step 3035 the settings are not changed, and the adjustment procedure resets to step 3000.

Second, in step 3010, it is determined if pre-FEC errors are present. If the answer is yes, then in decision step 3015, it is determined if post FEC errors are occurring. If the answer is yes, then in decision step 3020 it is determined if an addition of bits by the ADC causes SNR to increase. If the answer is yes, then in step 3025 settings are configured to set the number of bits used by the ADC to the increased rate, and the adjustment procedure resets to step 3000.

Third, in step 3010, it is determined if pre-FEC errors are present. If the answer is yes, then in decision step 3015, it is determined if post FEC errors are occurring. If the answer is yes, then in decision step 3020 it is determined if an addition of bits by the ADC causes SNR to increase. If the answer is no, then in step 3040 settings are configured to increase the clock rate while maintain the number of bits used by the ADC, without increase, and the adjustment procedure resets to step 3000.

Fourth, in step 3010, it is determined if pre-FEC errors are present. If the answer is no, then in step 3030 forward error correction is turned off and in decision step 3045 it is determined if SNR increases as the ADC uses more bits. If the answer is no, then in step 3060 settings are configured to maintain the number of bits used by the ADC, without increase, while forward error correction remains off, in essentially a "power saving" mode, and the adjustment procedure resets to step 3000.

Fifth, in step 3010, it is determined if pre-FEC errors are present. If the answer is no, then in step 3030 forward error correction is turned off and in decision step 3045 it is determined if SNR increases as the ADC uses more bits. If the answer is yes, then in step 3050 settings are configured to set the number of bits used by the ADC to the increased rate while FEC correction remains off, enabling the use of higher order modulation, and the adjustment procedure resets to step 3000. In should be noted that if this particular adjustment is reached in successive iterations of the foregoing procedure, the transmitters described in the present disclosure are capable of reaching orders of modulation as high as 4096QAM.

Figure 80:
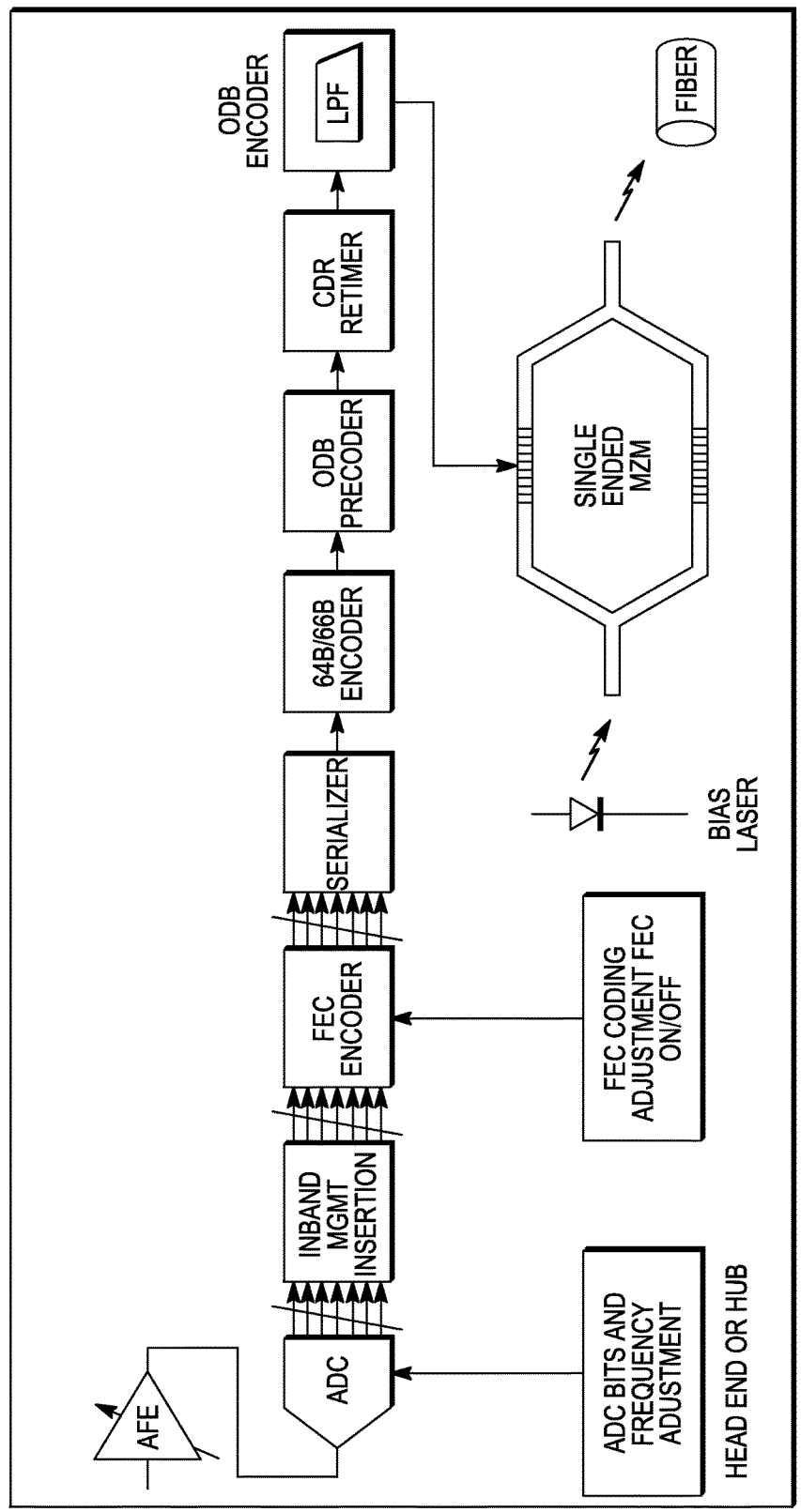
FIGS. 80-82 show different receivers that may implement the technique of FIG. 79.
Figure 81:
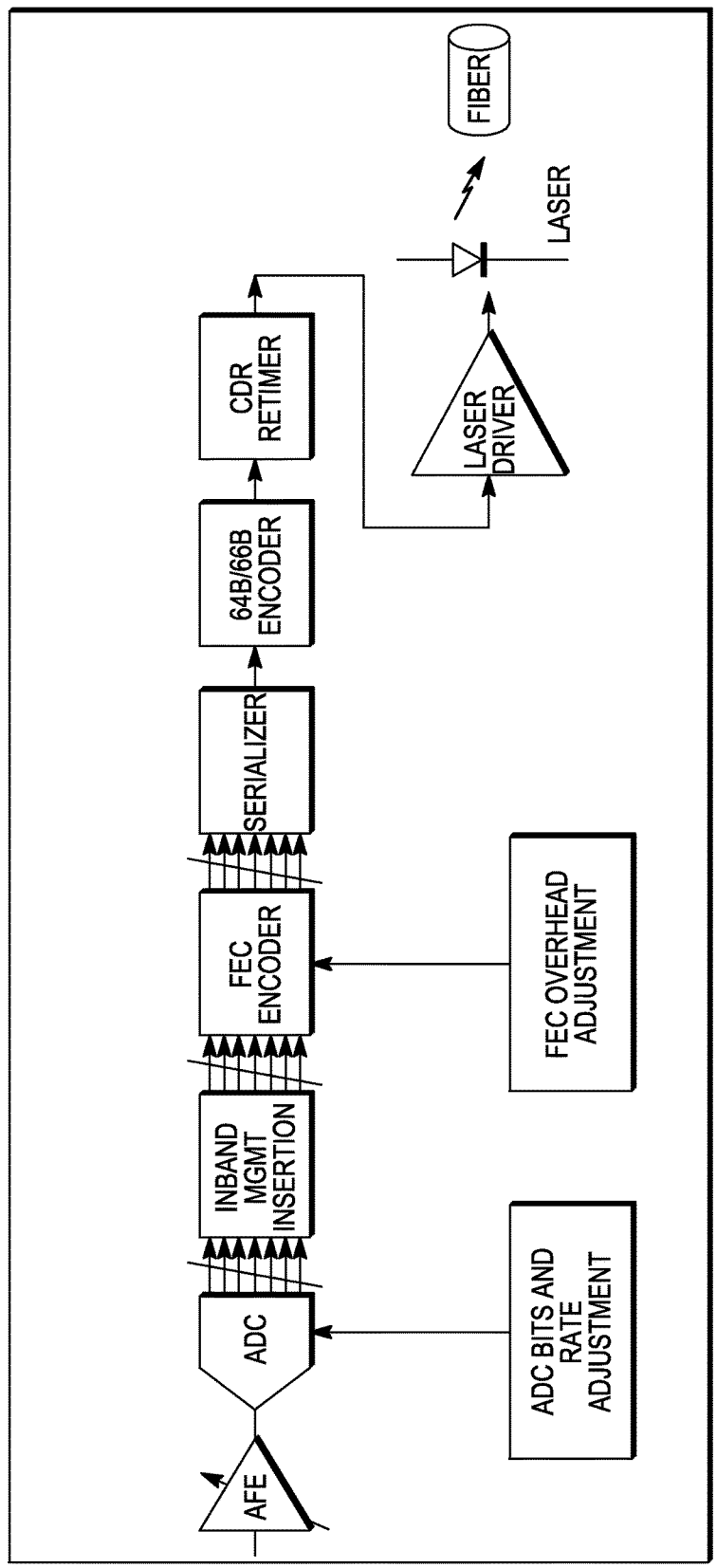
Figure 82:
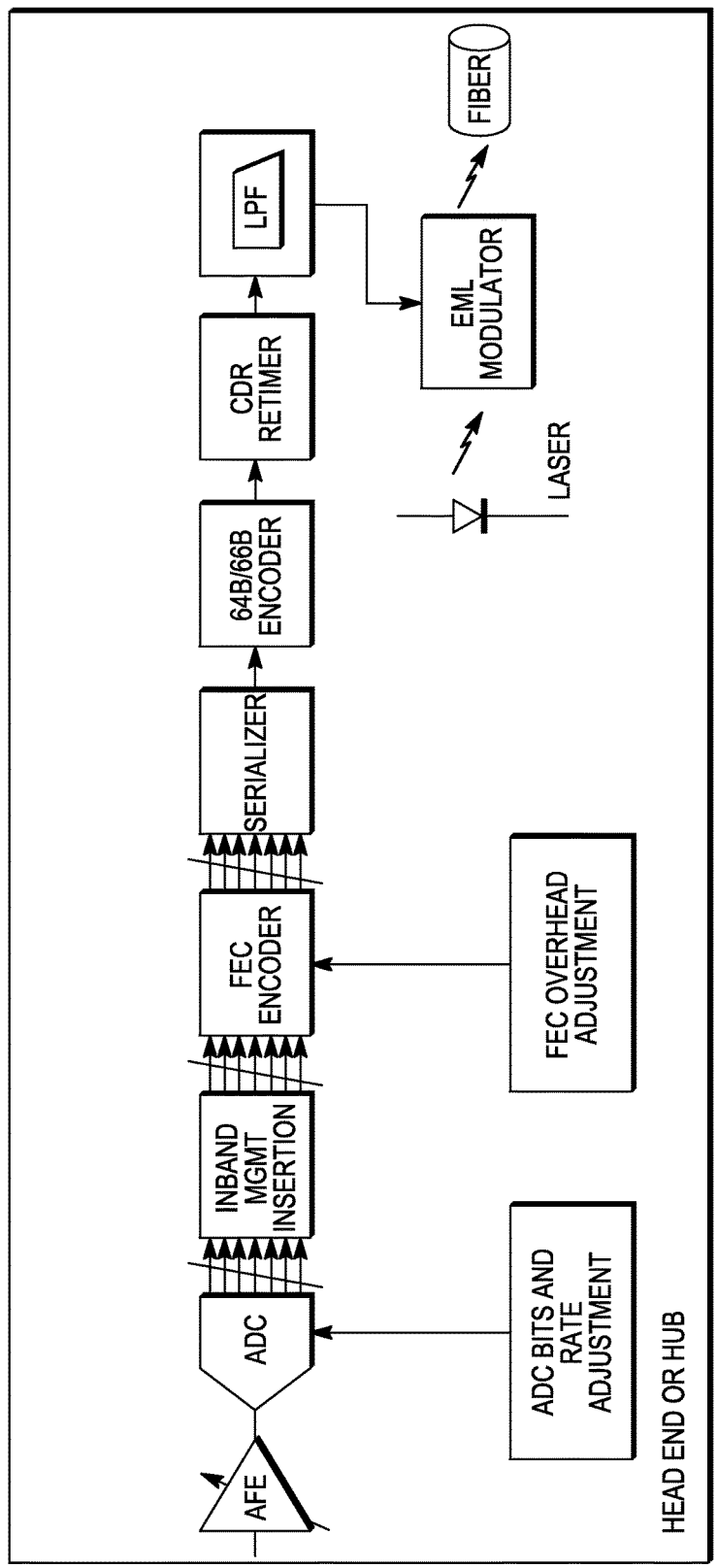

The procedure shown in FIG. 79 may be implemented in any of the new transmitters previously disclosed. For example, FIGS. 80-82 show transmitters with different modulation formats, including ODB as well as DML and EML. Each of these transmitters are compatible with the adjustments just described. Each of these figures shows the ADC as well as the FEC module as components that can be adjusted/reconfigured. Depending on the end-to-end system performance, the ADC as well as FEC are selectively adjusted to achieve the following benefits.

For systems with jitter-limited digitized and recovered signal SNR, using less ADC bits saves power because more bits will not help SNR significantly, and depending on whether there are pre-FEC errors and how low the BER rate is, different FEC coding can correct system performance. On the other hand, if the system jitter is low, and we are operating below the ENOB, using more ADC bits gives higher SNR. This in turn means the FEC function can be turned off, removing the extra overhead associated with the FEC encoding. This freed up line bandwidth can then be used to transmit more payload data. The increased SNR will also make the system better able to accommodate higher order RF modulation formats. In a third case, if the system jitter is large enough that the system still shows errors even with strong FEC, the ADC clock frequency can be increased to effectively lower the system jitter and increase SNR. As indicated above, by combining the operation of both FEC and ADC, a wide range of digital parameters can be adjusted to either allocate extra bandwidth for more data transmission or run the system in a power saving mode, depending on system performance and the deployment scenario.

It should be understood that, although the flexibility of the disclosed transmitters were illustrated using an example of adjusting parameters of FEC and ADC modules after monitoring parameters of BER and SNR, other embodiments may monitor different parameters and/or adjust different modules in a transmitter to optimize performance. For example, if the end-to-end monitored MER is good and was not significantly affected by lowering the ADC resolution, less ADC bits can be used for the same application, or the extra bits can be used to transmit in a more data intensive modulation format, like 1024 QAM or 4096 QAM. Other permutations are also possible, as many different parameters such as sampling frequency, MER, etc. can be monitored and many different modules can be adjusted, e.g. a serializer or deserializer, a 64b/66b encoder or decoder etc. It should also be understood that, though the foregoing discussion used the adjustment and monitoring of transmitter parameters, transmitters may be adjustably configured based on monitored parameters at a receiver, and configurations of receivers may also be optimized based on parameters monitored in either the receiver or the transmitter. Alternatively, in this embodiment, these parameters may also be determined and manually configured as part of the deployment design, and in turn may remain fixed and not adjusted based upon real time performance metrics.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the claimed subject matter is defined and limited only by the claims that follow.

The invention claimed is:

1. A head end transmitter for processing a signal for propagation down a fiber optical link in a transmission system, the transmitter comprising:
   an input for receiving a plurality of channels of cable television (CATV) content processed by a head end device;
   an output for emitting a digital bit stream into a network to at least one node over a fiber optic link, said digital bit stream representing an entire radio frequency (RF) spectrum of said plurality of channels of CATV content input to said head end transmitter by including a series of digital codewords, each digital codeword representing an instantaneous power level of the RF spectrum, the instantaneous power level representing a relative power level of a composite RF spectrum comprised of said plurality of channels of CATV content at intervals of a conversion clock, wherein said digital codewords are generated using the conversion clock without a corresponding RF waveform;

a transmit subsystem operatively located between said input and said output, the transmit subsystem comprising:
- an analog-to-digital converter for digital conversion of the entire RF spectrum to the digital bit stream;
- a forward error correction encoder for forward error correction encoding of bits of the digital bit stream;
- at least one software routine which, when executed by the transmit subsystem, causes the transmit subsystem to:
  - monitor performance attributes of the transmission system;
  - evaluate one or more dependencies between the analog-to-digital converter and forward error correction module on the performance attributes of the transmission system to determine whether to adjust at least one digital parameter of at least one of the analog-to-digital converter or forward error correction module,
  - wherein adjustment of said at least one digital parameter changes said performance attributes.

2. The transmitter of claim 1 where said forward error correction (FEC) encoder selectively modulates based on said performance attributes.

3. The transmitter of claim 2 where said performance attributes include at least one of pre-FEC bit-error ratio (BER), post-FEC BER, modulation error ratio (MER), signal to noise (SNR) ratio, and a transmission data rate.

4. The transmitter of claim 1 where at least one of the analog-to-digital converter (ADC) or a Direct Digital Synthesis (DDS) module included in the transmit subsystem selectively increases or decreases a bit depth used to encode said signal based on said performance attributes.

5. The transmitter of claim 4 where said performance attributes include at least one of pre-FEC (forward error correction) bit-error ratio (BER), post-FEC BER, modulation error ratio (MER), signal to noise (SNR) ratio, and a data rate.

6. The transmitter of claim 1 where said conversion clock has a rate that selectively increases or decreases based on said performance attributes.

7. The transmitter of claim 1 where said transmitter is capable of entering a power saving mode based on said performance attributes.

8. A method of configuring a head end transmitter, at a head end, that emits a cable television (CATV) signal into a transmission network to at least one node, said method comprising:
- receiving, at the head end transmitter, a plurality of channels of CATV content;
- emitting a digital bit stream from said head end transmitter into a network for transmission to at least one node over a fiber optic link, said digital bit stream representing an entire RF spectrum of said plurality of channels of CATV content received at said head end transmitter by including a series of digital codewords, each digital codeword representing an instantaneous power level of the RF spectrum, the instantaneous power level representing a relative power level of a composite RF spectrum comprised of said plurality of channels of CATV content at intervals of a conversion clock, wherein said digital codewords are generated using the conversion clock without a corresponding RF waveform;
- monitoring at least one first performance attribute of said digital bit stream;
- evaluating one or more dependencies between an analog-to-digital conversion and a forward error correction based on one or more digital parameters of an analog-to-digital converter or forward error correction module; and
- responsive to the monitored at least one first performance attribute of said digital bit stream and the one or more dependencies evaluated between the analog-to-digital converter and the forward error correction module, configuring said transmitter to improve at least one second performance attribute of said transmitter.

9. The method of claim 8 where said transmitter is automatically configured to selectively improve signal to noise ratio (SNR) based on monitoring at least one of a bit depth, pre-FEC (forward error correction) bit error rate (BER), and post-FEC BER.

10. The method of claim 8 where said transmitter is automatically configured to reduce post-FEC (forward error correction) bit error rate (BER).

11. The method of claim 8 where said transmitter is automatically configured to selectively improve bit depth based on a pre-FEC (forward error correction) bit error rate (BER).

12. The method of claim 8 where said transmitter is automatically configured to selectively adjust sampling clock based on at least one of pre-FEC(forward error correction) bit error rate (BER), and post-FEC BER.

13. The method of claim 8 where said transmitter is automatically adjusted to selectively increase bit rate to at least 1024 Quadrature Amplitude Modulation (QAM) based on the monitored said at least one performance attribute.

14. The method of claim 8 where said transmitter is automatically adjusted to selectively increase bit rate to at least 4096 Quadrature Amplitude Modulation (QAM) based on the monitored said at least one performance attribute.

15. A method of configuring a transmitter, at a head end, that emits a cable television (CATV) signal into a transmission network to at least one node, said method comprising:
- receiving an entire radio frequency (RF) spectrum including a plurality of channels of CATV content;
- emitting a digital bit stream into a network to at least one node over a fiber optic link, said digital bit stream representing a digitization of the entire RF spectrum of said CATV content received at said head end transmitter by including a series of digital codewords, each digital codeword representing an instantaneous power level of the RF spectrum, the instantaneous power level representing a relative power level of a composite RF spectrum comprised of said plurality of channels of CATV content at intervals of a conversion clock, wherein said digital codewords are generated using the conversion clock without a corresponding RF waveform;
- monitoring at least one first performance attribute of said digital bit stream;
- evaluating one or more dependencies between an analog-to-digital conversion and a forward error correction based on one or more digital parameters of an analog-to-digital converter or forward error correction module; and
- responsive to the monitored at least one performance attribute of said digital bit stream and the one or more dependencies evaluated between the analog-to-digital converter and the forward error correction module, selectively modulating a data rate of said digital bit stream over a full range of 256 Quadrature Amplitude Modulation (QAM) to 1024 QAM.

16. The method of claim 15 where said data rate is modulated over the full range of 256 QAM to 4096 QAM.

17. The method of claim 15 where said at least one performance attribute includes a pre-FEC (forward error correction) bit error rate (BER).

18. The method of claim 15 where said at least one performance attribute includes an signal to noise ratio (SNR).

19. The method of claim 15 where said data rate is modulated by selectively changing a bit depth at which said digital bit stream is encoded by said transmitter.

20. The method of claim 15 including the step of entering a low power mode of said transmitter when said data rate is at a lower end of said range.

* * * * *